US011797935B2

(12) United States Patent
Elsner et al.

(10) Patent No.: US 11,797,935 B2
(45) Date of Patent: Oct. 24, 2023

(54) SYSTEMS AND METHODS FOR MULTI-PARTY DISTRIBUTED ACTIVE CO-BROWSING

(71) Applicant: Haworth, Inc., Holland, MI (US)

(72) Inventors: Robert Elsner, Centennial, CO (US); Krzysztof Palacz, San Francisco, CA (US); Yingtao Jiang, Fremont, CA (US); Oleg Sidorkin, Austin, TX (US); Rupen Chanda, Austin, TX (US)

(73) Assignee: Haworth, Inc., Holland, MI (US)

( * ) Notice: Subject to any disclaimer, the term of this patent is extended or adjusted under 35 U.S.C. 154(b) by 0 days.

(21) Appl. No.: 17/860,023

(22) Filed: Jul. 7, 2022

(65) Prior Publication Data

US 2023/0010127 A1    Jan. 12, 2023

Related U.S. Application Data

(60) Provisional application No. 63/219,818, filed on Jul. 8, 2021.

(51) Int. Cl.
| *G06Q 10/10* | (2023.01) |
| *H04L 12/18* | (2006.01) |
| *G06F 16/955* | (2019.01) |
| *G06F 3/04815* | (2022.01) |
| *H04L 65/401* | (2022.01) |

(52) U.S. Cl.
CPC ......... *G06Q 10/10* (2013.01); *G06F 3/04815* (2013.01); *G06F 16/955* (2019.01); *H04L 12/1813* (2013.01); *H04L 65/4015* (2013.01)

(58) Field of Classification Search
CPC .............. H04L 67/1095; H04L 65/401; H04L 65/4015; H04L 12/1813; G06F 11/34; G06F 11/3438; G06F 16/955; G06F 3/04815; H04N 7/15; H04N 7/152; H04N 7/155; H04N 7/157; G06Q 10/10
See application file for complete search history.

(56) References Cited

U.S. PATENT DOCUMENTS

| 7,149,776 B1 * | 12/2006 | Roy ...................... G06F 16/954 715/239 |
| 7,305,439 B2 * | 12/2007 | Qian ..................... G06F 16/954 709/227 |
| 10,304,037 B2 | 5/2019 | Foley et al. |

(Continued)

*Primary Examiner* — Daniel Samwel
(74) *Attorney, Agent, or Firm* — Haynes Beffel & Wolfeld LLP; Andrew L. Dunlap

(57) ABSTRACT

Systems and methods are provided for collaborative session including co-browsing in a virtual workspace. The system includes a server-side network node including logic to access a web application using a uniform resource locator (URL) of the web application. The server-side network node includes logic to generate a first model of the web application corresponding to the current state of the web application. The server-side network node includes logic to provide a spatial event map identifying events in the virtual workspace, the events identified by the spatial event map are related to the first model of the web application. The system includes logic to create a second model of the web application as a result of updates to the current state of the web application. The system includes logic to generate an update patch using a difference between the second model and the first model of the web application.

20 Claims, 39 Drawing Sheets

(56) References Cited

U.S. PATENT DOCUMENTS

| | | |
|---|---|---|
| 11,126,325 B2 | 9/2021 | Jakobovits et al. |
| 11,184,406 B1* | 11/2021 | Shashank ............ H04L 67/1095 |
| 11,366,583 B1* | 6/2022 | Vyas ..................... G06F 3/0482 |
| 2009/0037517 A1* | 2/2009 | Frei ......................... H04L 67/02 |
| | | 709/202 |
| 2012/0216131 A1* | 8/2012 | Moyers .............. H04L 65/1069 |
| | | 715/757 |
| 2014/0108542 A1* | 4/2014 | Cheng .................. H04L 67/306 |
| | | 709/204 |
| 2017/0185368 A1* | 6/2017 | Handrigan .......... G06F 16/9038 |
| 2017/0277669 A1* | 9/2017 | Sekharan ............. G06F 40/169 |

* cited by examiner

**SERVER-SIDE OPERATIONS
FOR AN ACTIVE CO-BROWSING SESSION**

RECEIVE A USER INTERFACE EVENT FROM A CLIENT-SIDE NETWORK NODE LINKED TO A MEETING OWNER OR LEADER TO START A CO-BROWSING SESSION 602

↓

ACCESS THE WEB APPLICATION IN DEPENDENCE ON A UNIFORM RESOURCE LOCATOR (URL) RECEIVED FROM THE CLIENT-SIDE NETWORK NODE 604

↓

GENERATE A FIRST MODEL OF THE WEB APPLICATION CORRESPONDING TO THE CURRENT STATE OF THE WEB APPLICATION 606

↓

PROVIDE A SPATIAL EVENT MAP TO CLIENT-SIDE NETWORK NODES INCLUDING EVENTS RELATED TO THE FIRST MODEL OF THE WEB APPLICATION 608

↓

EVENT? 612 ← RECEIVE INPUT EVENT FROM A CLIENT-SIDE NETWORK NODE 610

YES ↓

APPLY INPUT EVENT TO THE WEB APPLICATION AND CREATE A SECOND MODEL OF THE WEB APPLICATION IN RESPONSE TO INPUT IN THE INPUT EVENT 614

↓

GENERATE AN UPDATE PATCH USING A DIFFERENCE BETWEEN THE SECOND MODEL AND THE FIRST MODEL OF THE WEB APPLICATION 616

↓

SEND AN UPDATE EVENT TO THE SPATIAL EVENT MAP AT THE CLIENT-SIDE NETWORK NODES INCLUDING THE ADAPTED PATCH 618

SYSTEMS AND METHODS FOR MULTI-PARTY DISTRIBUTED ACTIVE CO-BROWSING

PRIORITY APPLICATION

This application claims the benefit of U.S. Provisional Patent Application No. 63/219,818, filed on 8 Jul. 2021, which application is incorporated herein by reference.

FIELD OF INVENTION

The present technology relates to collaboration systems that enable users to actively collaborate in a virtual workspace in a collaboration session, in particular the technology relates to co-browsing of web applications by participants in a collaboration session.

BACKGROUND

Collaboration systems are used in a variety of environments to allow users to participate in content review and collaborative data curation. Users of a collaboration system can join collaboration sessions from locations around the world.

During a collaboration session, participants may need to review a web application or a webpage or a website. In existing collaboration technologies, one of the participants can access the web application from her computing device and share the desktop of the computing device with other participants in the collaboration session. This results in a passive collaboration session in which one participant interacts with the web application and other participants only view this interaction from the displays of their respective computing devices. This type of passive collaboration does not allow all participants to actively participate in the collaboration as only one participant interacts with the web application or the webpage or the website. As web applications and webpages are very common these days, almost every collaboration session may require accessing information from a web application or a webpage.

An opportunity arises to provide a collaboration system in which all participants of the collaboration session can participate in a collaboration session and actively co-browse the web application or the webpage.

SUMMARY

A system and method for operating a collaboration system are provided. The system includes a server-side network node of a collaboration system hosting a collaboration session, between client-side network nodes, each including a display having a physical display space and a processor. The server-side network node is configured with logic to implement the following operations. The operations including accessing a web application in dependence on a uniform resource locator (URL) of the web application. The URL is received by the server-side network node in a request message from a first client-side network node to start a co-browsing session in a virtual workspace of the collaboration session established between the client-side network nodes. The operations include generating a first model of the web application corresponding to a current state of the web application. The operations include providing, to the client-side network nodes, a spatial event map identifying events in the virtual workspace. The events identified by the spatial event map are related to the first model of the web application. The spatial event map allows for rendering, in the display space on the display of each of the client-side network nodes, the first model of the web application in the co-browsing session. The operations include receiving an input event including an input from at least one client-side network node and applying the input received in the input event to the current state of the web application. The operations include creating a second model of the web application as a result of updates to the current state of the web application in dependence upon the input included in the input event. The operations include generating an update patch using a difference between the second model and the first model and sending an update event including the update patch to the client-side network nodes. The spatial event map, at respective client-side network nodes, receives the update event and allows rendering, in the display space on the display of each of the client-side network nodes, of the second model of the web application corresponding to the updated state of the web application.

The first model and the second model of the web application respectively include a plurality of elements of the web application served by a web server serving the web application.

In one implementation, the server-side network node is further configured with logic to implement the following operations. The operations include retrieving, from the web server serving the web application, at least one element from the plurality of elements of the web application. The operations include storing at least one element of the web application in a database. The first model of the web application corresponding to the current state of the web application includes at least one element of the web application queried from the plurality of elements of the web application stored in the database.

In such an implementation, the server-side network node is further configured with logic to implement the following operations. The operations include retrieving, from the web server serving the web application, each element of the plurality of elements of the web application. The operations include storing each retrieved element of the plurality of elements of the web application in the database. The first model of the web application corresponding to the current state of the web application includes at least one element of the of the plurality of elements of the web application stored in the database.

In one implementation, the server-side network node is further configured with logic to implement the following operations. The operations include generating a filtered model of the web application corresponding to the first model of the web application by filtering out one or more elements from the plurality of elements from the first model of the web application. The elements of the web application include one or more of (i) a script, (ii) a document object model (DOM) comprising a plurality of document object model elements, (iii) a style, (iv) an image and (v) a video. The server-side network node is further configured with logic to provide, to the client-side network nodes, the spatial event map identifying events in the virtual workspace, the events identified by the spatial event map are related to the filtered model of the web application.

The server-side network node is configured with logic to generate the update patch using the difference between the second model and the first model. The generation of the update patch is implemented using a web-extension component running in a web browser in which the web application is executing and determining changes in states of the elements of the web application between the second model and the first model. In one implementation, the changes in states of the elements of the document object model of the web application between the second model and the first model are determined for generating the update patch.

The server-side network node is further configured with logic to implement operations including periodically creating a new model of the web application to capture updates to the current state of the web application, wherein the current state of the web application is captured by a previous model. The generating of the update patch uses a difference between the new model of the web application and the previous model of the web application.

The server-side network node is further configured with logic to implement operations including receiving an input event from the first client-side network node to authenticate login credentials for the web application in the co-browsing session in the virtual workspace. The sending of the update event including the update patch to the first client-side network node is performed without sending the update patch to the other client-side network nodes. The spatial event map, at the first client-side network node, receives the update event and allows rendering, in the display space on the display of the first client-side network node, the second model of the web application. The second model of the web application includes a user interface for providing the login credentials. The displays at the other client-side network nodes display the first model of the web application without including the user interface for providing the login credentials.

The server-side network node is further configured with logic to implement operations including receiving a pause browse request message from the first client-side node to pause the co-browsing session. The operations include discontinuing a subsequent sending of the update event including the update patch to the other client-side network nodes other than the first client-side network node.

The server-side network node is further configured with logic to implement operations including receiving respective input events including inputs from at least two client-side network nodes and applying the inputs received in the respective input events to the web application. The second model of the web application is created as a result of updates to the web application in dependence upon application of the inputs received in the respective input events to the web application. The sending of the update event including the update patch to the client-side network nodes includes sending the update event to at least two client-side network nodes.

The server-side network node is further configured with logic to implement operations including determining respective locations of the input events from the at least two client-side network nodes within the virtual workspace. The input events include respective locations of input events in the virtual workspace. The spatial event map, at respective client-side network nodes, receives the update event and allows rendering, in the display space on the display of each of the client-side network nodes, graphical objects corresponding to the input provided by the at least two client-side network nodes within the virtual workspace. The graphical objects respectively identify actions performed on the second model of the web application at the at least two client-side network nodes respectively.

A collaboration system hosting a collaboration session is disclosed. The collaboration system comprises a plurality of client-side network nodes. A client-side network node of the plurality of client-side network nodes includes a display having a physical display space, the client-side network nodes are configured with logic to implement the following operations. The operations include sending a request message to a server-side network node to start a co-browsing session in a virtual workspace. The request message includes a uniform resource locator (URL) of a web application. The operations include retrieving, from the server-side network node, a spatial event map identifying events in the virtual workspace. The events identified by the spatial event map are related to a first model of the web application. The spatial event map allows for rendering, in the display space on the display of the client-side network node, the first model of the web application in the co-browsing session. The operations include sending an input event to the server-side network node. The input event includes an input to the first model of the web application. The operations include receiving an update event from the server-side network node including an update patch. The update patch identifies changes to elements of the first model of the web application and wherein the spatial event map is updated to include the update event. The operations include rendering, using the update event and in the display space on the display of the client-side network node, a second model of the web application showing updates that are applied to the first internal model of the web application in dependence on the input to the first model of the web application.

The input in the input event can be at least one of a text input, a menu item selection input, a voice input, an image input, a page scroll input and an annotation input. It is understood that other types of inputs can be received and processed by the client-side network node. For example, inputs via gestures. Gestures can be provided by a user or a participant of the co-browsing session by moving her hands or by moving a pointing device which may not may not include a light source.

The input event can identify an annotation operation performed on the second model of the web application. The update patch can include the annotation operation performed on the second model of the web application. The rendering can include rendering, in the display space on the display of the client-side network node, an updated view of the second model of the web application including the annotation in response to the input event.

The input event can identify an operation of attaching a note card to the second model of the web application. The update patch includes the note card attached to the second model of the web application. The rendering includes rendering, in the display space on the display of the client-side network node, an updated view of the second model of the web application including the note card in response to the input event.

The technology disclosed can be used to implement a leader-follower model in which one or more followers, follow the leader during the co-browsing collaboration session. For example, the displays on the client-side network nodes of the follower participants, display the content that is displayed on the leader's display. As the leader interacts with the web application and scrolls the pages on the web application, the displays of the client-side network nodes of the followers are updated to show the content displayed on the display of the leader's client-side network node. The technology disclosed also provides the ability to followers to view the web application at their respective pace. In this implementation, the followers, can scroll and view content on their respective displays at their own respective pace. The client-side network nodes do not send update events to server-side network node. As the followers perform scroll operations at their respective client-side network nodes, their respective displays are updated independent of each other. One follower may be viewing a different part of the web application than another follower. Consider two follower client-side network nodes, a first client-side network node and a second client-side network node. The local scroll operation on their respective displays is presented below.

The system includes a first client-side network node that is further configured with logic to render, using a first input event, in the display space on the display of the first client-side network node, an updated view of the second model of the web application in dependence on a first scroll operation. The first input event identifies the first scroll operation for the second model of the web application. The system includes a second client-side network node that is further configured with logic to render using a second input event, in the display space on the display of the second client-side network node, an updated view of the second model of the web application in dependence on a second scroll operation. The second input event identifies the second scroll operation for the second model of the web application. The second scroll operation is different from the first scroll operation.

Computer program products which can execute the methods presented above are also described herein (e.g., a non-transitory computer-readable recording medium having a program recorded thereon, wherein, when the program is executed by one or more processors the one or more processors can perform the methods and operations described above).

Other aspects and advantages of the present technology can be seen on review of the drawings, the detailed description, and the claims, which follow.

BRIEF DESCRIPTION OF THE DRAWINGS

The technology will be described with respect to specific embodiments thereof, and reference will be made to the drawings, which are not drawn to scale, described below.

FIGS. 6A and 6B present server-side operations to implement active co-browsing of web applications.

FIGS. 10A, 10B, 10C, 10D, 10E, 10F, 10G, 10H, 10I, 10J and 10K present functions of the collaboration system to make a follower as a leader of the collaboration session for active co-browsing of web applications.

DETAILED DESCRIPTION

Figure 1:
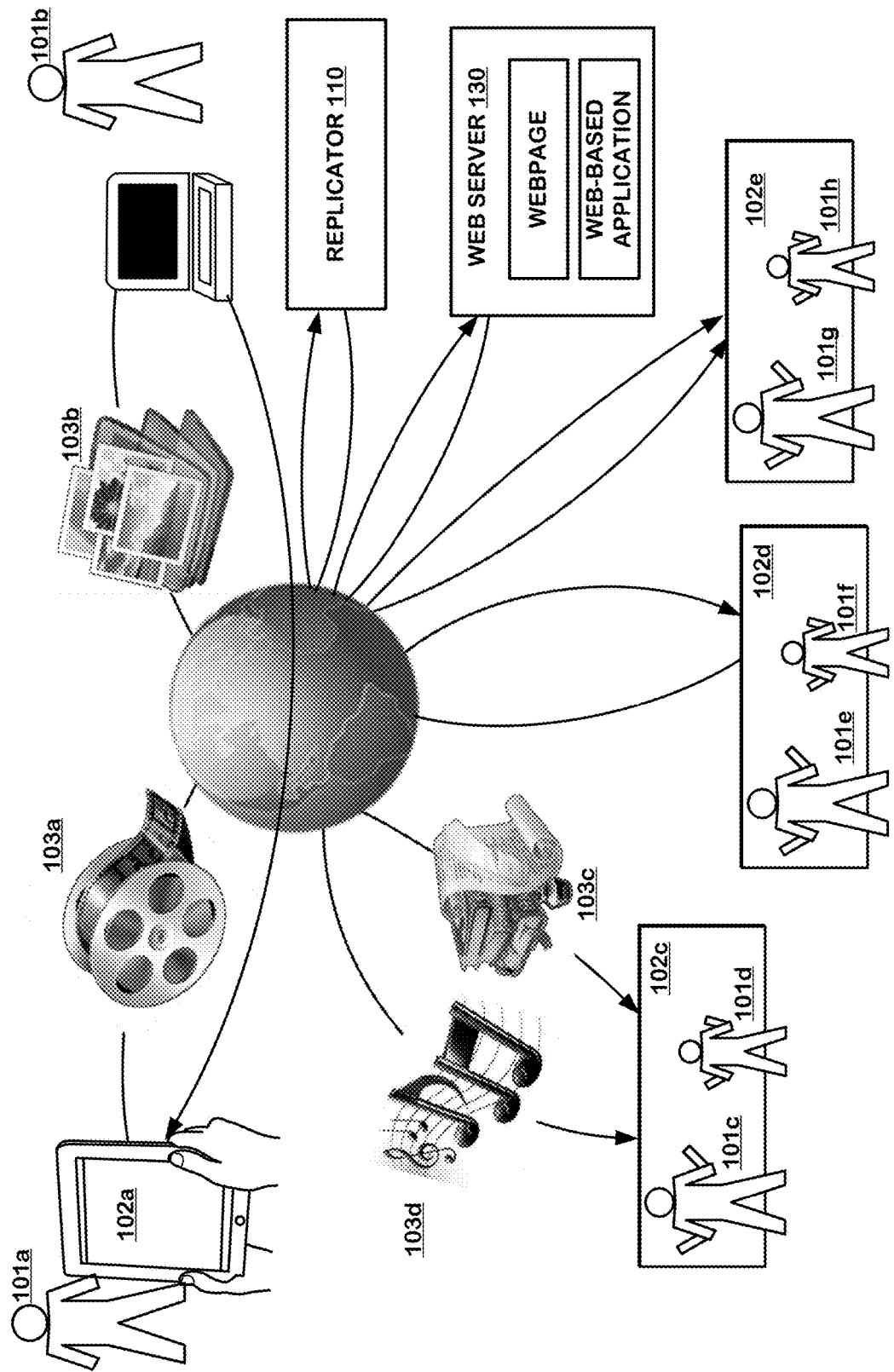
FIGS. 1 and 2 illustrate example aspects of a system implementing active co-browsing of web applications in a collaboration session.

A detailed description of embodiments of the present technology is provided with reference to FIGS. 1-12.

The following description is presented to enable a person skilled in the art to make and use the technology, and is provided in the context of a particular application and its requirements. Various modifications to the disclosed embodiments will be readily apparent to those skilled in the art, and the general principles defined herein may be applied to other embodiments and applications without departing from the spirit and scope of the present technology. Thus, the present technology is not intended to be limited to the embodiments shown, but is to be accorded the widest scope consistent with the principles and features disclosed herein.

INTRODUCTION

The technology disclosed is related to co-browsing in a collaboration environment and enables active multi-user or multi-party co-browsing in a collaboration session. Collaboration on a web-based application (or web application), webpage or a website that is not designed for collaborative work is achieved by screen sharing during a collaboration session. This type of collaboration does not allow interaction of users with the web application other than the participant who is sharing the display of the client-side node with other participants in the collaboration session. Therefore, only one participant interacts with the web application during a co-browsing collaboration session.

The existing solutions to incorporate or embed an external website or web application into another website make use of an "Iframe model". Due to security issues, many web applications and webpages do not allow Iframes to be embedded inside the web application or the webpage. In some cases, approval from an administrator is required before an Iframe is permitted to be embedded inside the web application or the webpage. To overcome such restrictions, the technology disclosed includes a collaboration server that includes the logic to access the web application or a web page via a web server. The collaboration server can include a component that is positioned between the client-side nodes and the external web application or the web page. The component retrieves the content from the external website or web application and processes it for display on the client-side network nodes. The technology disclosed implements the co-browsing functionality by: (1) moving the rendering logic of the website or the web application from the client-side nodes to the server-side of the collaboration application (or collaboration system), and (2) implementing an incremental protocol to reconstruct the web application or the web page on the client-side network node by observing changes on the web application or the web page.

The technology disclosed enables co-browsing to be performed on a regular web application or webpage that is not designed for collaborative work or for co-browsing by multiple users at a same time. A participant can enter a URL in a collaboration session, this can result in opening of a web application or a webpage in a virtual workspace. The participant can then initiate the co-browsing functionality to share the web application with other participants. In one implementation, this initiates a leader-follower collaboration model in which participants of the collaboration session start following the leader who initiated the co-browsing session.

The web application or the webpage is rendered in a headless browser session on the server-side network node. A headless browser session is rendered in a web browser without a graphical user interface. The web application is then broadcast to all participating clients-side network nodes in the collaboration meeting or collaboration session. The technology disclosed includes logic to allow different participant roles in the collaboration session based on the actions performed by the participants, e.g., one or more participants can follow a leader. In other implementations, more than one participant can lead the collaboration session. The technology disclosed allows participants to collaborate on a web application or a webpage that is not designed for active collaboration.

The technology disclosed provides several advantages related to digital content management, digital content inspection and filtering. The technology disclosed includes logic to implement fine grained business rules to filter digital content from web applications and webpages. For example, images or videos can be filtered out and not transmitted to client-side network nodes. The technology disclosed can use keywords or fine-grained rules to filter out content that matches these keywords or business rules. Images, text or videos that include these keywords can be removed by the collaboration server before broadcasting the web application or the webpage to client-side network nodes. Examples of content that can be removed by the collaboration server include social media related content, tracking related content, etc. It is understood that the technology disclosed can use other techniques to detect content that needs to be removed from the web application or the webpage. For example, trained machine learning-based models can be used to classify content in web applications or in webpages. The content falling in pre-determined classes or categories is filtered and not broadcast to client-side network nodes. The server-side network node can include logic to filter out certain domains so that the participants may not be able to access those domains during an active co-browsing session. The server can also implement whitelisting or other such techniques to only allow access to selected web applications during a co-browsing session. The technology disclosed can implement further fine-grained inspection rules for web applications. As the server-side network node has access to the entire web application or the webpage during the active co-browsing session, content inspection can be performed at the web application or the webpage instead of packet-level inspection in other content inspection techniques such as deep packet inspection. In case of deep packet inspection (DPI), chunks of data from the website or the web application is checked. As the DPI is typically applied at the HTTP packets, the server-side network node is not able to see the actual webpage when processing the data. The co-browsing technology thus provides an alternative to using DPI for content inspection.

The technology disclosed allows serving web applications or webpages that require high computing resources to relatively thin edge devices (i.e., devices with low computing power and/or storage). The technology disclosed can use computing resources available at the server-side network node to access web application and then serve a replicated web application or a replicated webpage to client-side network nodes. The computing devices at the client-side network nodes do not need to have large computing, memory and storage resources to render the web applications, e.g., thin edge devices with limited computing and memory resources can be used.

The technology disclosed can be used to serve web applications or webpages to client-side network that do not have access to a high speed and/or broadband Internet connection. The serve-side network node can serve the replicated web application or webpage over a slow speed network connection to client-side network nodes. The technology disclosed sends a complete replicated model of the web application or the webpage to the client-side network nodes in the beginning of the co-browsing session and then, at periodic intervals or upon updates to the web application, sends only changes to the web application (i.e., deltas) to the client-side network nodes. Therefore, the technology disclosed requires less bandwidth requirements for distributed active co-browsing of web applications. In case the client-side network nodes are connected to collaboration server via a local area network (or a LAN), the client-side network nodes do not require access to the Internet for co-browsing of the web applications or the webpages. The collaboration server can serve the web application to the client-side network nodes over the LAN and therefore, Internet connectivity may not necessarily be required for client-side network nodes.

The co-browsing technology disclosed allows "single leader", "multi leader" and "presentation" modes of co-browsing in a collaboration session. Brief description of these modes is presented below.

Single-Leader or Single-Master Mode

In this mode of operation, the client-side network node of the leader can interact with the website or the web application and actions or operations on the website as happening on leader's client-side display are shared and displayed on the displays of client-side network nodes of followers. The technology disclosed provides interactive content sharing between the participants.

The technology disclosed allows a follower participant to become leader and start leading the co-browsing of the web application. The technology disclosed enables sharing content and enables participants to collaborate on a website or a web application which is not designed for such collaboration.

Multi-Leader or Multi-Master Mode

The technology disclosed allows multiple participants to collaborate on the shared the web application at the same time in a multi-leader or multi-master mode. In the multi-leader mode, multiple client side-network nodes can actively collaborate on the web application or the webpage at the same time. Multiple participants can work on different parts of the website and the participants can see what changes are being made or interactions being performed by participants to content of the web application or the webpage. Thus, the technology disclosed can transform a regular web application or a webpage to multi-party enabled for collaboration purpose. The technology disclosed can implement conflict resolution rules to resolve conflicts arising due to inputs from multiple participants. For example, multiple users can enter data or select menu items at the same time during an active co-browsing session. The technology disclosed can resolve such conflicts by automatically selecting one input from the multiple inputs based on a hierarchy of participants. The hierarchy can be defined based on an organizational structure or other pre-defined criteria. The technology disclosed can also present a dialog box to a user (selected based on the hierarchy) to select one input from multiple potentially conflicting inputs from multiple users.

The technology disclosed enables participants to annotate on a co-browsed web application or a webpage. The participants can add text or graphical annotations on the shared web application or a webpage. The technology disclosed enables participants to add note cards or other type of attachments to the shared web application.

The technology disclosed includes user interface elements such as buttons displayed on the client-side network node to allow users to toggle from one mode of co-browsing to another mode of co-browsing. For example, the leader of a co-browsing session can select a user interface element displayed on the client-side network node to switch from single-leader mode to multi-leader mode. Similarly, a user interface element can be selected by one of the participants in the multi-leader mode to switch the meeting to single-leader mode of co-browsing.

Presentation Mode

The technology disclosed allows a co-browsing session to be conducted in a presentation mode. In this mode, the leader of the co-browsing session can pre-record the co-browsing session prior to conducting the co-browsing session. This enables the co-browsing collaboration session to be conducted like a slideshow. The presentation mode enables participants to perform all types of interaction and annotation during the live co-browsing session. Presentation mode allows a leader to script their presentation and navigation of the target web application or the webpage. This scripted presentation is performed live during which the leader can focus their attention to other aspects of the presentation such as discussing other concepts, project ideas, brainstorming, etc. The presentation mode of co-browsing is different from presenting a recorded co-browsing session, because the presentation mode of co-browsing uses live web application or webpage during the presentation. Any data which may be updated by the target web application, or the target webpage will reflect the most recent data during the co-browsing session. For example, if a financials report on a webpage is pre-scripted then when the session is played back, the interactions from the script will take place, however, when the webpage is rendered on the client-side network nodes, it will include the most recent financial data that could potentially be different than the financial data that was rendered when the session was recorded.

A collaboration system, which can be used to implement active co-browsing of web applications in a collaboration system, is described below.

After the description of the key elements of the collaboration system, details of the co-browsing are provided in detail below.

Virtual Workspace

In order to support an unlimited amount of spatial information for a given collaboration session, the technology disclosed provides a way to organize a virtual space termed the "virtual workspace". The virtual workspace can be characterized by a multi-dimensional and in some cases two-dimensional plane with essentially unlimited extent in one or more dimensions for example, in such a way that new content can be added to the space. The content can be arranged and rearranged in the space, and a user can navigate from one part of the space to another. The virtual workspace can also be referred to as a workspace, a canvas or a digital canvas. A virtual workspace can have one or more digital canvases associated therewith.

Web applications or webpages can be displayed on the virtual workspace in a browser. In one implementation, a headless browser is used to render web applications or webpages on the virtual workspace. One or more web applications can be presented on the virtual workspace. The participants of the collaboration session can then review the web application in an active co-browsing session. The web applications or webpages or websites can be considered as digital assets. Digital assets are arranged on (within) the virtual workspace and can be placed at any location. The digital assets can also be documents such as word processor files, spreadsheets, slide decks, notes, program code, etc. Digital assets can also be graphical objects such as images, videos, line drawings, annotations, etc. One or more digital displays in the collaboration session can display a portion of the workspace, where locations on the display are mapped to locations in the workspace.

Viewport

One or more digital displays in the collaboration session can display a portion of the workspace, where locations on the display are mapped to locations in the workspace. A mapped area, also known as a viewport within the workspace, is rendered on a physical screen space. Because the entire workspace is addressable using coordinates of locations, any portion of the workspace that a user may be viewing itself has a location, width, and height in coordinate space. The concept of a portion of a workspace can be referred to as a "viewport." The coordinates of the viewport are mapped to the coordinates of the screen space. The coordinates of the viewport can be changed which can change the objects contained within the viewport and the change would be rendered on the screen space of the display client. Details of the workspace and the viewport are presented in U.S. patent application Ser. No. 15/791,351, entitled, "Virtual Workspace Including Shared Viewport Markers in a Collaboration System," filed on Oct. 23, 2017, now issued as U.S. Pat. No. 11,126,325, which is fully incorporated into this application by reference.

Spatial Event Map

The "unlimited workspace" problem includes the need to track how people and devices interact with the workspace over time. In order to solve this core problem, the technology disclosed includes a so-called "spatial event map". The spatial event map contains information needed to define digital assets and events in a workspace. It is useful to consider the technology from the point of view of space, events, maps of events in the space, and access to the space by multiple users, including multiple simultaneous users.

A spatial event map contains content in the workspace for a given collaboration session. The spatial event map defines arrangement of digital assets on the workspace. The spatial event map contains information needed to define digital assets, their locations, and events in the workspace. A spatial events map system, maps portions of workspace to a digital display e.g., a touch enabled display. Details of workspace and spatial event map are presented in U.S. application Ser. No. 14/090,830, entitled, "Collaboration System Including a Spatial Event Map," filed Nov. 26, 2013, now issued as U.S. Pat. No. 10,304,037, which is fully incorporated into this application by reference.

The spatial event map contains information about the one or more web applications that are included in the workspace. The spatial event map identifies events in the workspace related to the web application that is rendered on the displays of the client-side network nodes. The events are related to the first, second and subsequent models of the web application rendered on the displays of the client-side network nodes. The client-side network node creates a first model of the web application when the web application is accessed for the first time using the uniform resource locator (or URL) provided by a first client-side network node which can belong to a leader of the collaboration session.

The server-side network node provides the spatial event map identifying events in the virtual workspace to client-side network nodes. The spatial event map allows for rendering the first model of the web application in the co-browsing session in the display space on the display of the client-side network nodes. As updates are detected to the web application in response to input events or at periodic intervals, the server-side network node sends update events to spatial event maps at the client-side network nodes. The update events include an update patch which captures the difference between the current state of the web application and the previous state of the web application. The current state of the web application can be represented by a second model of the web application and the previous state of the web application can be represented by the first model of the web application. The spatial event map allows rendering, on the displays of the client-side network nodes, the second model of the web application representing the current state of the web application. As further updates to the web application are captured in subsequent update patches, the update events are received at spatial event map at the client-side network nodes via update events.

The spatial event map also captures other events such as adding new web applications or webpages to the workspace, or adding annotations, text, note cards or other types of inputs to the web application as provided by client-side network nodes. These events are sent to the server-side network nodes. The server-side network then sends update events to client-side network nodes including updates to the web application or the webpage.

Space

In order to support an unlimited amount of spatial information for a given collaboration session, the technology disclosed provides a way to organize digital assets in a virtual space termed as the workspace, which can, for example, be characterized by a 2-dimensional plane (along X-axis and Y-axis) with essentially unlimited extent in one or both of the dimensions, for example. The workspace is organized in such a way that new content such as digital assets can be added to the space, that content can be arranged and rearranged in the space, that a user can navigate from one part of the space to another, and that a user can easily find needed things in the space when it is needed. The technology disclosed can also organize content on a 3-dimensional workspace (along X-axis, Y-axis, and Z-axis).

Events

Interactions with the workspace are handled as events. People, via tangible user interface devices, and systems can interact with the workspace. Events have data that can define or point to a target digital asset to be displayed on a physical display, and an action as creation, modification, movement within the workspace and deletion of a target digital asset, and metadata associated with them. Metadata can include information such as originator, date, time, location in the workspace, event type, security information, and other metadata.

Tracking events in a workspace enables the system to not only present the spatial events in a workspace in its current state, but to share it with multiple users on multiple displays, to share relevant external information that may pertain to the content and the understanding of how the spatial data evolves over time. Also, the spatial event map can have a reasonable size in terms of the amount of data needed, while also defining an unbounded workspace.

The collaboration server can send a spatial event map identifying events in the virtual workspace to the client-side network nodes. The events identified by the spatial event map are related to an internal model or an internal form of the web application which is a replica of the web application as served by the webserver. The changes to the web application are sent as update events to the client-side network nodes. The update events can include update patches. An update patch captures changes to a current state of a web application as compared to a previous state of the web application.

The collaboration server can receive input events for the web application from client-side network nodes and send the input events to webserver serving the web application. The input event can be one of a text input, a menu item selection input, a voice input, an image input, a page scroll input and an annotation input. It is understood that other types of input events can be received by the server-side network node and sent to the webserver. The web application is updated in response to the input events from the client-side network nodes. The following section presents a collaboration system that can be used for active co-browsing of web applications.

Environment

FIG. 1 illustrates example aspects of a digital display collaboration environment. In the example, a plurality of users 101a, 101b, 101c, 101d, 101e, 101f, 101g and 101h (collectively 101) may desire to collaborate with each other in the co-browsing of web applications or websites. The plurality of users may also desire to collaborate with each other in the creation, review, and editing of digital assets such as complex images, music, video, documents, and/or other media, all generally designated in FIG. 1 as 103a, 103b, 103c, and 103d (collectively 103). The participants or users in the illustrated example use a variety of computing devices configured as electronic network nodes, in order to collaborate with each other, for example a tablet 102a, a personal computer (PC) 102b, many large format displays 102c, 102d, 102e (collectively devices 102). The participants can also use one or more mobile computing devices with small format displays to collaborate. In the illustrated example the large format display 102c, which is sometimes referred to herein as a "wall", accommodates more than one of the users, (e.g., users 101c and 101d, users 101e and 101f, and users 101g and 101h).

In an illustrative embodiment, a display array can have a displayable area usable as a screen space totaling on the order of 6 feet in height and 30 feet in width, which is wide enough for multiple users to stand at different parts of the wall and manipulate it simultaneously. It is understood that large format displays with displayable area greater than or less than the example displayable area presented above can be used by participants of the collaboration system. The user devices, which are referred to as client-side network nodes, have displays on which a screen space is allocated for displaying events in a workspace. The screen space for a given user may comprise the entire screen of the display, a subset of the screen, a window to be displayed on the screen and so on, such that each has a limited area or extent compared to the virtually unlimited extent of the workspace.

Figure 2:
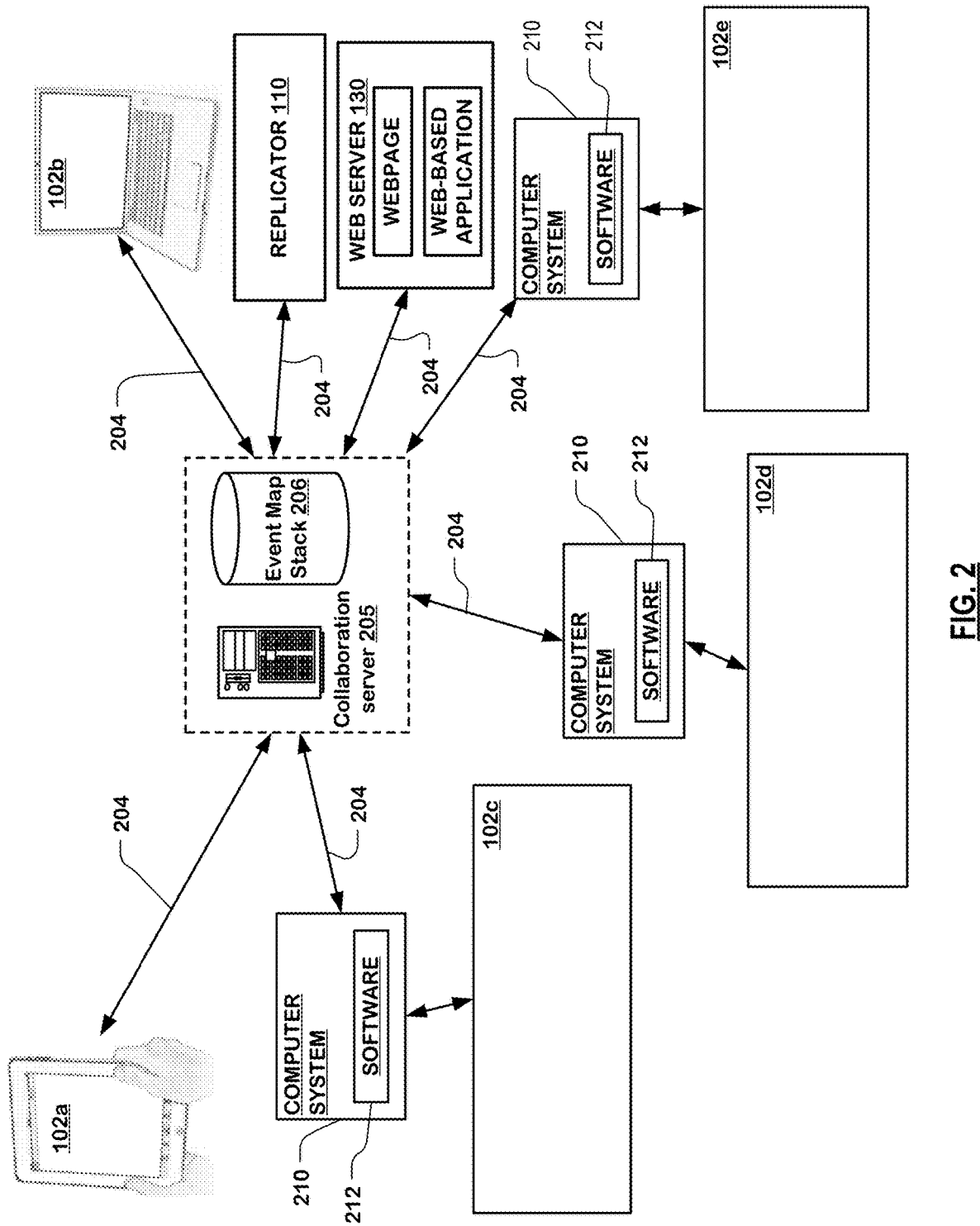

The collaboration system of FIG. 1 includes a replicator 110 which can include the logic to generate a model of a web application or a webpage for serving to the client-side network nodes. A model of the web application corresponds to a current state of the web application. The model of the web application includes a plurality of elements of the web application served by a web server 130 serving the web application. The webserver 130 can serve a web application or a webpage (or a website) including a plurality of elements of the web application or the webpage. FIG. 2 shows a collaboration server 205 and a database 206 that can constitute a server-side network node. The server-side network node is configured with logic to receive the web application or the web page from the web server 130. Similarly, FIG. 2 shows client-side network nodes that can include computing devices such as desktop and laptop computer, hand-held devices such as tablets, mobile computers, smart phones, and large format displays that are coupled with computer system 210. Participants of the co-browsing session can use a client-side network node to participate in an active co-browsing session.

The replicator 110 can generate models of the web application at regular intervals or upon detecting updates to the web application in response to input events from client-side network nodes. The replicator 110 can also include logic to generate a filtered model of the web application corresponding to a model of the web application by filtering out one or more elements from the plurality of elements from the model of the web application. The elements of the web application can include one or more of (i) a script, (ii) a document object model (DOM) comprising a plurality of document object model elements, (iii) a style, (iv) an image, (v) a video, and (vi) information related to any other aspect of the web application etc. It is understood that the web application can comprise other elements that may be filtered by the replicator or included in the replicated model of the web application.

The web application (or web-based application) or a webpage is served by the web server 130 on the server-side network node in a headless mode (or a headless browser). The technology disclosed includes logic implemented on the server-side (such as in the replicator 110 also referred to as a co-browsing service component) to host the web application or the webpage on the server-side network node and observe the changes in the web application or the webpage. The server-side network node includes logic to capture changes the web application or the web page. In one implementation, the server-side network node periodically captures changes to the web application or the webpage. The changes are captured in the update patches which are then provided to the client-side network nodes so that updated web application (or the current state of the web application) is rendered on client-side nodes.

The technology disclosed allows incorporation of additional services in the co-browsing session, e.g., participants can add annotation to the web application or the webpage. Some additional features of the technology disclosed are presented below.

The technology disclosed allows incorporation of presence awareness to the co-browsed web applications or webpages. In such an implementation, if there are multiple client-side users interacting with the website or adding/editing content to the website or the web application at the same time, the technology disclosed can show awareness indicators. For example, the technology disclosed can display pointers, cursors, highlights, etc. so that participants are aware of who is doing what. This also helps participants to communicate to each other using the web application. The cursors or the pointers can also include an identifier or the name of the participant.

The technology disclosed provides high quality collaboration experience to participants of a collaboration session by providing replicas of the website or the web application to the client-side nodes instead of screen sharing as provided by many existing collaboration systems. Existing screen sharing technologies limit the resolution of the content delivered to the client-side network nodes to the resolution at leader or host's device. The technology disclosed serves content to the client-side network nodes at the resolution of the source web application or the source webpage, which provides a high-quality collaboration experience. This can be important when the collaboration session requires participants to view very high-quality content with very fine details e.g., in film production or production of animated movies. The technology disclosed presents the web application or the webpage to the client-side network nodes using a document object model (or DOM) in a native format. The document object model is a cross-platform and language-independent interface that treats an XML or HTML document in a tree structure wherein each node is an object representing a part of the document. Therefore, the technology disclosed provides native browsing experience on external websites or web applications to participants of a collaboration session.

The technology disclosed allows participants at client-side network nodes to browse a web application or a webpage at their own pace. Therefore, co-browsing can be performed in in-sync or out-of-sync modes in a collaboration session. During in-sync co-browsing, all participants view the same contents from the website. This mode is adapted when a leader is leading the collaboration session and the follower view the content or parts of the web application that the leader is viewing. During out-of-sync browsing, participants may view different content from the same web application or webpage as they are browsing the website at their respective scrolling speeds. The participants using client-side network nodes can interact with different parts of the web application or the webpage at the same time.

When the participants interact with a web application, the respective client-side network nodes generate input events. The technology disclosed includes logic to pass the client-side input events to the server-side for further processing. Some input events (such as page scroll event) on the client-side nodes are processed locally. Thus, technology disclosed enables participants to get native browsing experience. In some collaboration modes, such as in leader-follower mode, the client-side nodes display the parts of the website that the leader is browsing. Therefore, in this mode, the technology disclosed can provide in-sync scrolling to participants of the collaboration session.

The website or the web application that is shared during a collaboration session is under the control of the server-side component or co-browsing component. During an on-going co-browsing session all changes (or all essential changes) in the web application or the webpage such as DOM changes are controlled by the server-side component. The master session of the website or the web application is executing at the server-side network node.

In one implementation, the server-side network node includes logic to store some content from the website or the web application at the server-side network node. The server-side network node then updates the web application or the webpage that is served to the client-side network nodes such that client-side network nodes access the downloaded resources from the server-side storage instead of accessing those resources from the remote webserver. In such an implementation, the server-side component such as the co-browsing service component can act as a proxy. Examples of content that can be downloaded and stored can include images, videos, etc. The web application or the webpage when rendered on the client-side network nodes may not contain some content such as videos or images that are removed from the web application or the webpage when it is delivered to the client-side node.

The technology disclosed can implement filtering or other business rules to decide which content to send to the client-side network nodes. Examples of content that can be filtered by the server side include social media related content or tracking related content, etc. The server-side network node can also apply whitelisting in which only the allowed domains (web applications or webpage) are available to client-side nodes for browsing.

The technology disclosed provides a unified access control to media content on web applications or webpages. The technology disclosed allows application of other network rules to the co-browsing session. For example, this implementation of the technology disclosed allows clients-side network nodes to get access to intranet resources, or allows client-side network nodes to access certain web applications or webpages from a local network. The technology disclosed allows changing network policies and/or include additional restrictions. These additional features are provided by the technology disclosed because in the co-browsing technology disclosed, the browsing is happening at the server-side and not at the edge or client devices. Therefore, the technology disclosed can be considered as a security domain in which the co-browsing is provided to the client-side nodes.

The technology disclosed also allows access to web applications or webpages to edge devices that do not have access to the Internet. The active co-browsing technology enables edge devices to access resources at the server-side network node. The server-side network node can enforce browsing or security policies using the co-browsing technology disclosed.

The technology disclosed also allows serving websites or web applications that require high computing resources to relatively thin edge devices (i.e., devices with low computing power and/or storage). The technology disclosed can use computing resources available at the server-side to access the web application or the webpage and then serve the replica of the web application or the webpage to thin edge devices.

In addition to the filtering that can be applied to media or other types of content, the technology disclosed allows using fine grained rules to the web applications or webpages. Such rules can be applied to document object model (or DOM) structure at the co-browsing server. Rules can be applied to any element of DOM including styles, and other information contained in the DOM.

In case of deep packet inspection (DPI), chunks of data from the website or the web application is checked. As the DPI is typically applied at the HTTP packets, the server-side network node is not able to see the actual page when processing the data. The rules that apply to a complete web application or a webpage cannot be applied in such inspection techniques. In the co-browsing technology, the server-side network node can inspect the website or the web application at the server-side and therefore, provide an alternative to using DPI. The system can apply the rules at the server-side network node and then serve the content to client-side network nodes. Therefore, co-browsing provides the ability to inspect content at the web application-level or the webpage-level instead of packet-level inspection.

FIG. 2 illustrates additional example aspects of a digital display collaboration environment. As shown in FIG. 1, the large format displays 102c, 102d, 102e sometimes referred to herein as "walls" are controlled by respective client-side, communication networks 204, which in turn are in network communication with a central collaboration server 205 configured as a server-side physical network node or nodes, which has accessible thereto a database 206 storing spatial event map stacks for a plurality of workspaces. The database 206 can also be referred to as an event map stack or the spatial event map as described above. The replicator 110 can be implemented as part of the collaboration server 205 or it can be implemented separately and can communicate with the collaboration server 205 via the communication networks 204.

As used herein, a physical network node is an active electronic device that is attached to a network, and is capable of sending, receiving, or forwarding information over a communication channel. Examples of electronic devices which can be deployed as network nodes, include all varieties of computers, workstations, laptop computers, hand-held computers and smart phones. As used herein, the term "database" does not necessarily imply any unity of structure. For example, two or more separate databases, when considered together, still constitute a "database" as that term is used herein.

The application running at the collaboration server 205 can be hosted using software such as Apache or nginx, or a runtime environment such as node.js. It can be hosted for example on virtual machines running operating systems such as LINUX. The collaboration server 205 is illustrated, heuristically, in FIG. 2 as a single computer. However, the collaboration server's (205) architecture can involve systems of many computers, each running server applications, as is typical for large-scale cloud-based services. The collaboration server's (205) architecture can include a communication module, which can be configured for various types of communication channels, including more than one channel for each client in a collaboration session. For example, with near-real-time updates across the network, client software can communicate with the server communication module using a message-based channel, based for example on the WebSocket protocol. For file uploads as well as receiving initial large volume workspace data, the client software 212 (as shown in FIG. 2) can communicate with the collaboration server 205 via HTTPS. The collaboration server 205 can run a front-end program written for example in JavaScript served by Ruby-on-Rails, support authentication/authorization based for example on OAuth, and support coordination among multiple distributed clients. The collaboration server 205 can use various protocols to communicate with client-side network nodes and webserver 130. Some examples of such protocols include REST-based protocols, low latency web circuit connection protocol and web integration protocol. Details of these protocols and their specific use in the co-browsing technology is presented below. The collaboration server 205 is configured with logic to record user actions in workspace data, and relay user actions to other client-side network nodes as applicable. The collaboration server 205 can run on the node.JS platform for example, or on other server technologies designed to handle high-load socket applications.

The database 206 stores, for example, a digital representation of workspace data sets for a spatial event map of each session where the workspace data set can include or identify events related to objects displayable on a display canvas, which is a portion of a virtual workspace. A workspace data set can be implemented in the form of a spatial event stack, managed so that at least persistent spatial events (called historic events) are added to the stack (push) and removed from the stack (pop) in a first-in-last-out pattern during an undo operation. There can be workspace data sets for many different workspaces. A data set for a given workspace can be configured in a database or as a machine-readable document linked to the workspace. The workspace can have unlimited or virtually unlimited dimensions. The workspace data includes event data structures identifying digital assets displayable by a display client in the display area on a display wall and associates a time and a location in the workspace with the digital assets identified by the event data structures. Each device 102 displays only a portion of the overall workspace. A display wall has a display area for displaying objects, the display area being mapped to a corresponding area in the workspace that corresponds to a viewport in the workspace centered on, or otherwise located with, a user location in the workspace. The mapping of the display area to a corresponding viewport in the workspace is usable by the display client to identify digital assets in the workspace data within the display area to be rendered on the display, and to identify digital assets to which to link user touch inputs at positions in the display area on the display.

The server 205 and database 206 can constitute a server-side network node, including memory storing a log of events relating to digital assets having locations in a workspace, entries in the log including a location in the workspace of the digital asset of the event, a time of the event, a target identifier of the digital asset of the event, as well as any additional information related to digital assets, as described herein. The server 205 can include logic to establish links to a plurality of active client-side network nodes (e.g., devices 102), to receive messages identifying events relating to modification and creation of digital assets having locations in the workspace, to add events to the log in response to said messages, and to distribute messages relating to events identified in messages received from a particular client-side network node to other active client-side network nodes.

The logic in the server 205 can comprise an application program interface, including a specified set of procedures and parameters, by which to send messages carrying portions of the log to client-side network nodes, and to receive messages from client-side network nodes carrying data identifying events relating to digital assets which have locations in the workspace. Also, the logic in the server 205 can include an application interface including a process to distribute events received from one client-side network node to other client-side network nodes.

The events compliant with the API can include a first class of event (history event) to be stored in the log and distributed to other client-side network nodes, and a second class of event (ephemeral event) to be distributed to other client-side network nodes but not stored in the log.

The server 205 can store workspace data sets for a plurality of workspaces and provide the workspace data to the display clients participating in the session. The workspace data is then used by the computer systems 210 with appropriate software 212 including display client software, to determine images to display on the display, and to assign digital assets for interaction to locations on the display surface. The server 205 can store and maintain a multitude of workspaces, for different collaboration sessions. Each workspace can be associated with an organization or a group of users and configured for access only by authorized users in the group.

In some alternatives, the server 205 can keep track of a "viewport" for each device 102, indicating the portion of the display canvas (or canvas) viewable on that device, and can provide to each device 102 data needed to render the viewport. The display canvas is a portion of the virtual workspace. Application software running on the client device responsible for rendering drawing objects, handling user inputs, and communicating with the server can be based on HTML5 or other markup-based procedures and run in a browser environment. This allows for easy support of many different client operating system environments.

The user interface data stored in database 206 includes various types of digital assets including graphical constructs, such as image bitmaps, video objects, multi-page documents, scalable vector graphics, and the like. The devices 102 are each in communication with the collaboration server 205 via a communication network 204. The communication network 204 can include all forms of networking components, such as LANs, WANs, routers, switches, Wi-Fi components, cellular components, wired and optical components, and the internet. In one scenario two or more of the users 101 are located in the same room, and their devices 102 communicate via Wi-Fi with the collaboration server 205.

In another scenario two or more of the users 101 are separated from each other by thousands of miles and their devices 102 communicate with the collaboration server 205 via the internet. The walls 102c, 102d, 102e can be multi-touch devices which not only display images, but also can sense user gestures provided by touching the display surfaces with either a stylus or a part of the body such as one or more fingers. In some embodiments, a wall (e.g. 102c) can distinguish between a touch by one or more fingers (or an entire hand, for example), and a touch by the stylus. In an embodiment, the wall senses touch by emitting infrared light and detecting light received; light reflected from a user's finger has a characteristic which the wall distinguishes from ambient received light. The stylus emits its own infrared light in a manner that the wall can distinguish from both ambient light and light reflected from a user's finger. The wall 102c may, for example, be an array of Model No. MT553UTBL MultiTaction Cells, manufactured by Multi-Touch Ltd, Helsinki, Finland, tiled both vertically and horizontally. In order to provide a variety of expressive means, the wall 102c is operated in such a way that it maintains a "state." That is, it may react to a given input differently depending on (among other things) the sequence of inputs. For example, using a toolbar, a user can select any of a number of available brush styles and colors. Once selected, the wall is in a state in which subsequent strokes by the stylus will draw a line using the selected brush style and color.

External Form and Internal Form of the Web Application

Figure 3:
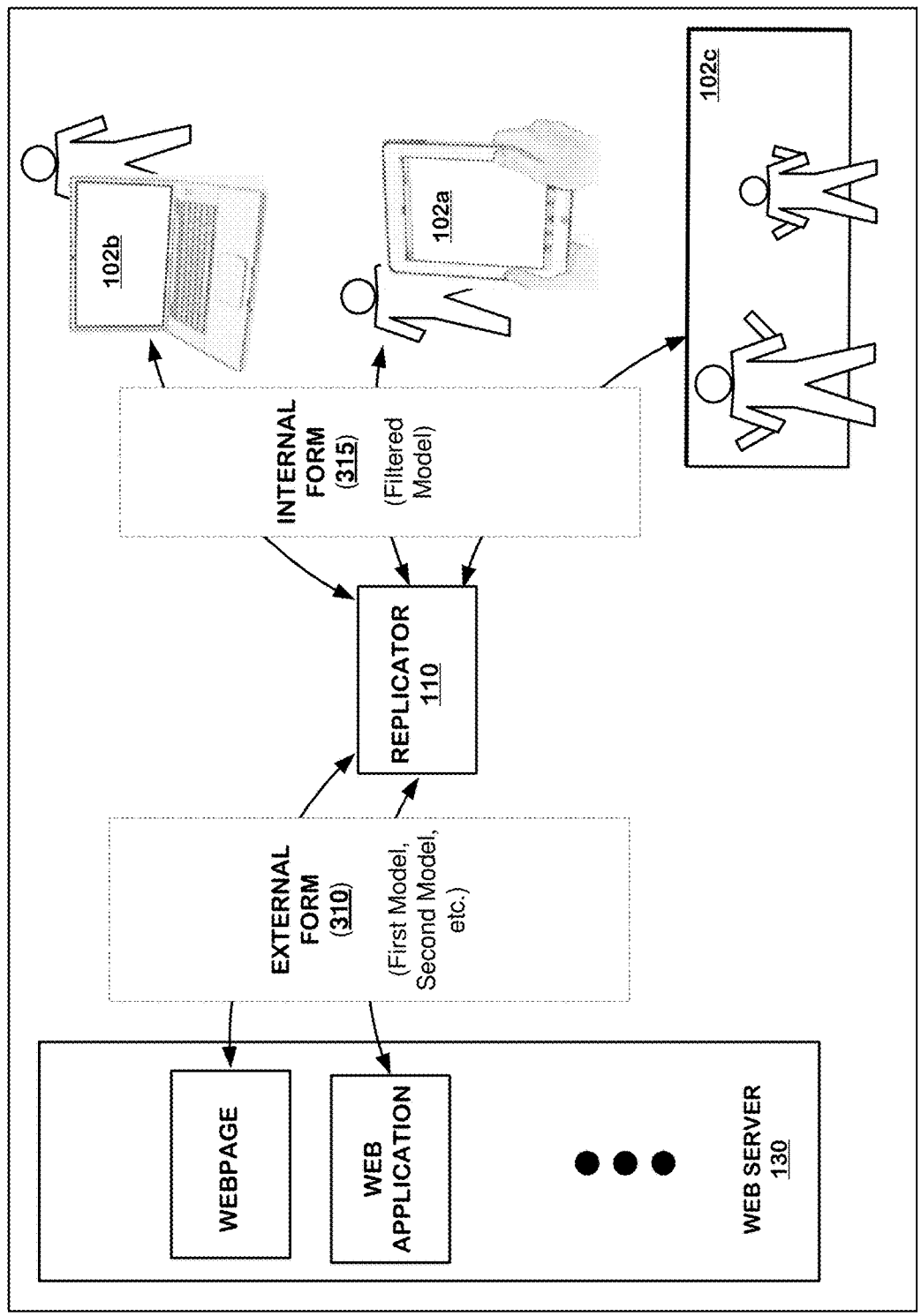
FIG. 3 presents a high-level overview of transforming an external form of the web application to an internal form the web application.

FIG. 3 presents a high-level view of the technology disclosed in which a replicator 110 is positioned in between the web server 130 and the client-side network nodes. The replicator 110 can be part of the collaboration server 205 or it can be implemented separately and operate in communication with the collaboration server 205 and the web server 130. The web application or the web page is served by the web server 130 at the server-side network node in headless mode. In a headless mode, the browser includes no user interface. Therefore, the web application or the webpage is rendered without any user interface of the browser.

The replicator 110 includes logic to transform the web application from an external form 310 to an internal form 315. The external form 310 of the web application or the webpage is a form in which it will be rendered on a browser or at the server-side network node. The external form 310 of the web application is also referred to as a model of the web application in this text. The model can be generated at regular intervals or upon updates to the web application when input events received from client-side network nodes are applied to the web application. A model of a web application or a web page captures a current state of the web application or the webpage. The technology disclosed generates a first model of the web application at the start of the active co-browsing session. The replicator transforms the first model of the web application to an internal form 315. The collaboration server sends the internal form of the model of the web application to the client-side network nodes.

The technology disclosed can render the internal form 315 or replica of the web application in a passive mode. For example, the website rendered on the client-side network node has no scripts or custom logic. The server-side network node sends replica of the web application or the webpage to the client-side network nodes. The server-side network node sends elements of the web application or the webpage such as resources, DOM (document object model) elements, styles, images, media content, etc. from the website or the web application in a native browser understandable format to the client-side nodes participating in the co-browsing session. The browsers on the client-side node receive this data and replicate the website on the client-side node by rendering the website or the web application using the data received from the server-side component. The replica website or the web application follows the master website or the web application. The client-side replica communicates with the server-side component rendering the master website or the master web application.

The subsequent models of the web application i.e., a second mode, a third model and so on are generated at regular intervals or upon application of inputs, received from client-side network nodes to the web application. For each of the subsequent models, the replicator 110 can generate an update patch using a difference the current model and the previous model. The collaboration server 205 can send an update event including the update patch to the client-side network nodes. The spatial event map at receives the update event including the update patch and renders the current model of the web application on the display of the client-side network node.

Filter rules can be applied to these subsequent models to remove content. Therefore, the internal form 315 of the web application or the webpage is also referred to as a filtered model. The collaboration server can send the same model as the first, second, or subsequent models of the web application to the client-side network nodes. However, the replicator 110 can also include logic to filter out some elements from the first model of the web application before sending this out to client-side network nodes. The filtering can be performed based on some filter rules or business rules. For example, selected images, videos, text and/or other elements of the model can be removed based on filter rules. The resulting model is referred to as a filtered model. The replicator 110 can include logic to take out some elements from the master web application or the master webpage rendered at the server-side network node. The master web application or the master webpage is the model of the web application or the web page representing current state of the web application or the webpage. Example of elements that can be filtered out include active elements such as scripts, custom code and other resources or content as desired. This architecture enables co-browsing the websites or web applications in a secured way. The security policy can be implemented at the server-side. Such policy can for example, include rules for accessing content on web applications or web pages. Additionally, this architecture enables the collaboration sessions to collaborate web applications or web pages that can only be accessed by the server-side network node. The filtering of web applications or webpages at the server-side network node enables operation of web applications and webpages on client-side network nodes in a passive mode. For example, the web application or the webpage rendered on the client-side includes no scripts or custom logic. Active scripts or custom logic in the web applications can be filtered out by the collaboration server thus allowing the web applications and webpages to render on the client-side network nodes in a passive manner. This feature also enhances security of the collaboration system by ensuring no active scripts or custom code is sent to client-side network nodes.

The web application or the webpage on the client-side network nodes is a replica that can be considered as a presentation layer. However, the web application or the webpage on the client-side node captures all input events. The technology disclosed does not process all input events locally at the client-side nodes. Most of the input events from the client-side nodes are sent to the server-side network node. Some events such as page scroll operations can be performed locally to allow different user at separate client-side network nodes to browse the web application or the webpage at their respective pace.

The above-described architecture of the co-browsing technology allows connecting multiple client-side network nodes to the server-side network node. Multiple client-side network nodes are connected to the server-side network node to display or render the same website or the same web application. The clients are connected to the same session of the web application or the webpage. The technology disclosed enables co-browsing in a manner that all participants in a collaboration session who join the co-browsing session are connected to the same session of the website or the web application. This is because the website or the web application is accessed by the replicator 110 or another server-side component (such as co-browsing service component) and then broadcast to client-side network nodes. This architecture enables the technology disclosed to achieve scalability and thus the number of participants can be increased in the collaboration session without having any impact on performance or degradation of user experience.

Access Credentials

When participants co-browse a web application or a webpage in a collaboration session, the access credentials of the leader (in a leader-follower collaboration pattern) are applied when accessing the website or the web application. In one implementation, the server-side component includes logic to not broadcast the access credentials of the leader or the master to client-side nodes. In another implementation, the leader or the master in the collaboration session can pause the broadcast when entering the access credentials on the website or the web application. This ensures the login credentials such as username and password of the leader or the master are not displayed to other participants in the collaboration session. In this implementation, the server-side component serves the web application or the web page to the master or the leader's client-side node and the leader can see the website or the web application as she enters her login credentials. The server-side component stops the broadcast of the web application or the webpage to other participants as the leader enters her login credentials by not sending the update patches to client-side network nodes of all participants. The other participants will not be able to see the login credentials and will view the website or the web application in a paused mode. The update patches are only sent to the client-side network node of the leader.

The server-side network node does not send an update event including the update patch to the follower participants' network nodes which means that they do not receive the updates to the web application when the leader is entering the credentials. During this time, the displays of the client-side network nodes of the followers display previous model of the web application or the web page which was displayed prior to the current state of the web application in which the leader is entering login credentials. After the leader accesses the web application, the client-side network nodes of the follower start receiving the update patches.

The server-side network node can also display a message on the client-side nodes of follower participants indicating the co-browsing session is on hold or paused when the leader is entering login credentials. After the leader or the master enters their login credentials, she can click on a user interface element to resume the collaboration session. The server-side network node then restarts broadcast of the web application or the web page to other client-side network nodes of the follower participants.

The access credentials are stored by the web application session. When a new user logs in to the application, the new user will enter her credentials to login to the website or the web application.

Security Features

Existing collaboration applications with screen sharing type of collaboration can include many security issues. For example, the leader can share a web application with other participants in the collaboration meeting using a cell phone or other such device with small format display. The participants can use many different types of devices to participate in the collaboration session. Some devices can have large displays such as large format digital displays. These displays can display additional content or other applications from the leader's device. This can be a security issue as unauthorized or sensitive content can be displayed or shared with participants using traditional screen sharing applications. The technology disclosed overcomes this security issue and provides much tighter security when web applications and webpages are shared amongst multiple participants in a collaboration session. The system includes logic to consider different display sizes at the client-side nodes when broadcasting content from to the client-side network nodes. The system includes logic to limit the broadcast to the viewport of the leader and not show content outside of the viewport of the leader to other participants in the collaboration session.

The system can also include additional security logic to ensure privacy of content in the co-browsing session. For example, the server-side network node includes logic to detect that the co-browsing session is inactive on client-side network node of the leader. The server-side network node can then pause broadcast of the web application to other participants in the collaboration session until the client-side network node of the leader becomes active or ends the co-browsing session after a pre-defined time of inactivity (e.g., 5 minutes, 8 minutes, 10 minutes etc.). The server-side network node can stop sending update events including update patches to client-side network nodes until the leader re-starts the collaboration session.

Broadcast from Server-Side Node to Clients-Side Nodes

The technology disclosed efficiently broadcasts the web applications or the web pages from the server-side network node to the client-side network nodes. To achieve this, the server-side network node does not broadcast (or transfer) the entire website or the web application to the client-side nodes. The technology disclosed broadcasts content from the server-side network node to the client-side network nodes in an incremental manner. In one implementation, the technology disclosed translates the DOM representation of the web application or the webpage from a live co-browsing session of the web application or the webpage to JSON (JavaScript Object Notation) representation. The system then applies a "diff algorithm" between previous JSON representation of the DOM and the current DOM representation of the web application or the webpage. The diff algorithm identifies the change in the current state of the website with respect to a previous state of the website. This change is then captured using JSON patch protocol which translates the changes to a JSON patch. The system then broadcasts this patch to client-side nodes of the participants. JSON is a data interchange format that uses human-readable text to store and transmit data objects. The data objects can consist of attribute-value pairs and arrays in the JSON format.

The client-side network node includes logic to render the updated web application or the update webpage on their respective displays using the JSON patch received from the server-side network node. It is understood that the technology disclosed can use other techniques to capture changes in the web applications and webpages and use other available protocols to send these changes to the client-side network nodes. In other implementations, the technology disclosed can use other JSON protocols without the semantics of the JSON patch to capture the changes in a current state of the web application and the previous state of the web application.

The technology disclosed renders a web application or a webpage at the server-side network node and broadcasts the website to client-side network nodes, which then render the web application or the website at their displays. The server-side component (such as replicator 110) captures changes in the web application or the webpage and sends the changes in an update patch to client-side network nodes. The client-side nodes receive these update events including update patches and update the web applications or webpages at their end.

Communication Protocols

The technology disclosed can use three types of communication protocols.

REST-Based Protocol

The technology disclosed can use a first representational state transfer or REST-based protocol to control the distributed active co-browsing sessions. REST protocol describes a uniform interface between decoupled components of a client-server architecture. The technology disclosed uses REST-based protocol for communication between the server-side network node and client-side network nodes. For example, technology disclosed can use the REST-based protocol to start the collaboration session, for participants to join a collaboration session, to place a collaboration session on hold, etc.

Low Latency Web Circuit Connection Protocol

The technology disclosed includes a second "low latency web circuit connection" communication protocol between every client-side network node in the session and the server-side node. There are two purposes for including this protocol. The first purpose is to use this protocol to communicate (or broadcast) incremental page changes to client-side network nodes. The second purpose is to use this protocol to send control events (or input events) from client-side network nodes to the server-side network node.

The above mentioned two protocols are used for communication between system components in a co-browsing session.

The technology disclosed includes a third protocol to integrate the co-browsing system with a collaboration system as describe below.

Web Integration Protocol

The technology disclosed can include a third "web integration" protocol to embed or integrate a co-browsing system with other systems. This protocol can be used to provide integration between the co-browsing system and a collaboration system. This communication protocol allows sending events to the collaboration system so that the co-browsing session can access services from the collaboration system. This protocol can be used for example, for getting native feel and look for the co-browsing application. This protocol can be used to observe various types of events that occur in the collaboration system during a collaboration session. Further details and examples of events are presented below.

Events in a Co-Browsing Collaboration Session

The technology disclosed provides one or more shared objects to client side-network nodes in the collaboration session. A shared object can represent a state of the co-browsing session. A state of the shared object can indicate the current status of the co-browsing session. For example, if the co-browsing session is paused, the state of the shared object is set as "sessionPaused". The state of the shared object can also indicate a mode of the current co-browsing session i.e., whether it is a single-leader co-browsing session, a multi-leader co-browsing session or a presentation co-browsing session. The shared object is updated when an event occurs that leads to a change of the state. The object can also be used to keep track of any information that client may want to know or to display to a participant in workspace in real-time. The client can listen and respond to the following shared state related events that are defined in the collaboration system. Some example events are presented below.

Shared State List

This event provides a list of all active (or live) shared objects to client-side network nodes that are members of a workspace (or accessing a workspace) even if the client-side network nodes are not participating the collaboration sessions. This is to notify to the client-side network nodes of the overall list of shared states and participants in the collaboration session.

Start Collaboration on Shared State

This event can begin or start a shared state and allow the client to update the shared state and participants.

Update Shared State

This event is sent to client-side network nodes when shared object changes, a new client-side network node joins a collaboration session, or when a client-side network node leaves a collaboration session.

End Collaboration on Shared State

This event can end a shared state. This event can deregister a client-side network node from the shared state.

Message Payload Properties

The following are some example payload properties that can be included in the messages in the communication protocol.

"type": this property can indicate the type of the state a client-side network node wants to share in a collaboration session. For example, the value of this property can be set as "co-browse" to indicate a co-browsing session. Other examples of values of the type property include modes of a co-browsing session such as "leader-follower", "multi-leader", "presentation", etc.

"targetId": this property can indicate the identity of the workspace to be shared amongst participants of a collaboration session. For example, it can include the browser identifier in a workspace.

"clients": this property can include the list of client-side network node identifiers participating in the co-browsing session.

"data": this property can include the state a client-side network node wants to share. Examples of sub-properties of "data" property can include a session identifier (sessionID) identifying the co-browsing session, a leader identifier (clientID) identifying the client-side network node leading the collaboration session, a session paused (sessionPaused) sub-property identifying that a co-browsing session is paused etc.

System Components

Figure 4:
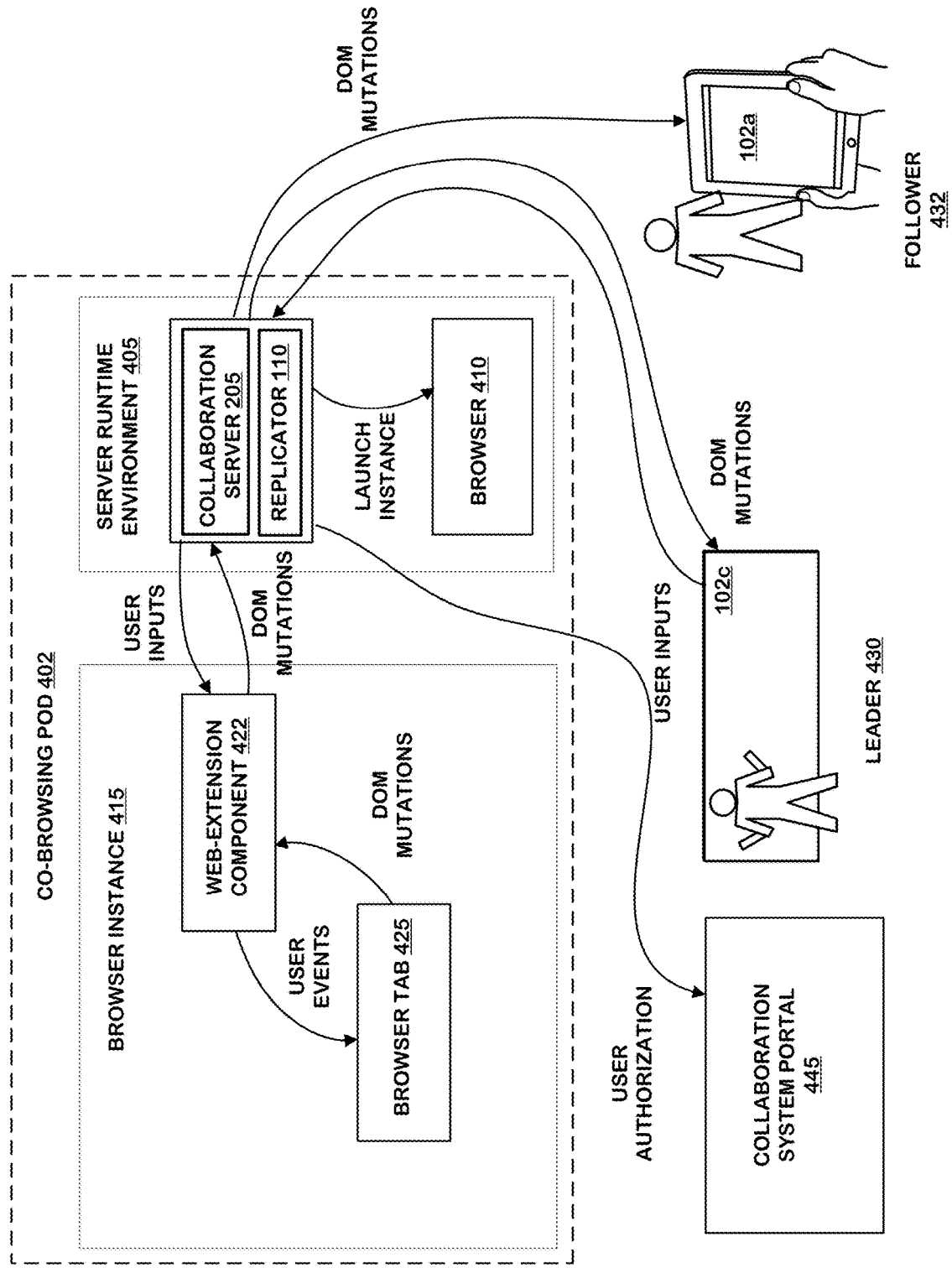
FIG. 4 presents components of the system implementing the active co-browsing of web applications.

FIG. 4 presents high-level system components to implement the distributed active co-browsing of web applications and webpages.

Replicator and Co-Browsing Service Component (Server-Side)

In one implementation, a co-browsing service component) is implemented as part of the collaboration server 205. In other implementations, the co-browsing service component can be implemented separately from the collaboration server 205. The illustration in FIG. 4 assumes that co-browsing service component is implemented as part of the collaboration server 205 and is therefore not shown separately in the server runtime environment. The server-side components such as the collaboration server 205, the replicator 110 and the browser 410 can operate in a server runtime environment 405. A browser instance 415 and the server runtime environment 405 are collectively referred to as a co-browsing POD 402.

A collaboration system portal 445 can be used to authorize and authenticate participants in a collaboration session. A leader 430 and a follower 432 are shown for illustration purposes in FIG. 4. It is understood that the technology disclosed can operate in a multi-leader or multi-master mode as well. There can be more than one follower in the leader-follower mode of operation as shown in FIG. 4.

A co-browsing service component (implemented as part of the collaboration sever 205) can provide the following functionality:

1. Receive input events from client-side network nodes including inputs from client-side network node of a leader of the collaboration session. The input events can be received via a WebSocket communication protocol and are forwarded to a web-extension component 422. The web-extension component 422 (also referred to as a web-extension plugin) is deployed in a web browser 410 and runs in a web browser instance 415 which can be a headless browser instance as mentioned earlier.

2. Maintain the co-browsing session that can consist of a leader-follower state and the JSON DOM from the headless browser instance 415. The co-browsing service component also maintains the communication between browser instance 415 and the client-side network nodes using the WebSocket communication protocol.

3. The co-browsing service component can send the DOM to client-side network nodes and can broadcast a leader's events to all followers in the collaboration session.

Client-Side Co-Browsing Component

The client-side co-browsing component resides in respective client-side network nodes and provides the following functionality:

1. Receive user input and forward user induced events to a backend service through a WebSocket communication protocol.
2. Receive messages from a server-side network node via a WebSocket communication protocol including update patches and re-construct the client-side DOM and display the changed or updated web application or the webpage to the client-side network nodes participant.

Headless Browser Instance

A headless browser instance includes the following functionality. The technology disclosed deploys a web-extension plugin or a web-extension component 422 to a browser 410. The web-extension component 422 interacts with a browser tab 425 in a browser instance 415 to perform the following tasks:

1. Receive user navigation and interactions events that are forwarded from the co-browse service component (or the replicator 110), access the web application or the webpage from the Internet and interact with the page accordingly.
2. Deploy or install the web-extension component 422 to each new browser session 415.
3. Use a mutation observer to monitor DOM mutation events in the browser tab 425. Mutation events are generated in the web browser (i.e., browser tab 425) when changes are made to the web application or the webpage. The changes can occur in response to inputs applied to the web application or the webpage. The web-extension component 422 capture changes in web application or the webpage e.g., DOM changes (or DOM mutations) upon receiving the mutation events. The headless browser instance 415 via the web-extension component 422, then sends JSON patch representing DOM changes back to co-browsing service component which then sends the update patch to co-browse client-side for rendering updated web application or webpage on client-side network nodes.

A new session can start a new chrome headless process which can isolate different sessions and interaction between sessions can be avoided. Responses to headless chrome are cached as assets within a session (sessions are described in more detail below).

Message Sequence for Co-Browsing Sessions

Figure 5:
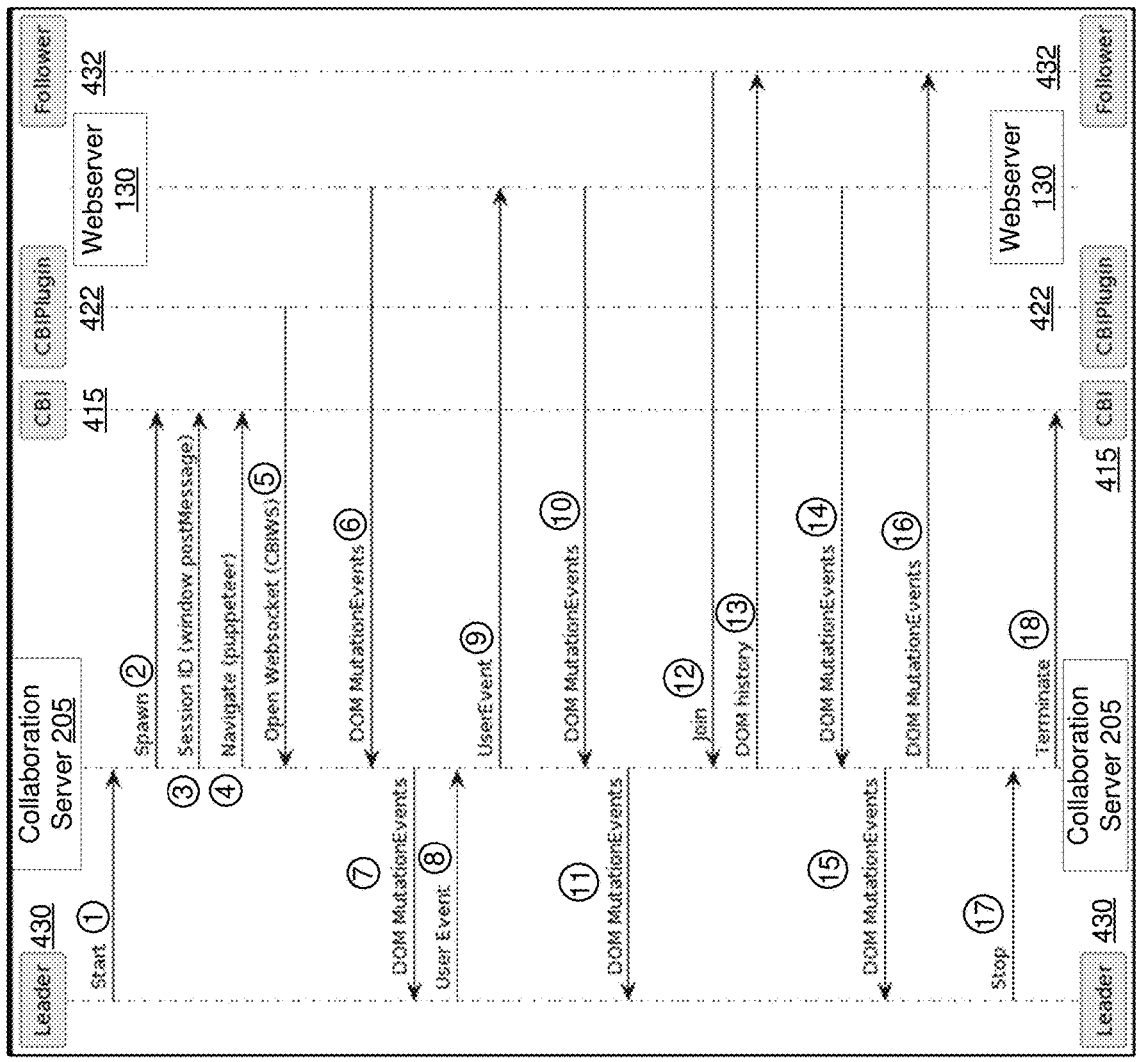
FIG. 5 presents a message sequence diagram illustrating communication amongst various actors and components of the system implementing the active co-browsing of web applications.

FIG. 5 presents a message sequence diagram illustrating communication between various actors and components in a distributed co-browsing collaboration session. The actors include a leader 430 and a follower 432. The components include the collaboration server 205, the co-browser instance (or the headless co-browser instance) 415 (also referred to as a CBI), a co-browser web-extension component (or a web-extension plugin) 422 (also referred to as a CBIPlugin), and a webserver 130. The message sequence diagram of FIG. 5 assumes a leader-follower model of collaboration. It is understood that multi-leader or multi-master collaboration can be conducted using the technology disclosed in a similar manner.

A client-side network node can include logic to determine the workspace leader or follower status based on the shared state received along with other collaboration messages received from the server-side network node. The following description presents some examples of shared state messages that can be implemented by the technology disclosed to conduct the co-browsing session.

A. Start Co-Browsing Session:

A leader client can initiate a co-browsing session. The following is an example sequence of messages when a co-browsing session is initiated.

1. A leader client-side network node 430 starts a co-browsing session by sending a start or startSession (message 1) to the collaboration server 205. The leader client-side network node 430 can register the shared state object with the collaboration server 205, such as by using a "startCollaboration" message.
2. The collaboration server 205 sends a spawn (message 2) to the co-browser instance 415 to start the co-browsing session.
3. The collaboration server 205 sends a session identifier of the collaboration session to the co-browser instance 415 via a sessionID message (message 3) to the co-browser instance 415.
4. The collaboration server 205 send a navigate message (also referred to as a puppeteer) (message 4) to the co-browser instance 415.
5. The web-extension component 422 (CBIPlugin) sends an open WebSocket message (CBIWS) (message 5) to the collaboration server 205. This message establishes a WebSocket communication between the web-extension component 422 (CBIPlugin) and the collaboration server 205. This communication channel is then used during the collaboration session to send updates to the web application or the webpage to the collaboration server 205.

At this point, upon completion of the above five messages, the co-browsing session is established between the leader client-side network node 430 and the web browser instance 415. One or more followers 432 can join the co-browsing session by sending the following message.

B. Join Co-Browsing Session:

A participant (in follower mode 432) can join a co-browsing collaboration session by registering with the shared state object of the collaboration session. The follower 432 sends the following messages to join the collaborative co-browsing session.

1. The follower client-side network node 432 join collaboration (message 12) message to the collaboration server 205. The message can be sent in an event in the spatial event map.
2. The collaboration server 205 sends a DOM history message (message 13) to the follower 432 upon joining the collaboration session. The DOM history can include any updates to the web application or the webpage during collaboration session prior to the follower joining the collaboration session. In one instance, the collaboration server 205 sends the model of the web application as representing the current status of the web application. The web application is then periodically updated when update patches are received from the collaboration server 205 such as shown in message 16 (DOM mutation events).

C. Capture Updates to Web Application and Broadcast Update Patches:

The updates to the web application or the webpage are sent to collaboration server 205 from the webserver 130. The updates are sent as update patches and broadcast to client-side network nodes for rendering updated web application or updated webpage on their displays. The following messages illustrate this process.

1. The webserver 130 sends a "DOM mutation events" message (message 6) to the collaboration server 205 indicating updates to the web application. This message can include an update patch capturing changes to the web application or the webpage.
2. The collaboration server 205 sends the "DOM mutation events" message to the leader 430 (message 7).
3. User inputs are sent to the collaboration server 205 via a "user event" message (message 8) from the leader 430.
4. The collaboration server 205 forwards the "user event" message (message 9) to the web server 130.
5. Changes to the web application or the webpage in response to the user inputs are captured using update patches and forwarded to the collaboration server 205 via "DOM mutation events" message (message 10).
6. The collaboration server 205 sends the "DOM mutation events" message to the leader 430 (message 11).
7. During the co-browsing session, the collaboration server 205 receives updates to the web application via "DOM mutation events" messages such as in message 14.
8. The collaboration server 205 sends the "DOM mutation events" message to the leader 430 (message 15).
9. The collaboration server 205 sends the "DOM mutation events" message to the follower 430 (message 16).
10. The leader 430 can indicate an end to the co-browsing collaboration session via a "stop" message (message 17) to the collaboration server 205.
11. The collaboration server 205 ends the co-browsing collaboration session via a "terminate" message (message 18) to the co-browser instance 415.

The message sequence diagram presented in FIG. 5 shows DOM mutation events being sent from collaboration server to the client-side network nodes belonging to a leader and a follower. However, note that the collaboration server can send and receive other types of events during the co-browsing session such as events indicating that the session is paused, or events related to inputs from client-side network nodes, etc.

Process Flow for Distributed Active Co-Browsing

Figure 6B:
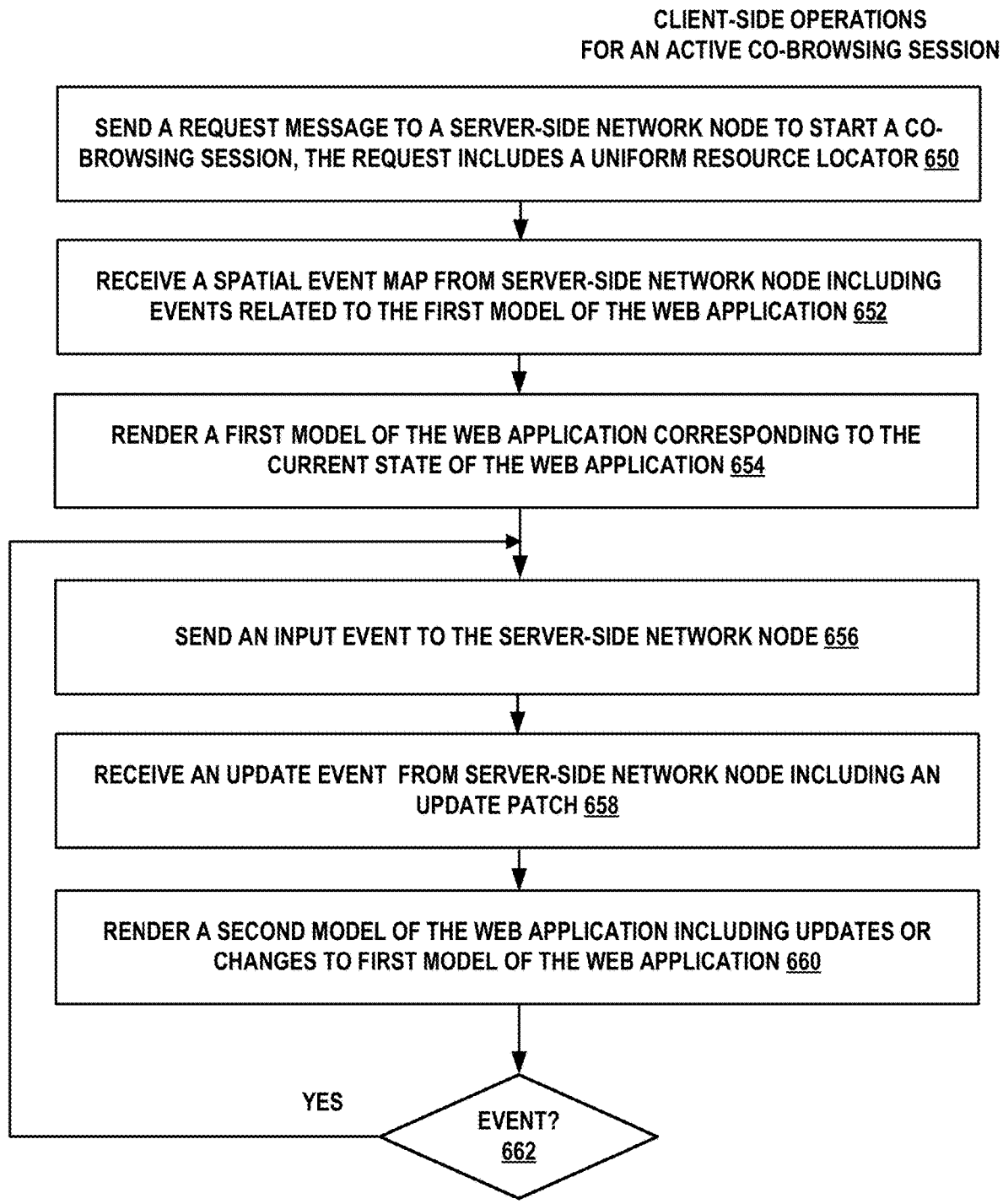

FIGS. 6A to 6B present process flowcharts for active co-browsing of web applications and webpages in collaboration sessions. The flowcharts illustrate logic executed by a server (collaboration server 205), clients (network nodes 102a to 102e), or both. The logic can be implemented using processors programmed using computer programs stored in memory accessible to the computer systems and executable by the processors, by dedicated logic hardware, including field programmable integrated circuits, and by combinations of dedicated logic hardware and computer programs. As with all flowcharts herein, it will be appreciated that many of the steps can be combined, performed in parallel or performed in a different sequence without affecting the functions achieved. In some cases, as the reader will appreciate, a re-arrangement of steps will achieve the same results only if certain other changes are made as well. In other cases, as the reader will appreciate, a re-arrangement of steps will achieve the same results only if certain conditions are satisfied. Furthermore, it will be appreciated that the flow charts herein show only steps that are pertinent to an understanding of the technology, and it will be understood that numerous additional steps for accomplishing other functions can be performed before, after and between those shown.

Server-Side Process for Active Co-Browsing of Web Applications

FIG. 6A presents server-side operations for starting and conducting an active co-browsing session. The server-side network node of a collaboration system hosts the collaboration session between client-side network nodes. Each client-side network node includes a display having a physical display space and a processor.

The process starts when a server-side network node receives a request message from a first client-side network node to start a co-browsing session in a virtual workspace of the collaboration session (operation 602). The collaboration session is established between the client-side network nodes. The server-side network node accesses a web application addressed by a uniform resource locator (URL) of the web application (operation 604). The URL is included in the request message from the first client-side network node.

The server-side network node generates a first model of the web application corresponding to a current state of the web application (operation 606). The server-side network node provides a spatial event map to the client-side network nodes (operation 608). The spatial event map identifies events in the virtual workspace. The events identified by the spatial event map are related to the first model of the web application. The spatial event map allows for rendering the first model of the web application in the co-browsing session. The first model of the web application is rendered in the display space on the display of each of the client-side network nodes.

The server-side network node receives input events from client-side network nodes (operation 610). The server-side network node detects when a new input event is received from one of the client-side network nodes (operation 612). The server-side network node applies the input received in the input event to the current state of the web application (operation 614). To apply the user input to the web application, the server-side network node sends the user input to a web server hosting the web application or the web page. The server-side network node creates a second model of the web application as a result of updates to the current state of the web application. The update to current state of the web application is in response to the input included in the input event and applied to the web application.

The server-side network node generates an update patch using a difference between the second model and the first model of the web application (operation 616). In one implementation, the web server sends the update patch to the server-side network node. The server-side network node sends an update event including the update patch to the client-side network nodes (operation 618). The spatial event map, at respective client-side network nodes, receives the update event and allows rendering of the second model of the web application corresponding to the updated state of the web application in the display space on the display of each of the client-side network nodes.

In one implementation, the server-side network node is further configured with logic to implement operations including periodically creating a new model of the web application to capture updates to the current state of the web application. The current state of the web application is captured by a previous model. The update patch is generated using a difference between the new model of the web application and the previous model of the web application. The generation of the update patch uses the difference between the second model and the first model of the web application. The difference can be captured using a web-extension component (or web-extension plugin) running in a web browser in which the web application is executing and determining changes in states, between the second model and the first model of the web application. The difference between the first model and second model of the web application can be calculated using difference between the elements of the web application including at least the elements of the document object model of the web application.

Client-Side Process for Active Co-Browsing of Web Applications

FIG. 6B presents client-side operations for participating in an active co-browsing session. A client-side network node includes a display having a physical display space.

The process starts when a client-side network node sends a request message to a server-side network node to start a co-browsing session in a virtual workspace (operation 650). The request message includes a uniform resource locator (URL) of a web application. The client-side network node retrieves, from the server-side network node, a spatial event map identifying events in the virtual workspace (operation 652). The events identified by the spatial event map are related to a first model of the web application. The spatial event map allows for rendering the first model of the web application in the co-browsing session (operation 654). The spatial event map is rendered in the display space on the display of the client-side network node.

The client-side network node sends an input event to the server-side network node. The input event includes an input to the first model of the web application (operation 656). The client-side network node receives an update event from the server-side network node (operation 658). The client-side network node includes an update patch. The update patch identifies changes to elements of the first model of the web application. The spatial event map is updated to include the update event. The client-side network node uses the update event to render a second model of the web application showing updates that are applied to the first internal model of the web application in dependence on the input to the first model of the web application (operation 660). The second model of the web application is rendered in the display space on the display of the client-side network node. The client-side network node can send further input event to the server-side network node causing updates to the web application (operation 662). When input events are received the operations 656, 658, and 660 as presented above, are repeated. The input in the input event can be at least one of a text input, a menu item selection input, a voice input, an image input, a page scroll input and an annotation input. Other types of inputs to web applications or web pages can also be processed.

The client-side network nodes can process some events locally without sending the events to the server-side network node. For example, the clients can scroll the web applications or webpages at their own pace on their respective client-side network nodes. In such case, the scroll events are not sent to the server-side network node. In some cases, the scroll event can be sent to the server-side network node. For example, in a leader-follower mode of co-browsing, the scroll input from the leader is sent to the server-side network which then sends the update events to the follower client-side network nodes. The follower client-side network nodes in such case view the same content as displayed on the leader client-side network node's display. Therefore, in this case the all followers are in-sync with the leader and may not scroll the web application on their own pace.

The client-side network nodes can send other types on inputs such as annotation operation performed on the web application. The client-side network nodes can attach documents, videos, images, note cards, etc. to the web application or the webpage. The server receives these inputs and stores the attached documents or annotations or comments, etc. in a database such as the event map stack database 206 or another database accessible to the collaboration server 205.

Computer System

Figure 7:
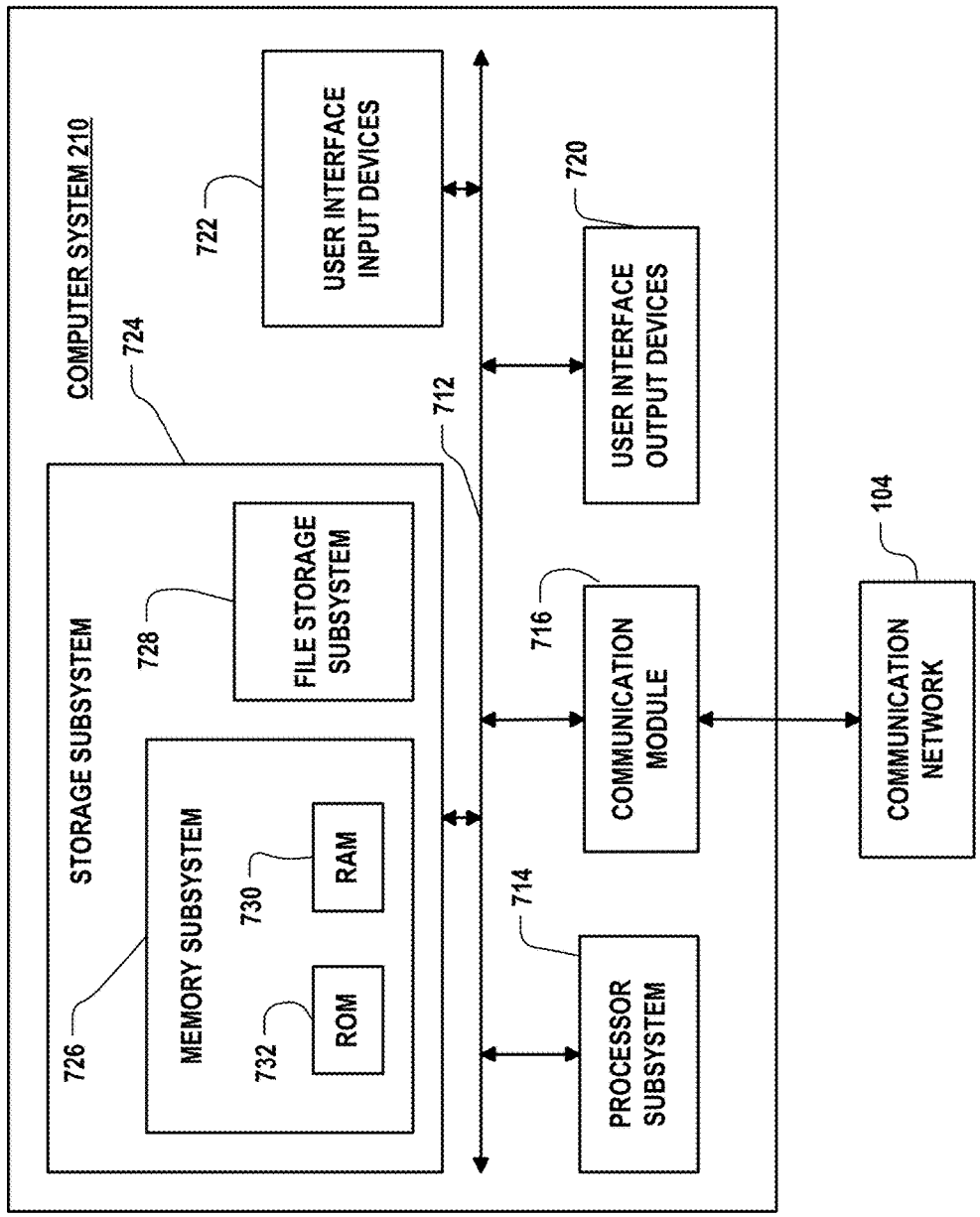
FIG. 7 presents a computer system that implements active co-browsing of web applications.

FIG. 7 is a simplified block diagram of a computer system, or network node, which can be used to implement the client-side functions (e.g., computer system 210) or the server-side functions (e.g., server 205) in a distributed collaboration system. A computer system typically includes a processor subsystem 714 which communicates with a number of peripheral devices via bus subsystem 712. These peripheral devices may include a storage subsystem 724, comprising a memory subsystem 726 and a file storage subsystem 728, user interface input devices 722, user interface output devices 720, and a communication module 716. The input and output devices allow user interaction with the computer system. Communication module 716 provides physical and communication protocol support for interfaces to outside networks, including an interface to communication network 204, and is coupled via communication network 204 to corresponding communication modules in other computer systems. Communication network 204 may comprise many interconnected computer systems and communication links. These communication links may be wireline links, optical links, wireless links, or any other mechanisms for communication of information, but typically it is an IP-based communication network, at least at its extremities. While in one embodiment, communication network 204 is the Internet, in other embodiments, communication network 204 may be any suitable computer network.

The physical hardware component of network interfaces is sometimes referred to as network interface cards (NICs), although they need not be in the form of cards: for instance, they could be in the form of integrated circuits (ICs) and connectors fitted directly onto a motherboard, or in the form of macrocells fabricated on a single integrated circuit chip with other components of the computer system.

User interface input devices 722 may include a keyboard, pointing devices such as a mouse, trackball, touchpad, or graphics tablet, a scanner, a touch screen incorporated into the display (including the touch sensitive portions of large format digital display such as 102c), audio input devices such as voice recognition systems, microphones, and other types of tangible input devices. In general, use of the term "input device" is intended to include all possible types of devices and ways to input information into the computer system or onto computer network 104.

User interface output devices 720 may include a display subsystem, a printer, a fax machine, or non-visual displays such as audio output devices. The display subsystem may include a cathode ray tube (CRT), a flat panel device such as a liquid crystal display (LCD), a projection device, or some other mechanism for creating a visible image. In the embodiment of FIG. 1B, it includes the display functions of large format digital display such as 102c. The display subsystem may also provide non-visual display such as via audio output devices. In general, use of the term "output device" is intended to include all possible types of devices and ways to output information from the computer system to the user or to another machine or computer system.

Storage subsystem 724 stores the basic programming and data constructs that provide the functionality of certain embodiments of the present invention.

The storage subsystem 724 when used for implementation of server-side network-nodes, comprises a product including a non-transitory computer readable medium storing a machine-readable data structure including a spatial event map which locates events in a workspace, wherein the spatial event map includes a log of events, entries in the log having a location of a graphical target of the event in the workspace and a time. Also, the storage subsystem 724 comprises a product including executable instructions for performing the procedures described herein associated with the server-side network node.

The storage subsystem 724 when used for implementation of client side network-nodes, comprises a product including a non-transitory computer readable medium storing a machine readable data structure including a spatial event map in the form of a cached copy as explained below, which locates events in a workspace, wherein the spatial event map includes a log of events, entries in the log having a location of a graphical target of the event in the workspace and a time. Also, the storage subsystem 724 comprises a product including executable instructions for performing the procedures described herein associated with the client-side network node.

For example, the various modules implementing the functionality of certain embodiments of the invention may be stored in storage subsystem 724. These software modules are generally executed by processor subsystem 714.

Memory subsystem 726 typically includes a number of memories including a main random-access memory (RAM) 730 for storage of instructions and data during program execution and a read only memory (ROM) 732 in which fixed instructions are stored. File storage subsystem 728 provides persistent storage for program and data files, and may include a hard disk drive, a floppy disk drive along with associated removable media, a CD ROM drive, an optical drive, or removable media cartridges. The databases and modules implementing the functionality of certain embodiments of the invention may have been provided on a computer readable medium such as one or more CD-ROMs and may be stored by file storage subsystem 728. The host memory 726 contains, among other things, computer instructions which, when executed by the processor subsystem 714, cause the computer system to operate or perform functions as described herein. As used herein, processes and software that are said to run in or on the "host" or the "computer," execute on the processor subsystem 714 in response to computer instructions and data in the host memory subsystem 726 including any other local or remote storage for such instructions and data.

Bus subsystem 712 provides a mechanism for letting the various components and subsystems of a computer system communicate with each other as intended. Although bus subsystem 712 is shown schematically as a single bus, alternative embodiments of the bus subsystem may use multiple busses.

The computer system 210 itself can be of varying types including a personal computer, a portable computer, a workstation, a computer terminal, a network computer, a television, a mainframe, a server farm, or any other data processing system or user device. In one embodiment, a computer system includes several computer systems, each controlling one of the tiles that make up the large format display such as 102c. Due to the ever-changing nature of computers and networks, the description of computer system 210 depicted in FIG. 7 is intended only as a specific example for purposes of illustrating the preferred embodiments of the present invention. Many other configurations of the computer system are possible having more or less components than the computer system depicted in FIG. 7. The same components and variations can also make up each of the other devices 102 in the collaboration environment of FIG. 1, as well as the collaboration server 205 and database 206 as shown in FIG. 2.

Certain information about the drawing regions active on the digital display 102c are stored in a database accessible to the computer system 210 of the display client. The database can take on many forms in different embodiments, including but not limited to a MongoDB database, an XML database, a relational database, or an object-oriented database.

Various Implementations of Co-Browsing of Web Applications

In this section various implementations of a distributed active co-browsing system are presented. The co-browsing of web applications is conducted in a collaboration session in which participants review web applications or webpages. The participants can interact with the web application and provide inputs using their respective client-side network nodes.

Starting and Conducting an Active Co-Browsing Session

FIGS. 8A to 8F present user interface examples to setup and conduct a collaboration session for active co-browsing of web applications and web pages.

Figure 8A:
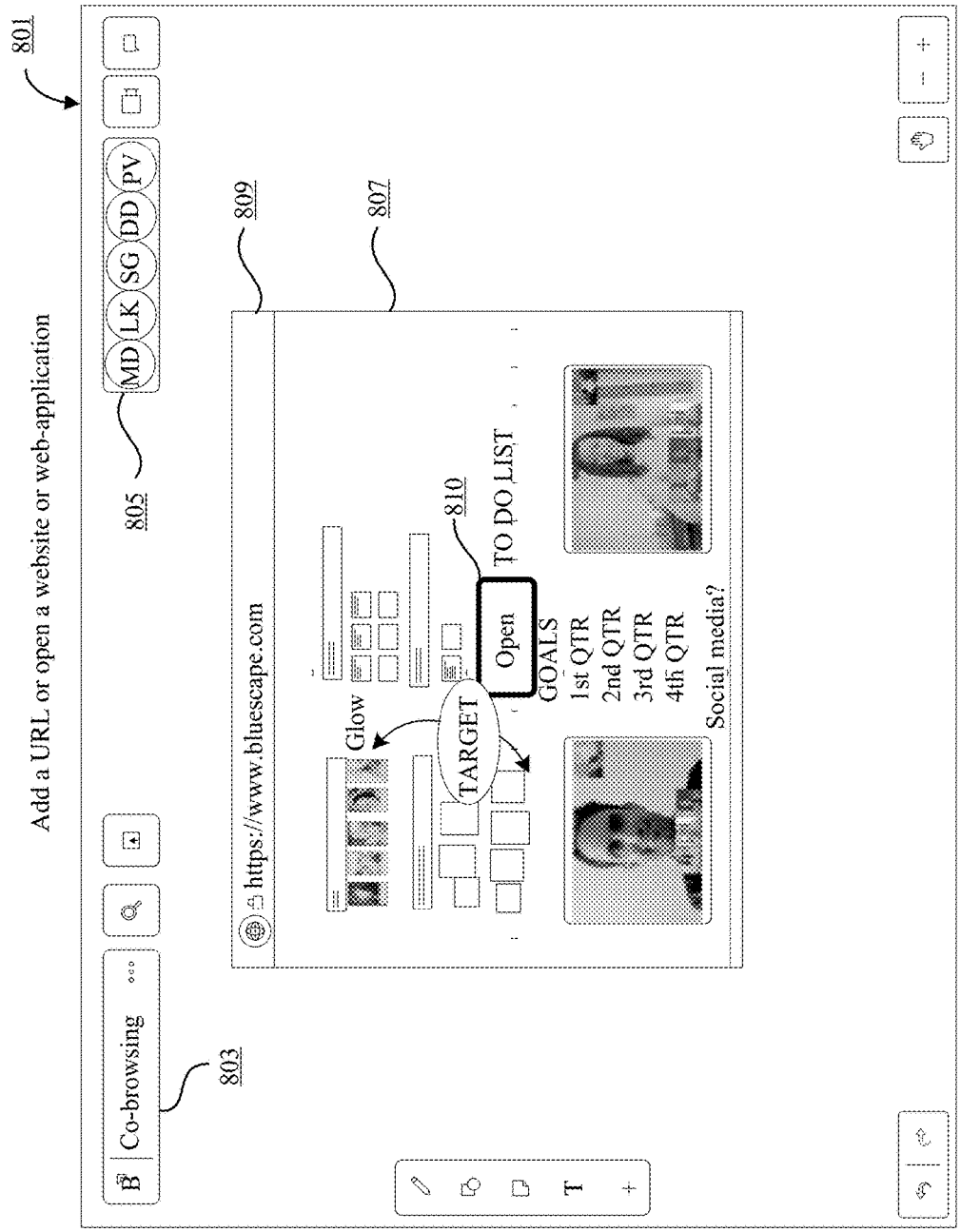
FIGS. 8A, 8B, 8C, 8D, 8E and 8F present functions of the collaboration system for a leader to setup and conduct a collaboration session for active co-browsing of web applications.

Specifically, FIG. 8A presents an example user interface 801. The user interface 801 includes a user interface element 803 that can be selected by a user to start a new co-browsing session. A user interface element 805 shows labels for users participating in the collaboration session. A browser user interface element 807 includes a user interface element 809 in which a user or a participant of the collaboration session can enter a uniform resource locator (or URL) to access a web application or a webpage. The example in FIG. 8A shows that a URL, "www.bluescape.com" is entered in a text input box in the user interface element 809. A button 810, labeled "open" is displayed on the user interface 801. The button 810 can be selected (or pressed) to open the web application addressed by the URL entered in the user interface element 809.

Figure 8B:
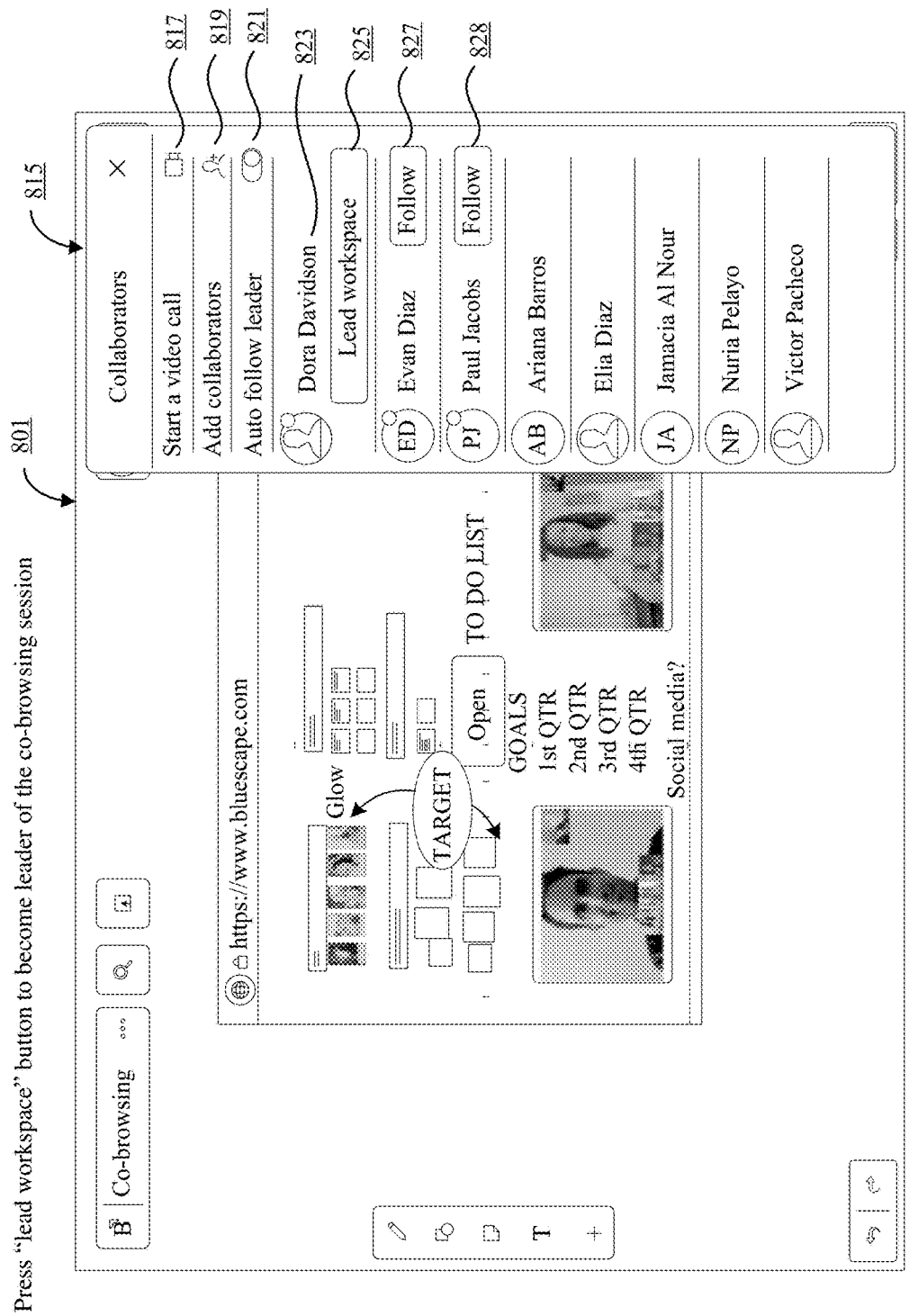

FIG. 8B shows a user interface element 815 displayed on the user interface 801. The user interface element 815 can be displayed by selecting the user interface element 805 as shown in FIG. 8A. The user interface element 815 displays "collaborators" participating in a collaboration session. It also includes buttons or menu items 817, 819 and 821. A user can select the user interface element 817, labeled "start a video call", to start a video call in the collaboration session. Additional users can be added to the collaboration session by selecting user interface element 819, labeled "Add collaborators". The user interface element 821, labeled "auto follow leader", can be selected to automatically follow a leader in the co-browsing session. The user interface element 823 shows the current user's name "Dora Davidson" and includes a button 825, labeled as "lead workspace". The user can select the button 825 to become a leader in a co-browsing session. The user interface elements show which participants are following the leader. In the example shown in FIG. 8B, two participants "Evan Diaz" (827) and "Paul Jacobs" (828) are following the leader in the co-browsing session.

Figure 8C:
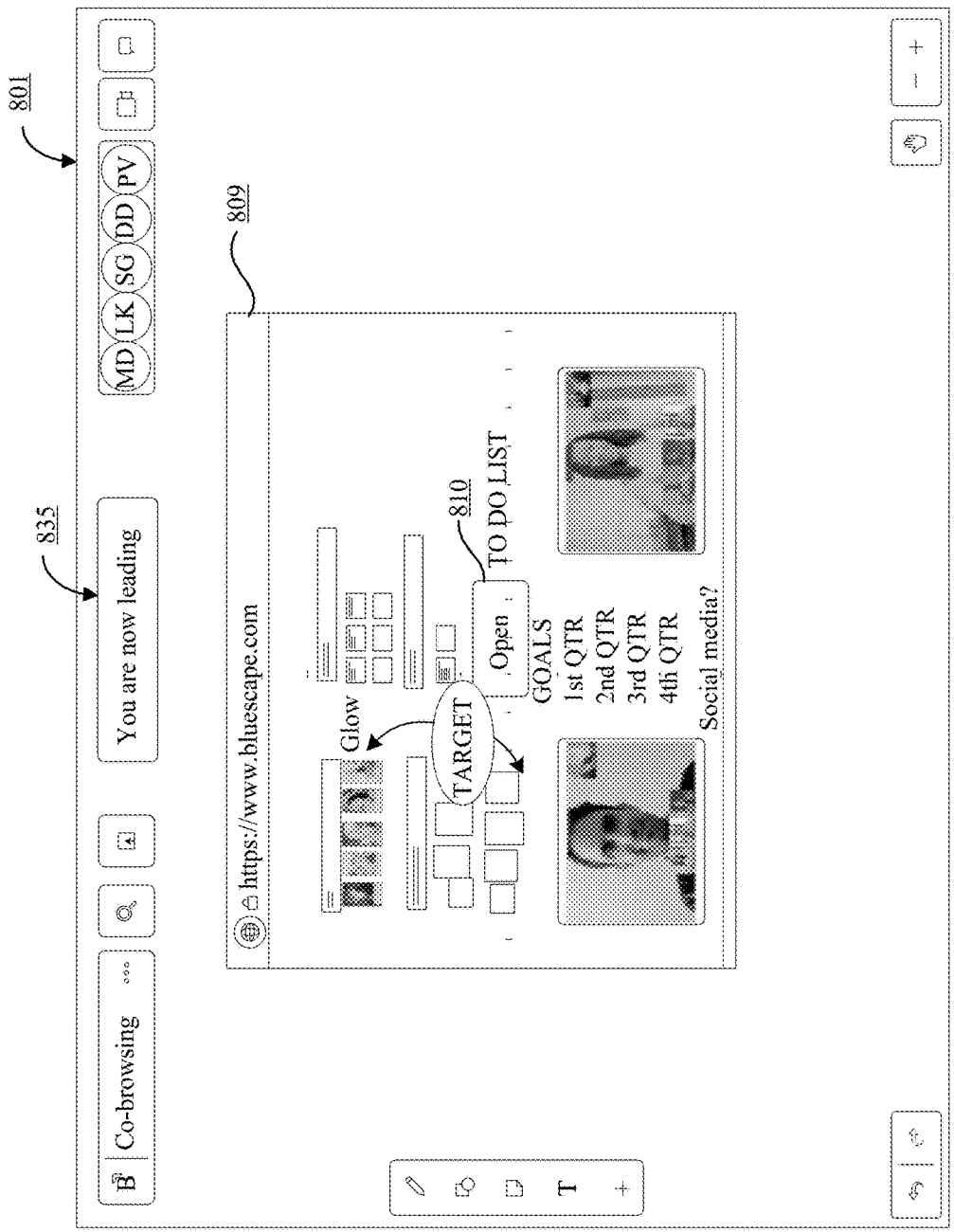

FIG. 8C shows the user interface 801 including a title "you are now leading" (835) displayed at the top. This user interface is displayed on the display of the client-side network node of the leader of the co-browsing session. This allows the leader to know when she is leading the co-browsing session during the collaboration session. The leader can select the "open" button 810 to access the web application or the webpage addressed by the URL written in the user interface element 809.

Figure 8D:
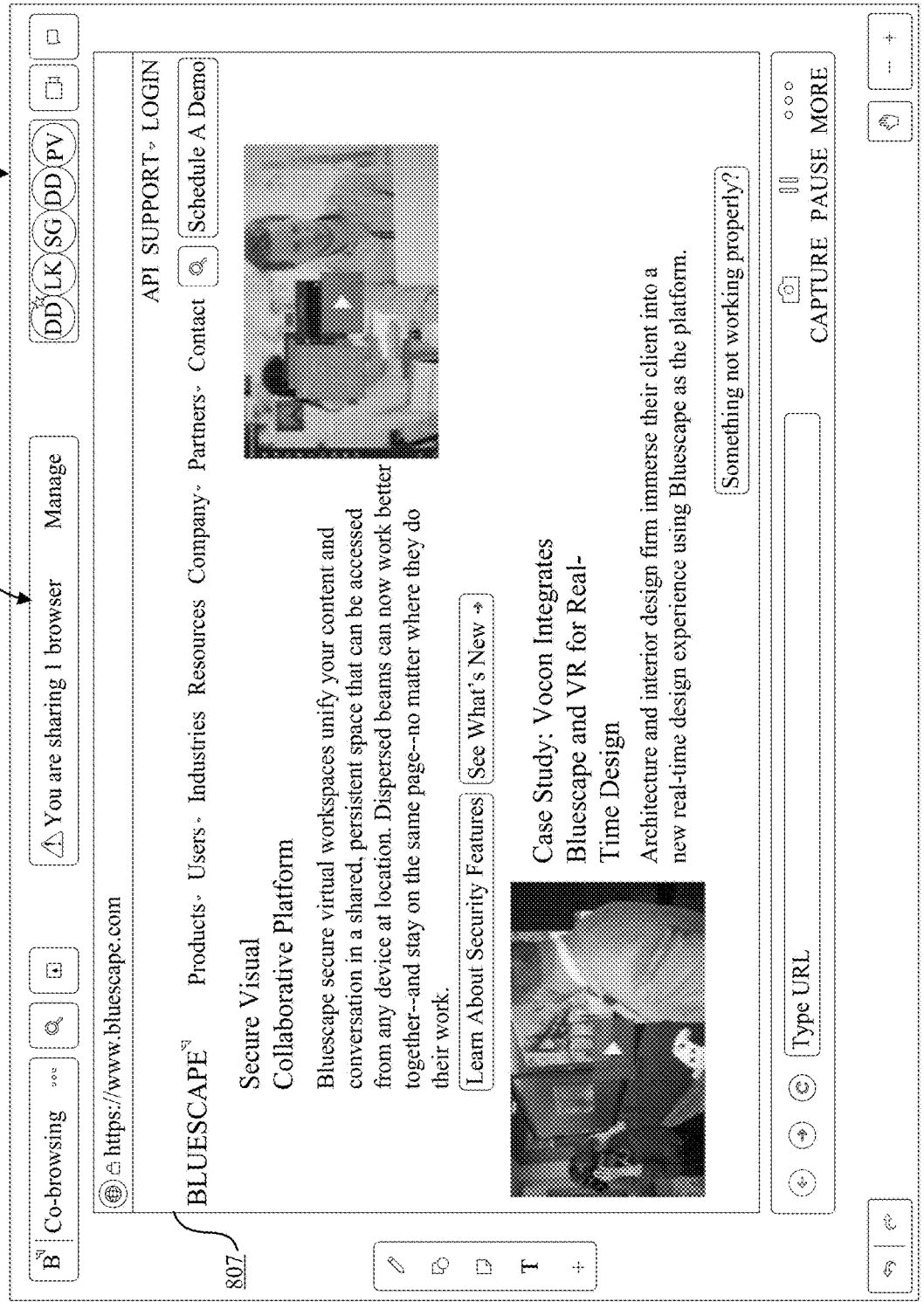

FIG. 8D presents the user interface 801 with the webpage addressed by the URL opened and displayed in the browser user interface element 807. A user interface element 840 displays, on the user interface 801, to the leader of the co-browsing session that she is sharing one browser with followers in the collaboration session.

Figure 8E:
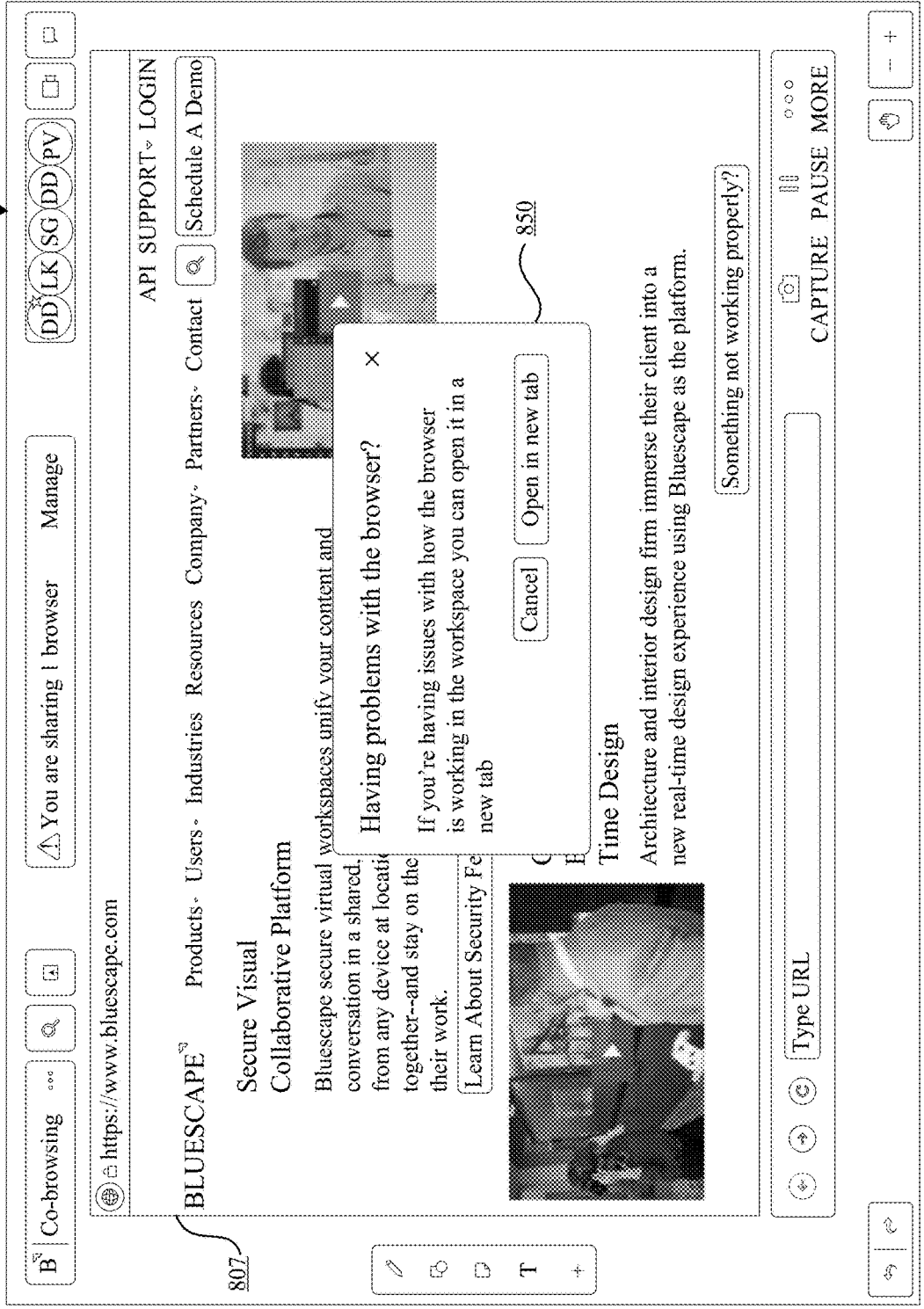

FIG. 8E presents a user interface element 850 displaying a message on the user interface 801. The user interface element 850 presents a message to the leader of the co-browsing session to open the web application or webpage in another tab if she is facing difficulties in reviewing the web application or the webpage. The leader of the co-browsing session can either select "cancel" and remove the user interface element from the display or she can select "open in new tab" button to open web application or the webpage in a new tab of the browser.

Figure 8F:
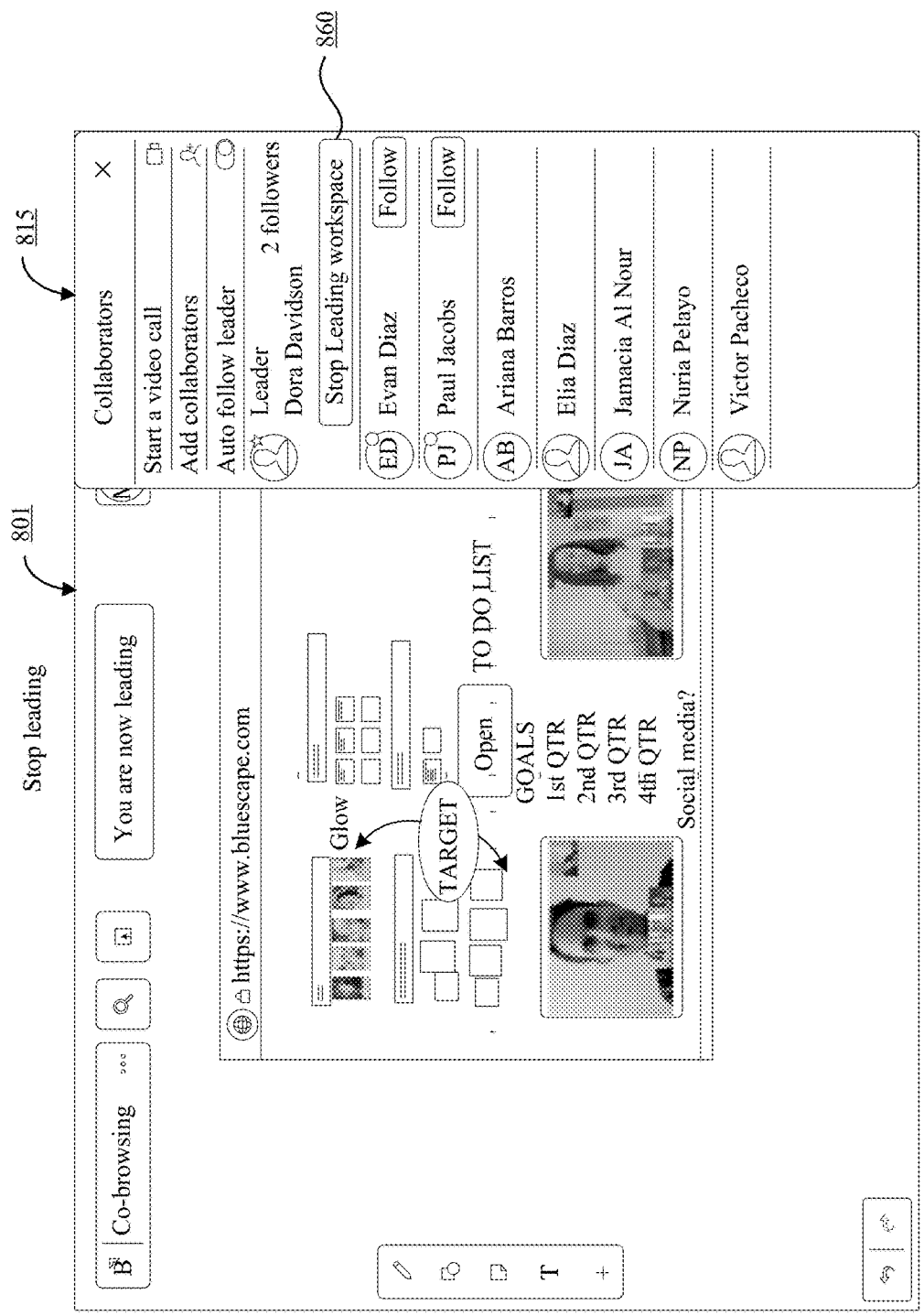

FIG. 8F presents the user interface element 815 from which the leader can select a "stop leading workspace" user interface element 860 to stop leading the co-browsing session. The user interface element 815 shows the name of the leader "Dora Davidson". The user interface element 815 also shows that there are two followers who are following the leader in the co-browsing session.

Conducting Multiple Co-Browsing Sessions

FIGS. 9A to 9H present functions of the collaboration system for a leader to conduct a collaboration session with active co-browsing of multiple web applications.

Figure 9A:
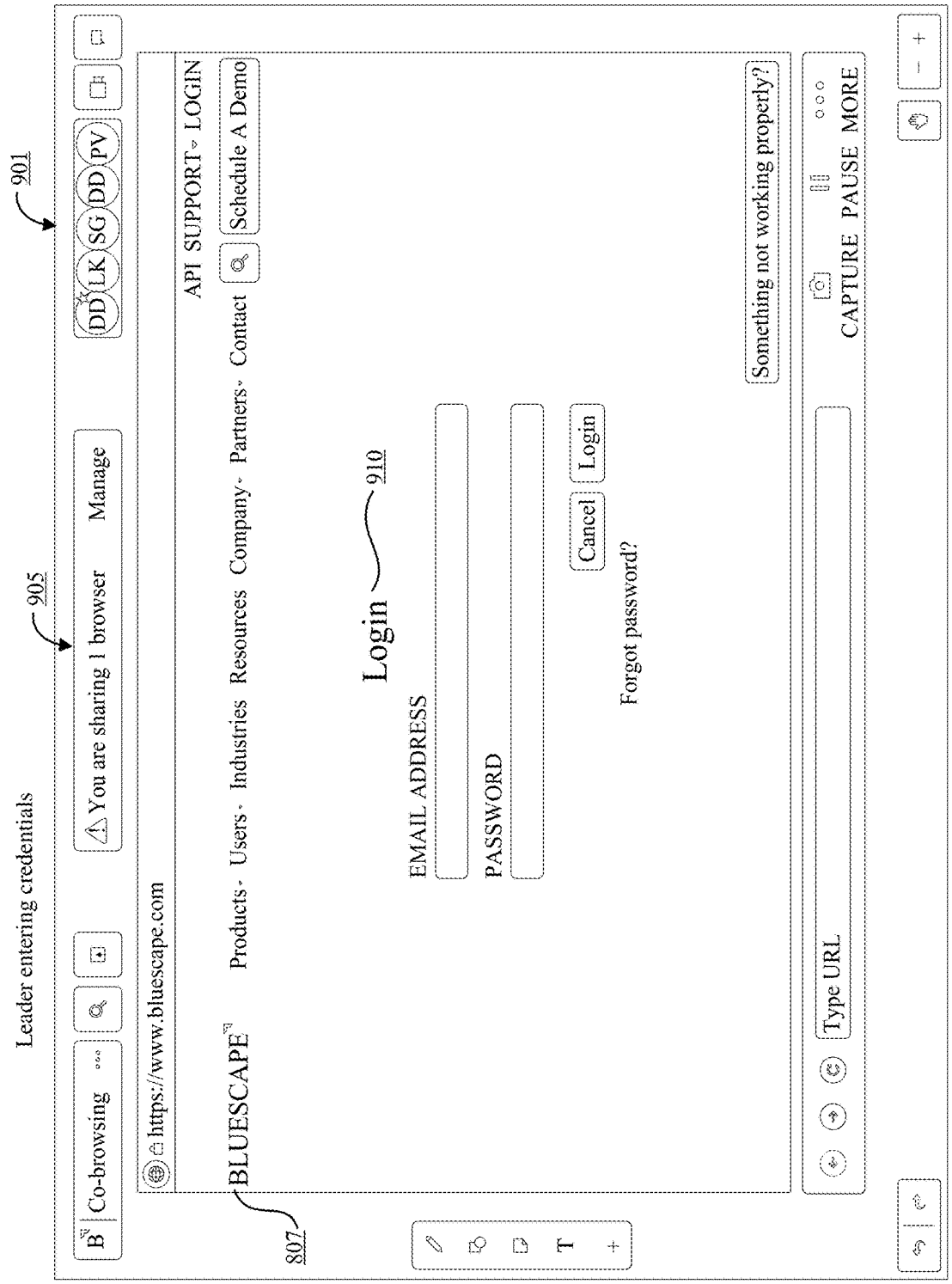
FIGS. 9A, 9B, 9C, 9D, 9E, 9F, 9G and 9H present functions of the collaboration system for a leader to conduct a collaboration session with active co-browsing of multiple web applications.

Specifically, FIG. 9A presents an example user interface 901 including a browser user interface element 807. A user interface element 905 indicates that the leader is sharing one browser with followers in the co-browsing session. The browser user interface element 807 shows a login user interface 910 asking the leader to enter email address and password for authentication to provide access to the web application.

Figure 9B:
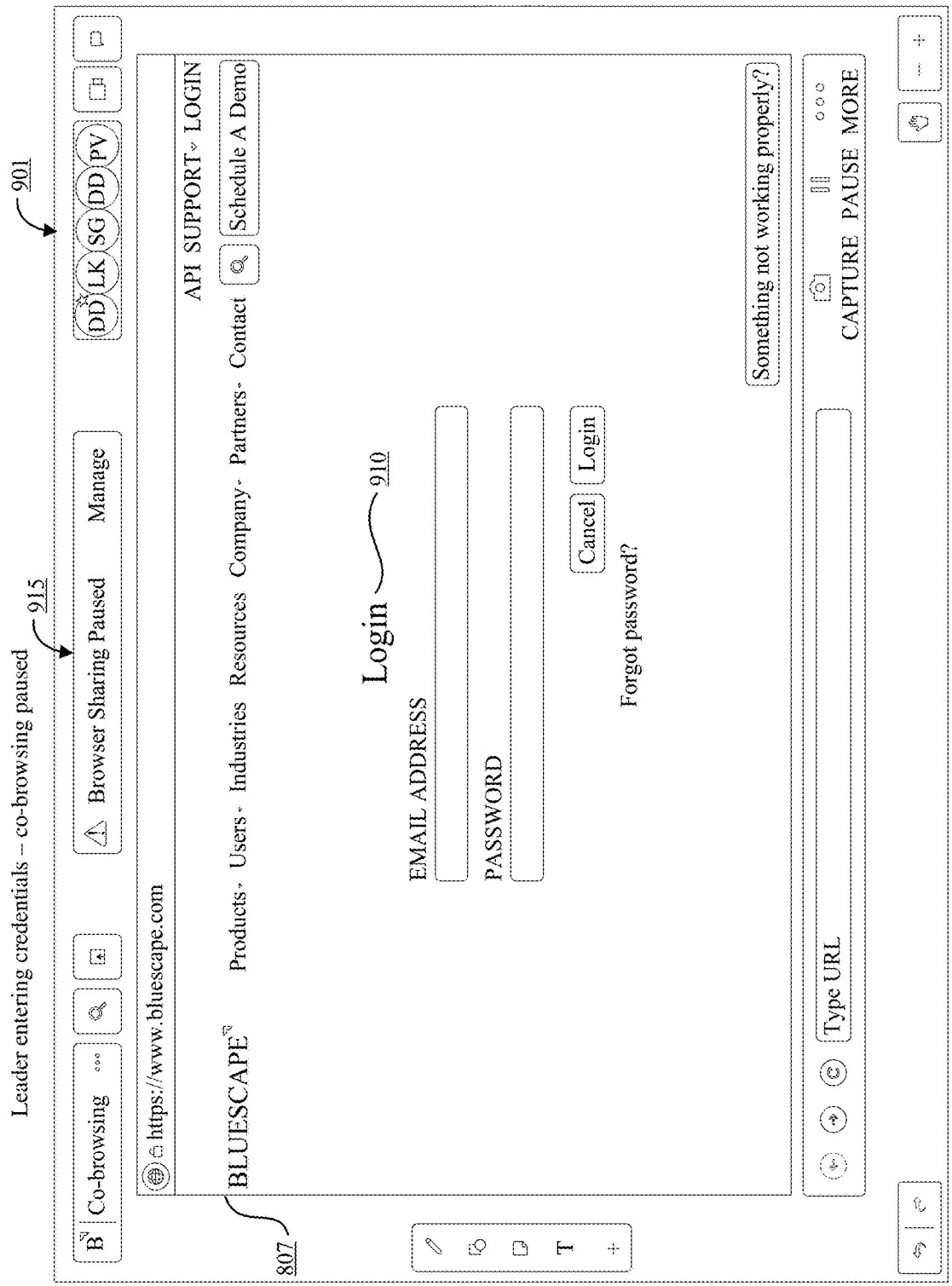

FIG. 9B shows that the browser sharing has stopped as indicated by a user interface element 915 displayed on the top. The technology disclosed includes logic to detect when a login webpage is displayed. The collaboration server upon detecting the login page, pauses sharing of the screen with follower client-side nodes. This is to avoid sharing of the user's access credentials with other participants in the co-browsing session. In one implementation, the user interface 901 can include a button or another user interface element which can be selected by the leader to pauses sharing of the browser with follower client-side network nodes.

Figure 9C:
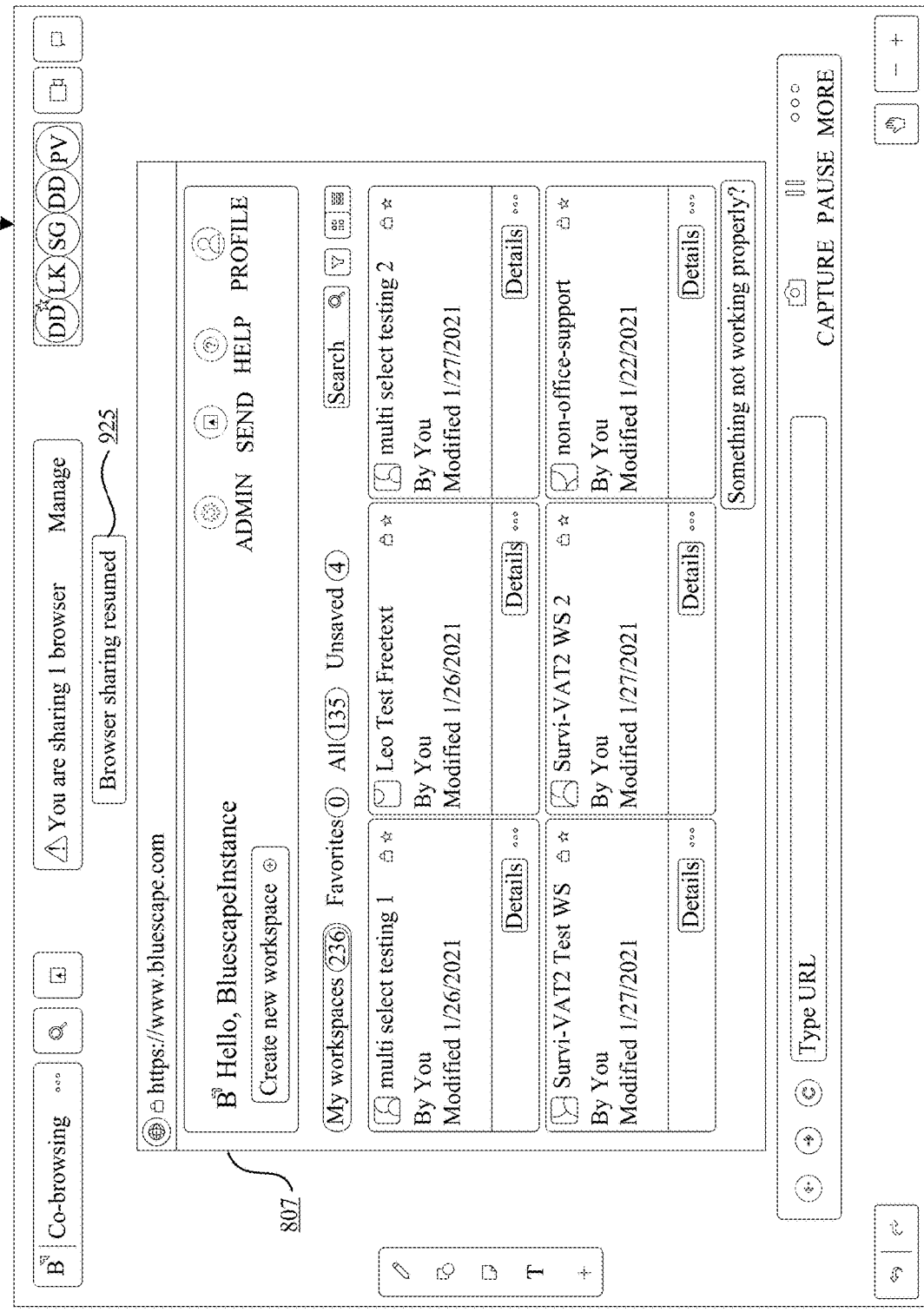

FIG. 9C shows that browsing resumes when the leader's login credentials are accepted by the web application and the leader's display shows a next page or user interface of the web application after getting access to the web application. The user interface 901 displays a message "browser sharing resumed" in the user interface element 925. The collaboration server 205 can include logic to detect that login process is completed at the leader's client-side network node. Upon detecting the completion of the login process, the collaboration server 205 can resume sharing of the browser at the leader's client-side network node with followers' client-side network nodes. In another implementation, the leader can select a user interface element on the user interface 901 to resume sharing of browser with followers.

Figure 9D:
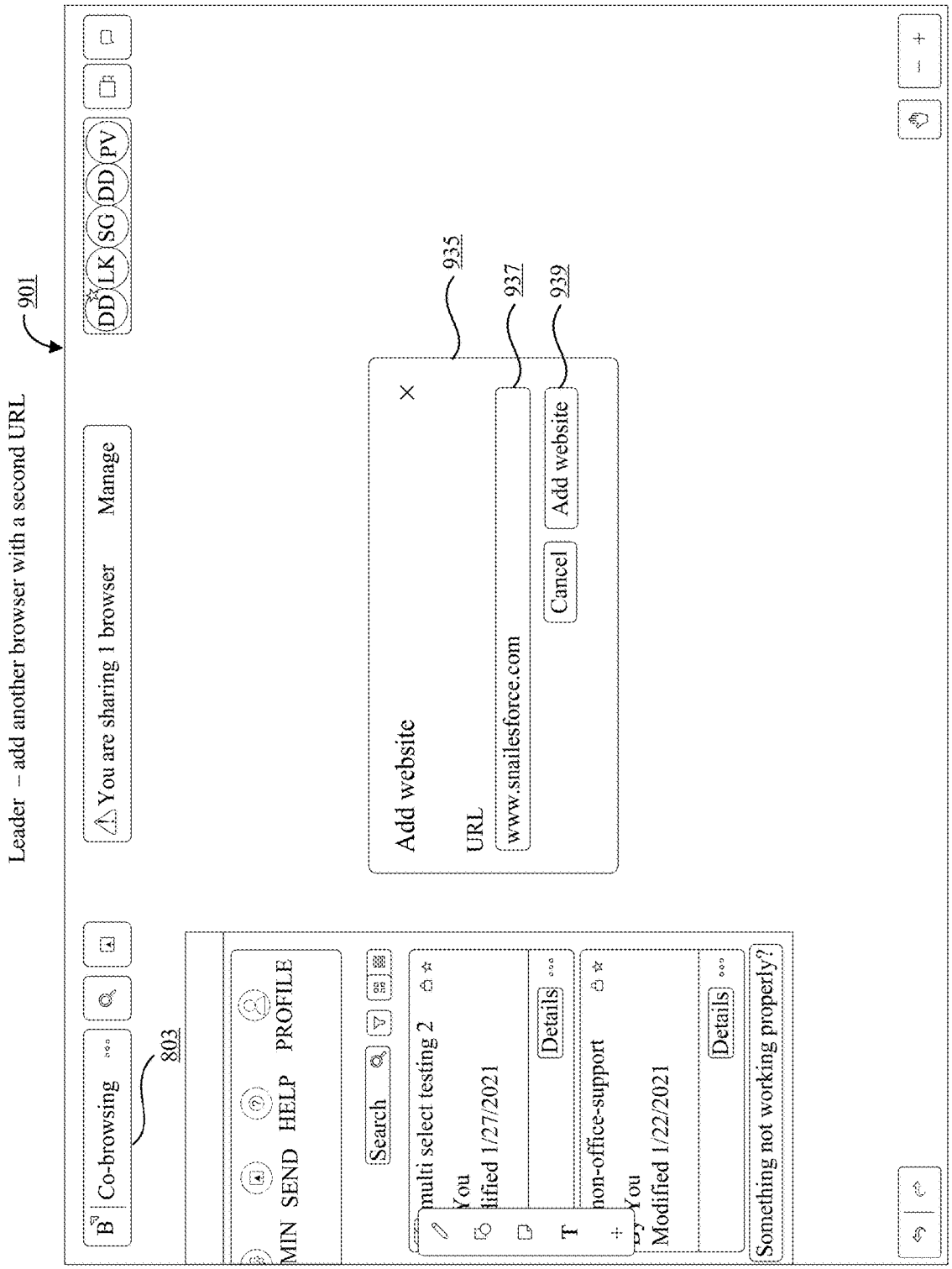

FIG. 9D shows user interface element 935 that can be used to add another web application or webpage to the current co-browsing session. The user interface element 935 is displayed on the user interface 901. The leader of the co-browsing session can select the user interface element 803 to display the "Add website" user interface element 935. The user can enter a URL of the web application or the webpage in the input text box 937. The user can then select an "add website" button 939 on the user interface element 935 to open the web application or the webpage addressed by the URL or the user can select a "cancel" button on the user interface element 935 to cancel the task of adding a website. Note, that as the user is already sharing a web application with other participants, selection of "adding the website" starts a second web application to the co-browsing session.

Figure 9E:
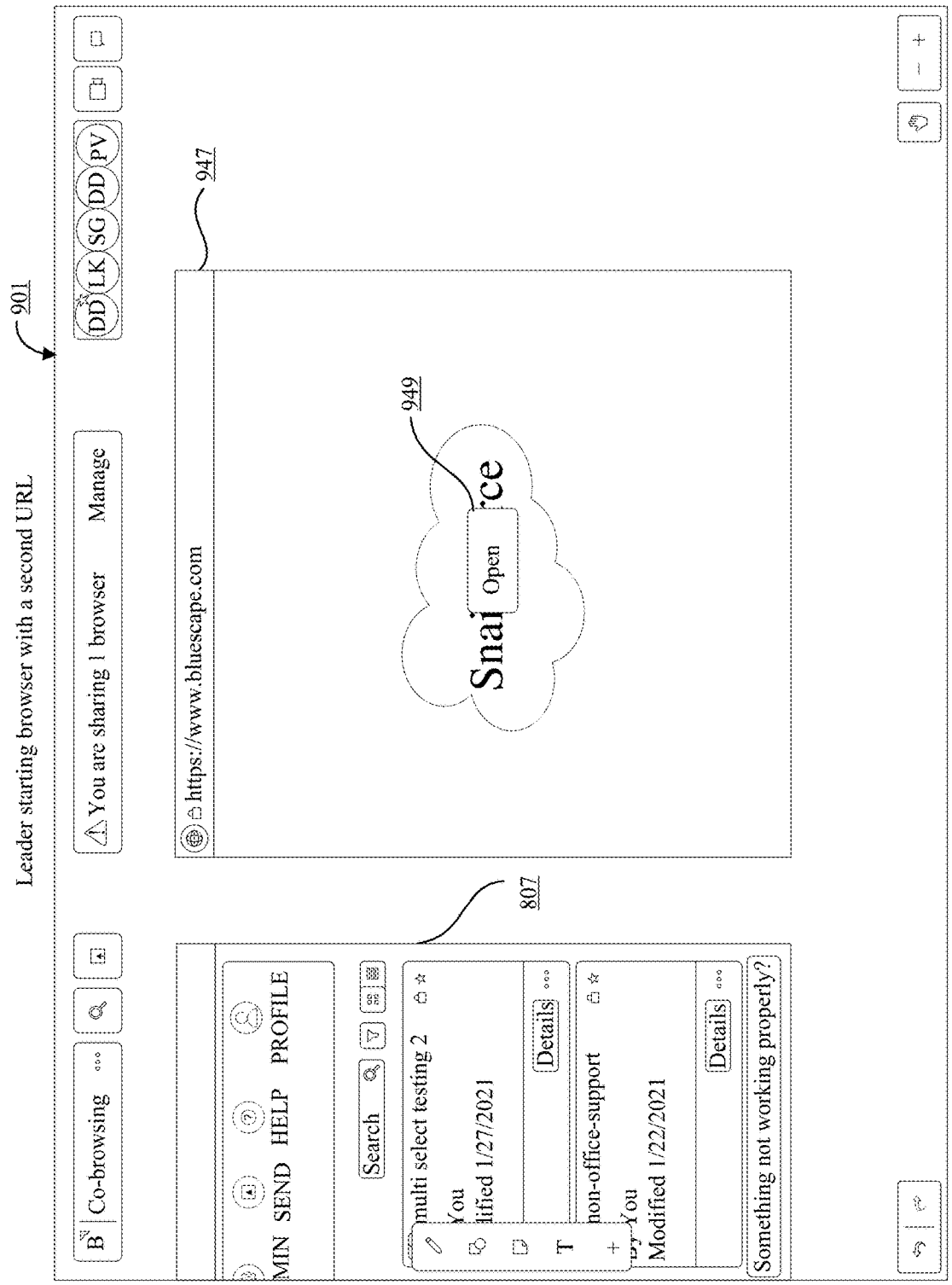

FIG. 9E shows the second web application displayed in a second browser user interface element 947. A button 949 is displayed on the browser user interface element 947. Selecting the button 949 opens the second web application on the browser user interface 947. Note that the first web application is opened in the first browser user interface element 807.

Figure 9F:
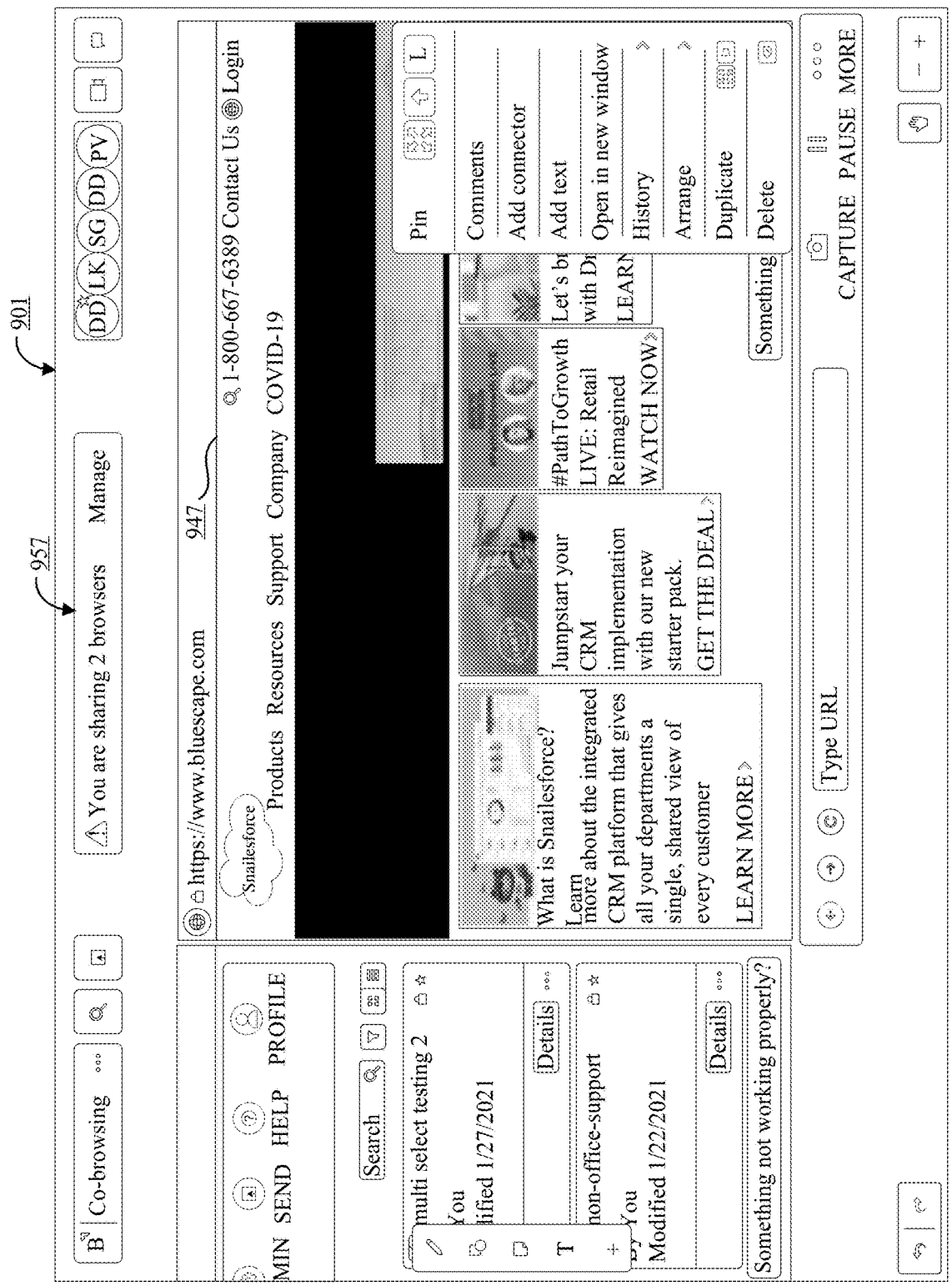

FIG. 9F shows the second web application opened in the second browser user interface 947. A user interface element 957 displays that the leader is sharing two browsers with followers in the co-browsing session.

Figure 9G:
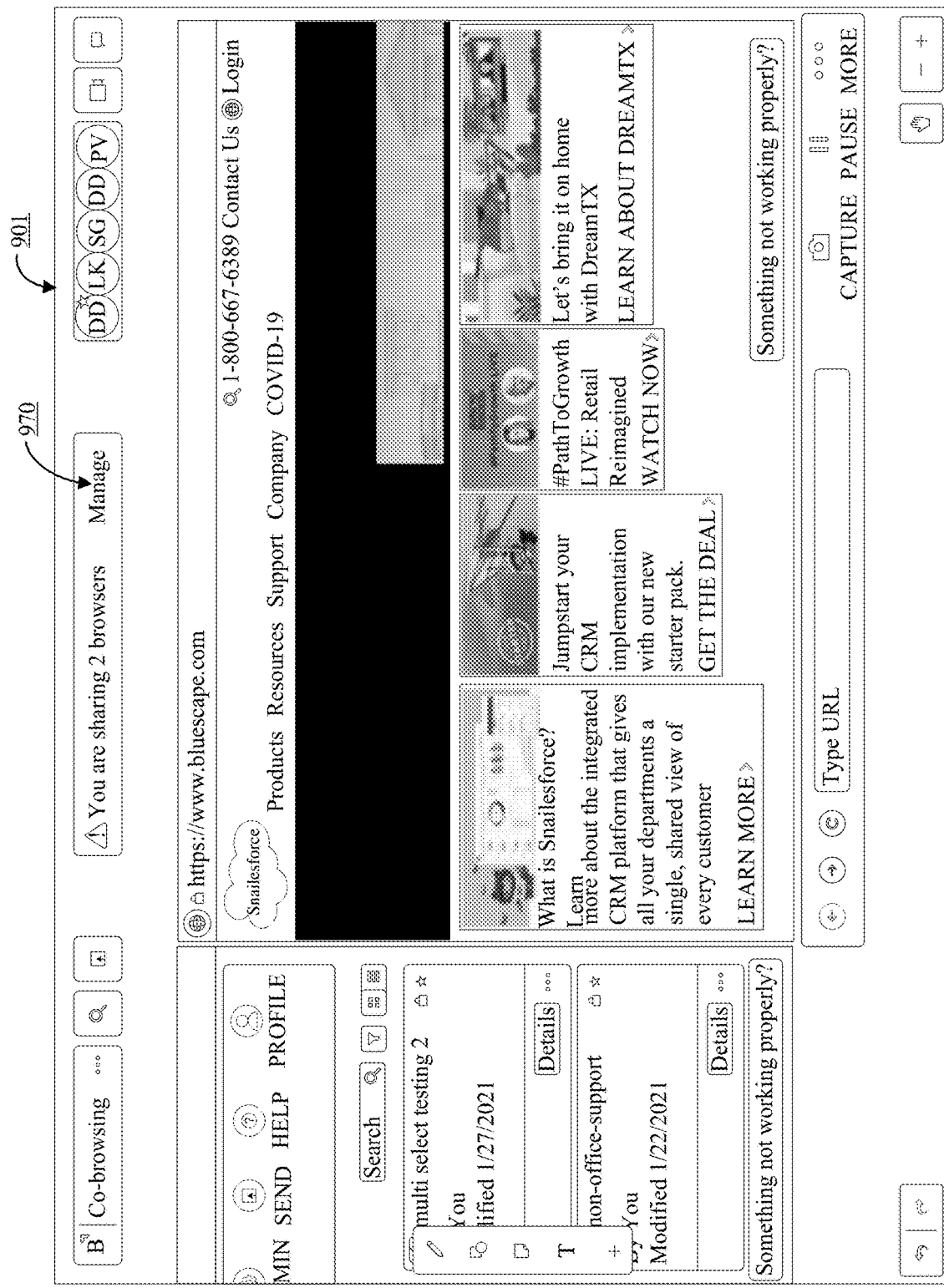

FIG. 9G shows that the user (or the leader) can manage multiple web applications in the co-browsing session using a "manage" user interface element 970. When the user selects the "manage" user interface element 970, a user interface is presented for managing the multiple web applications in the co-browsing session.

Figure 9H:
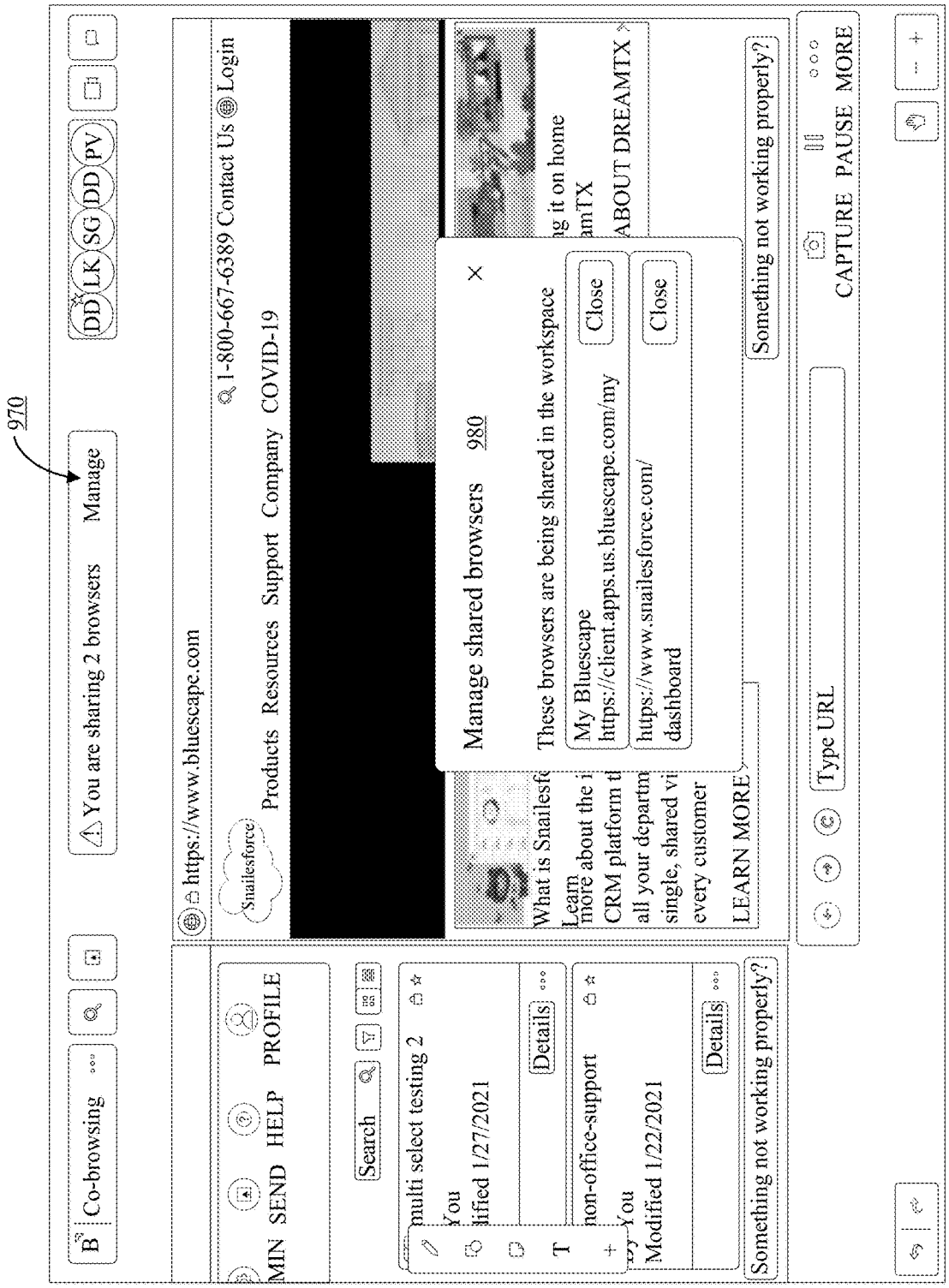

FIG. 9H shows the "manage shared browsers" user interface element 980 displayed on the user interface 901 upon selection of the "manage" user interface element 970. The "manage shared browsers" user interface element displays a list of web applications that are shared with followers in the co-browsing session. In this example, two web applications are listed on the user interface element 980. The leader is sharing these two web applications with followers in the co-browsing session. The user interface element 980 provides a "close" button for each of the listed web application. The leader can select a "close" button for the web application to end the co-browsing for that web application.

Leader-Follower Co-Browsing Session

FIGS. 10A to 10K present functions of the collaboration system to make a follower as a leader of the collaboration session for active co-browsing of web applications.

Figure 10A:
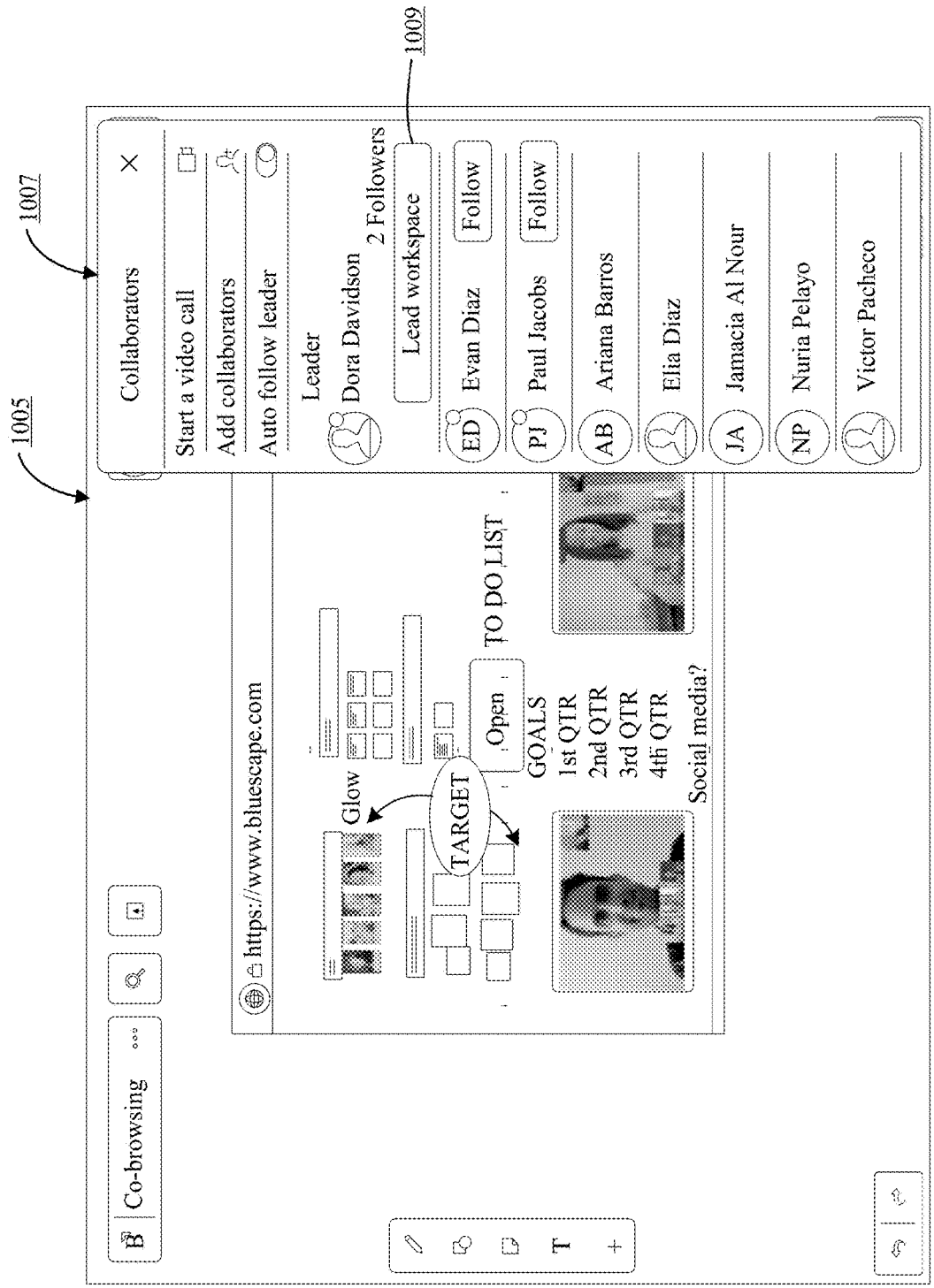

FIG. 10A presents a user interface 1005 which is displayed on display of a client-side network node of a user of the co-browsing session. A user interface element 1007 shows the name of the user "Dora Davidson" and a user interface element 1009 for leading the co-browsing session. The user selects the "lead workspace" user interface element to lead co-browsing session.

Figure 10B:
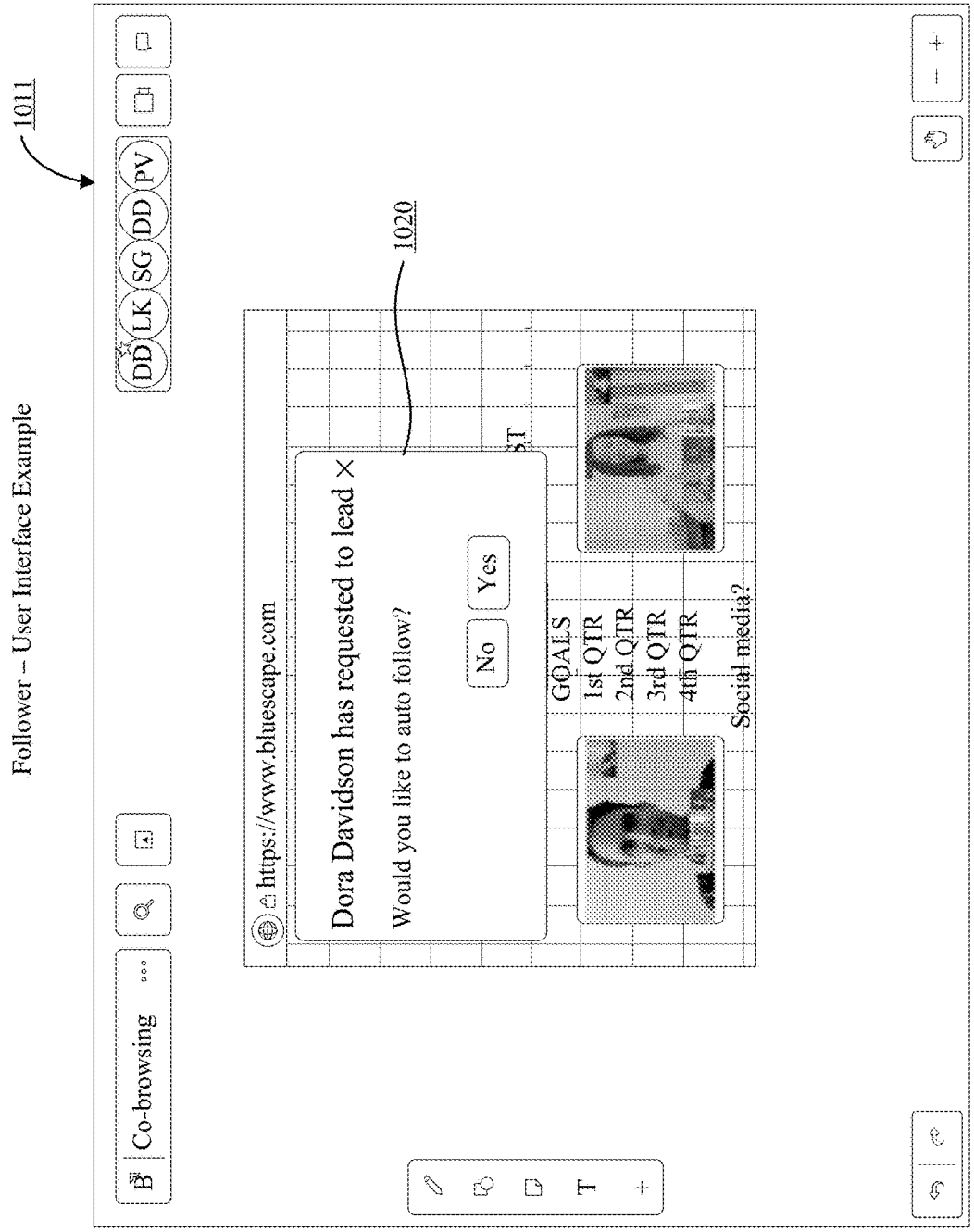

FIG. 10B presents a user interface 1011 displayed on the client-side network node of a follower of the co-browsing session. The user interface 1011 displays a user interface element 1020 presenting a message to the follower. The message on the user interface element 1020 states the name of the leader of the collaboration session. The user interface element further presents an option to the follower to either accept joining the collaboration session by selecting a "Yes" button or reject joining the collaboration session by selecting a "No" button.

Figure 10C:
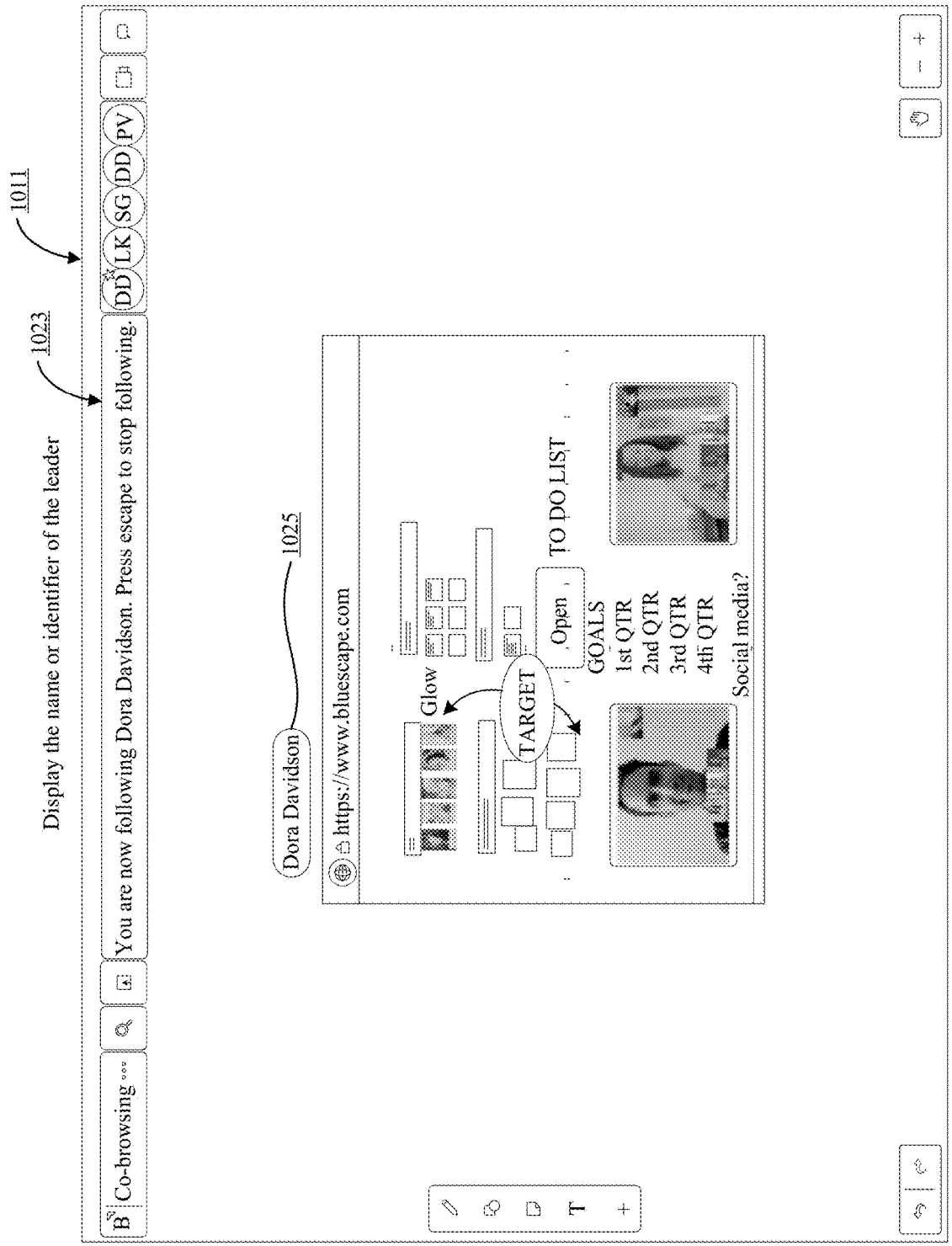

FIG. 10C presents the user interface 1011 of the follower's client-side network node. The user interface 1011 displays a message in a user interface element 1023. The message informs the follower the name of the leader whom the follower is following in the co-browsing session. The message also informs the user to press an escape key to stop following the leader in the co-browsing session. The user interface 1011 also includes a user interface element 1025 displaying the name of the leader of the co-browsing session.

Figure 10D:
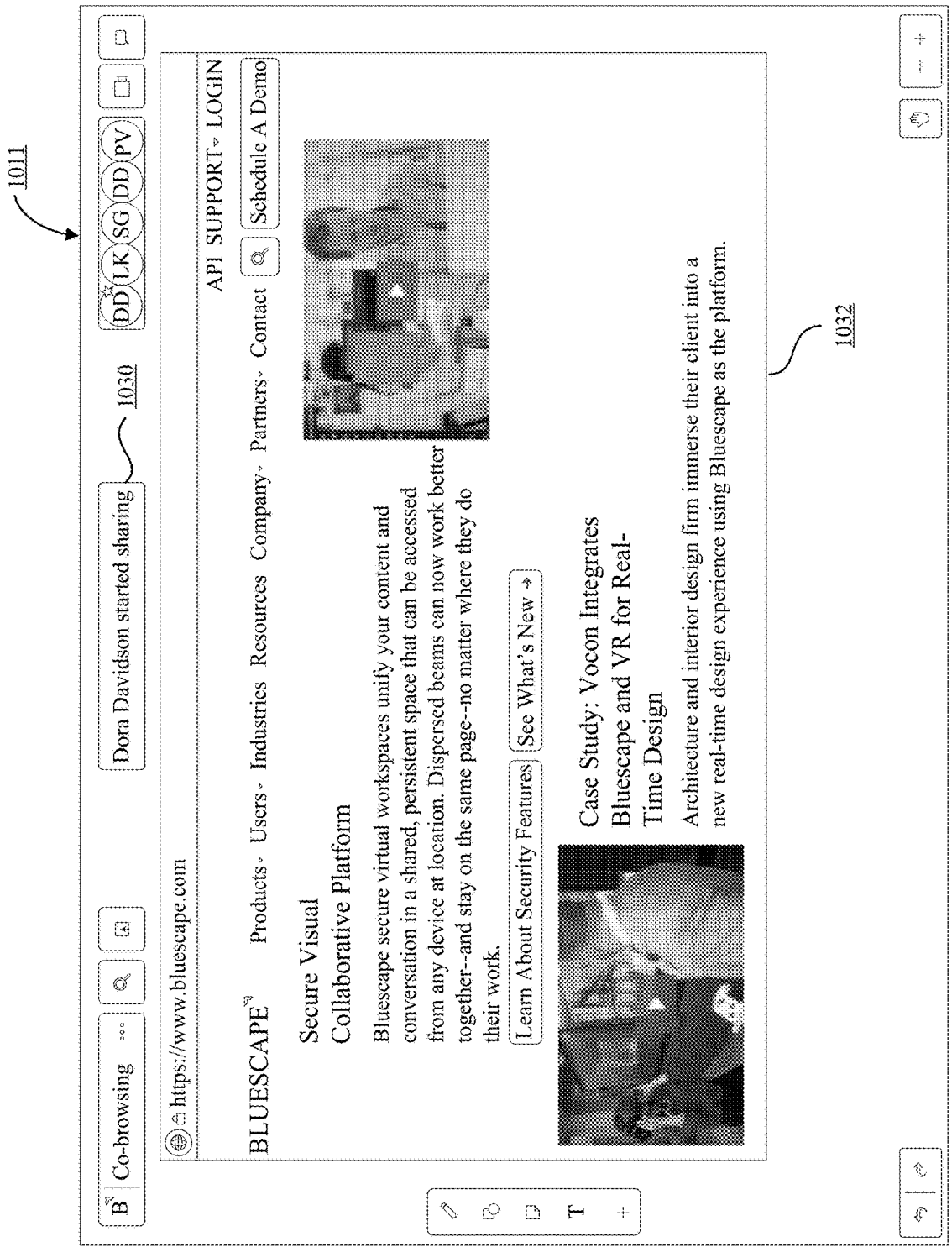

FIG. 10D presents the user interface 1011 on the follower's client-side network node. The user interface displays a browser 1032 presenting the web application shared by the leader. The user interface 1011 includes a user interface element 1030 displaying a message that the leader has started sharing the web application in the co-browsing session. A star (or other visual indicator) is placed on Dora Davison's representative icon in the user interface 1011 to indicate that Dora Davison is sharing.

Figure 10E:
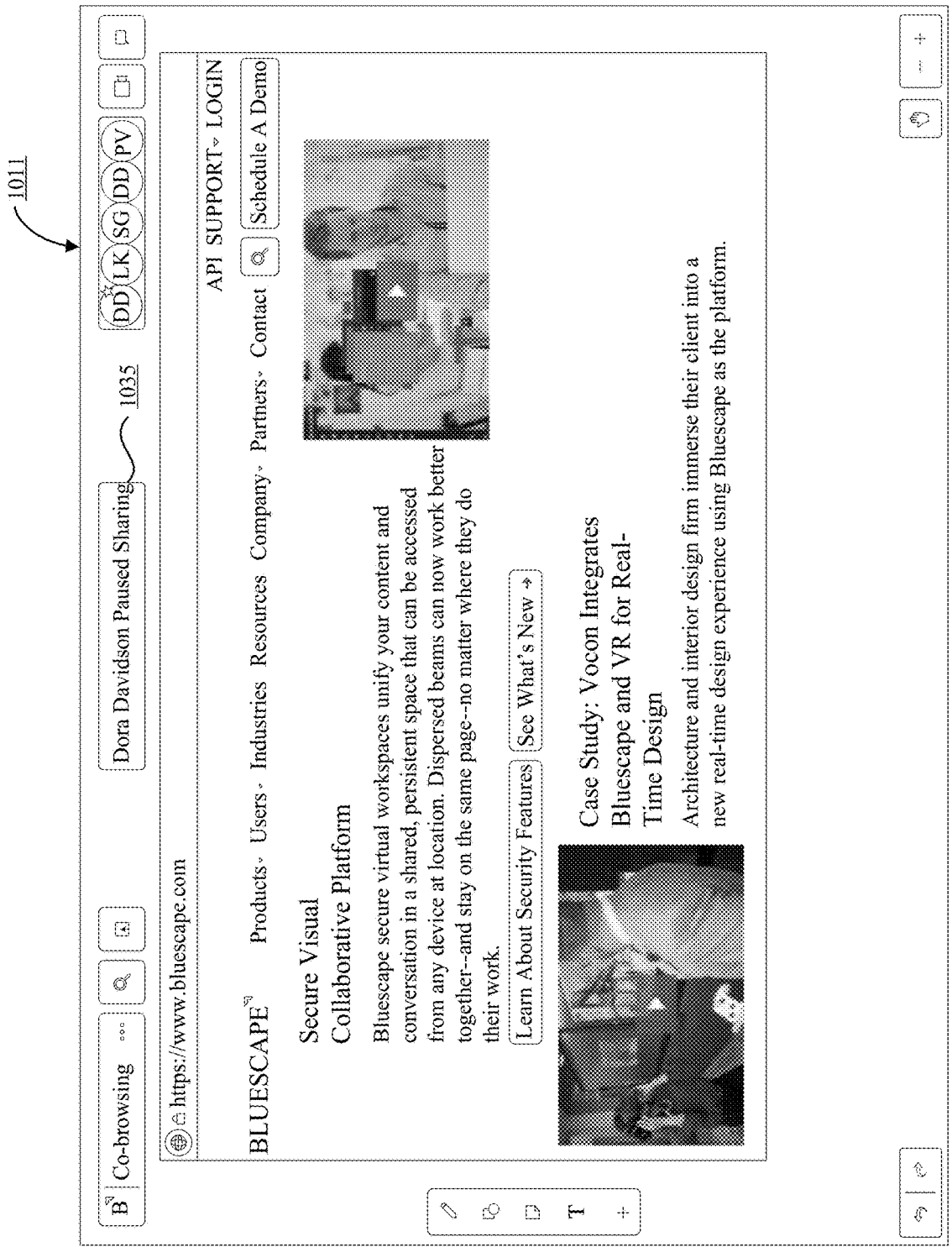

FIG. 10E presents the user interface 1011 on the follower's client-side network node. The user interface 1011 includes a user interface element 1035 displaying a message the leader has paused sharing the web application. This can happen during the co-browsing session when the leader enters her credential to login to the web application.

Figure 10F:
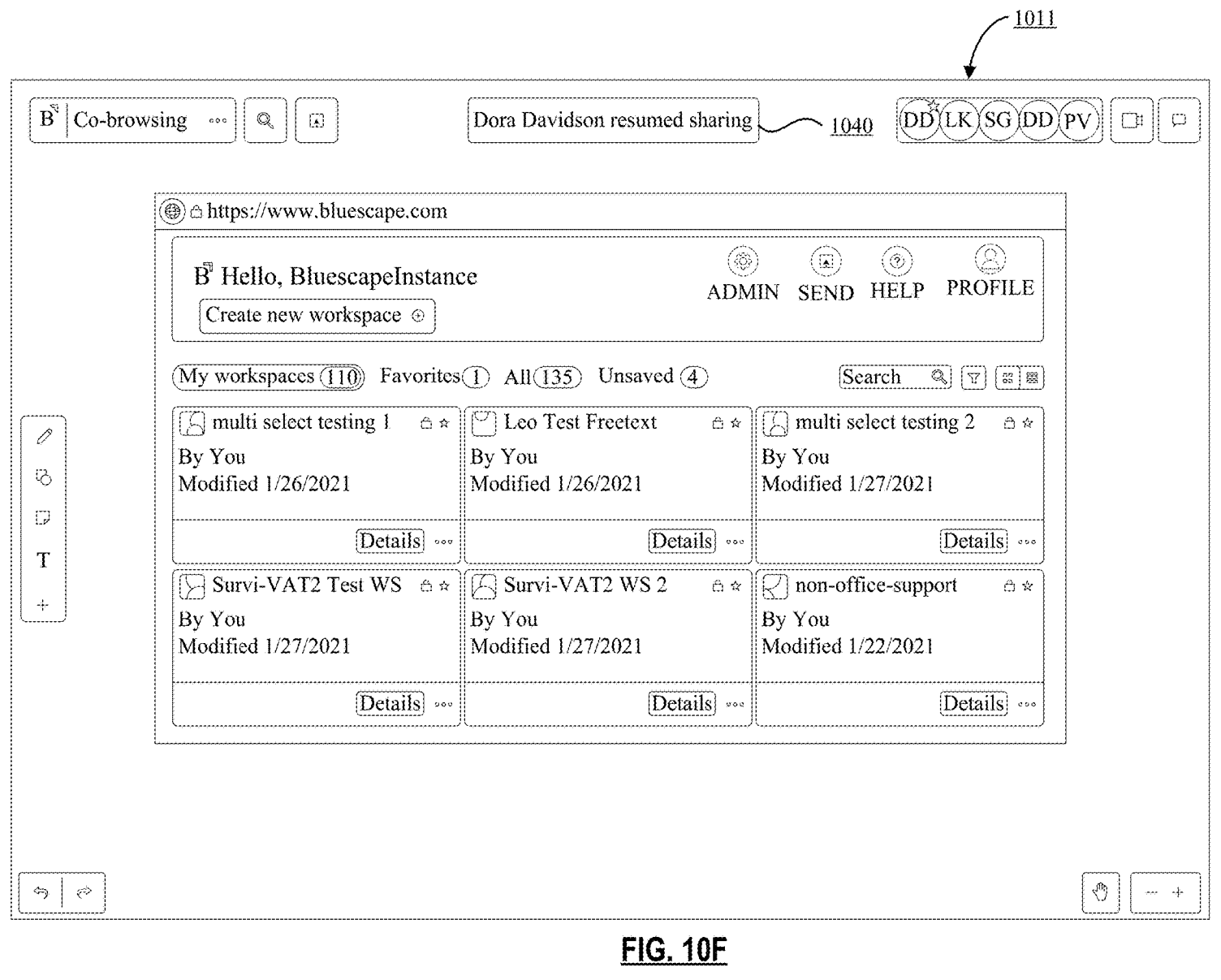

FIG. 10F presents the user interface 1011 on the follower's client-side network node. The user interface 1011 includes a user interface element 1040 displaying a message the leader has resumed sharing the web application. This message can be displayed when the leader has entered her login credentials and logged into the web application. The functionality presented in FIGS. 10E and 10F ensures that sensitive information is not shared between participants of a co-browsing collaboration session.

Figure 10G:
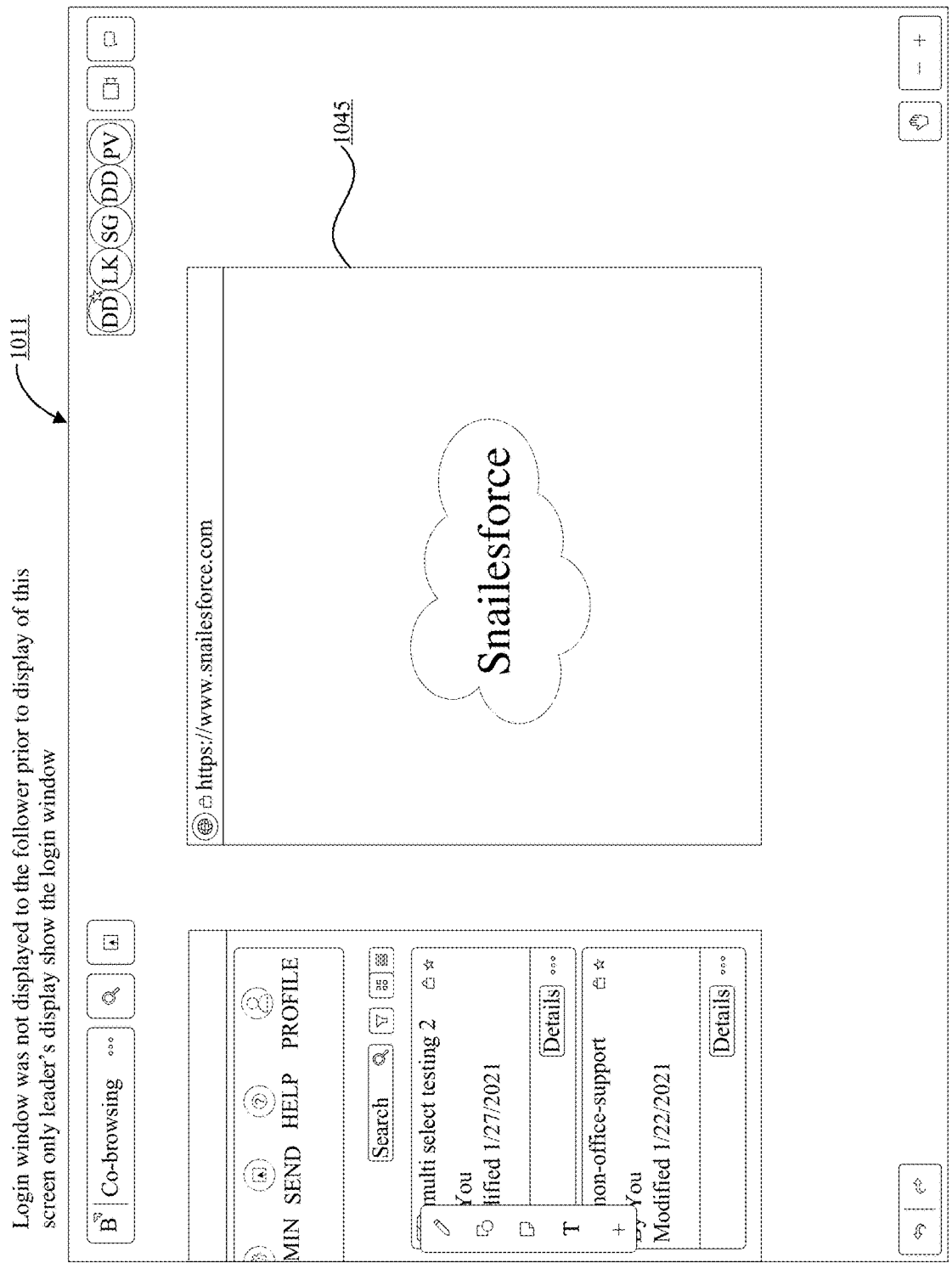

FIG. 10G shows the user interface 1011 on the follower's client-side network node. The user interface 1011 includes a browser user interface element 1045 which displays the web application shared by the leader. Note that the login window of the leader is not displayed to the follower.

Figure 10H:
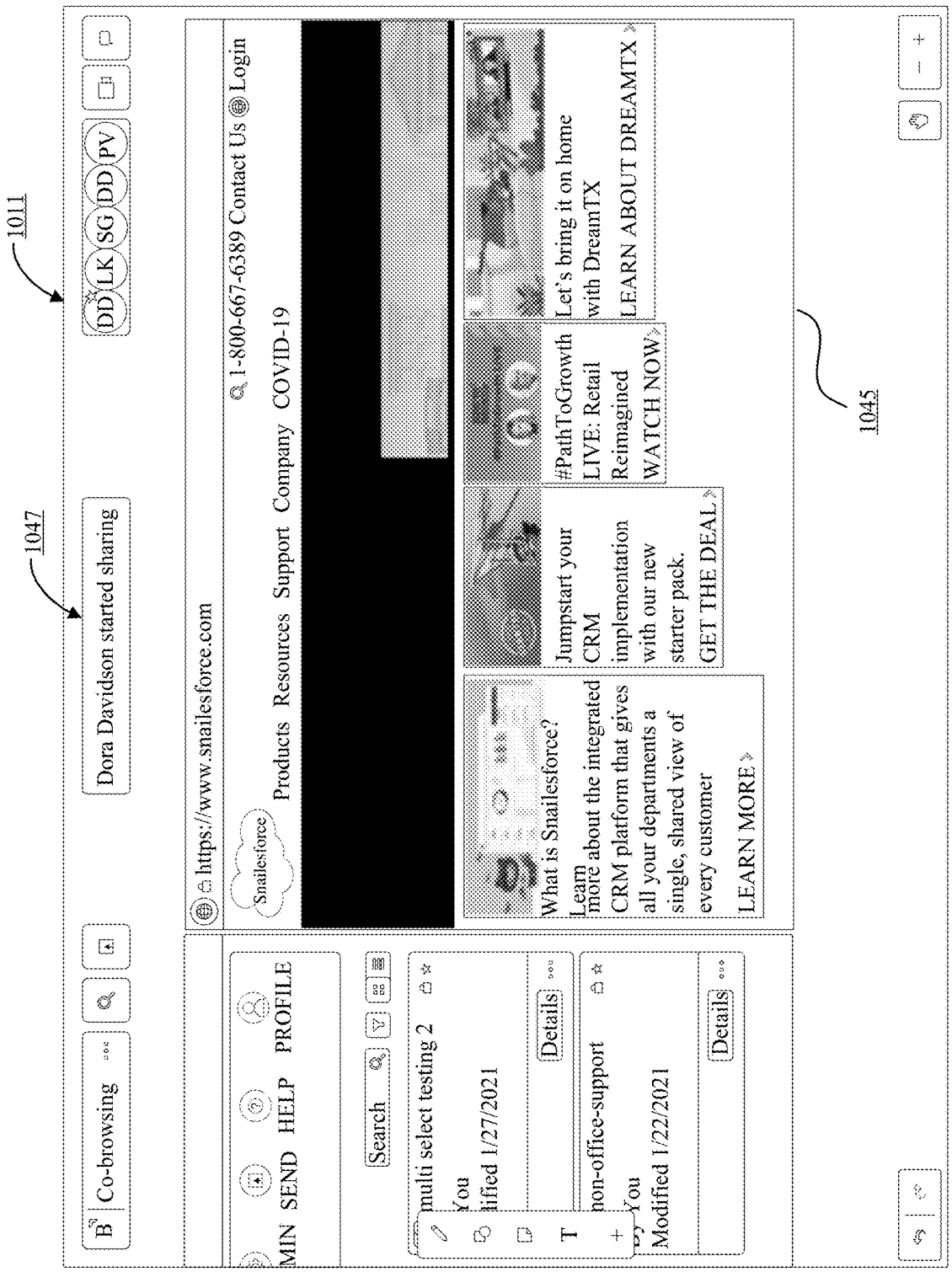

FIG. 10H shows the user interface 1011 on the follower's client-side network node. The user interface 1011 includes a browser user interface element 1045 which displays the web application shared by the leader. When the leader was entering her login credentials the web application was not displayed. After authentication of the leader is complete, the co-browsing of the web application resumed. A message in a user interface element 1047 states that the leader has started sharing web application in the co-browsing session.

Figure 10I:
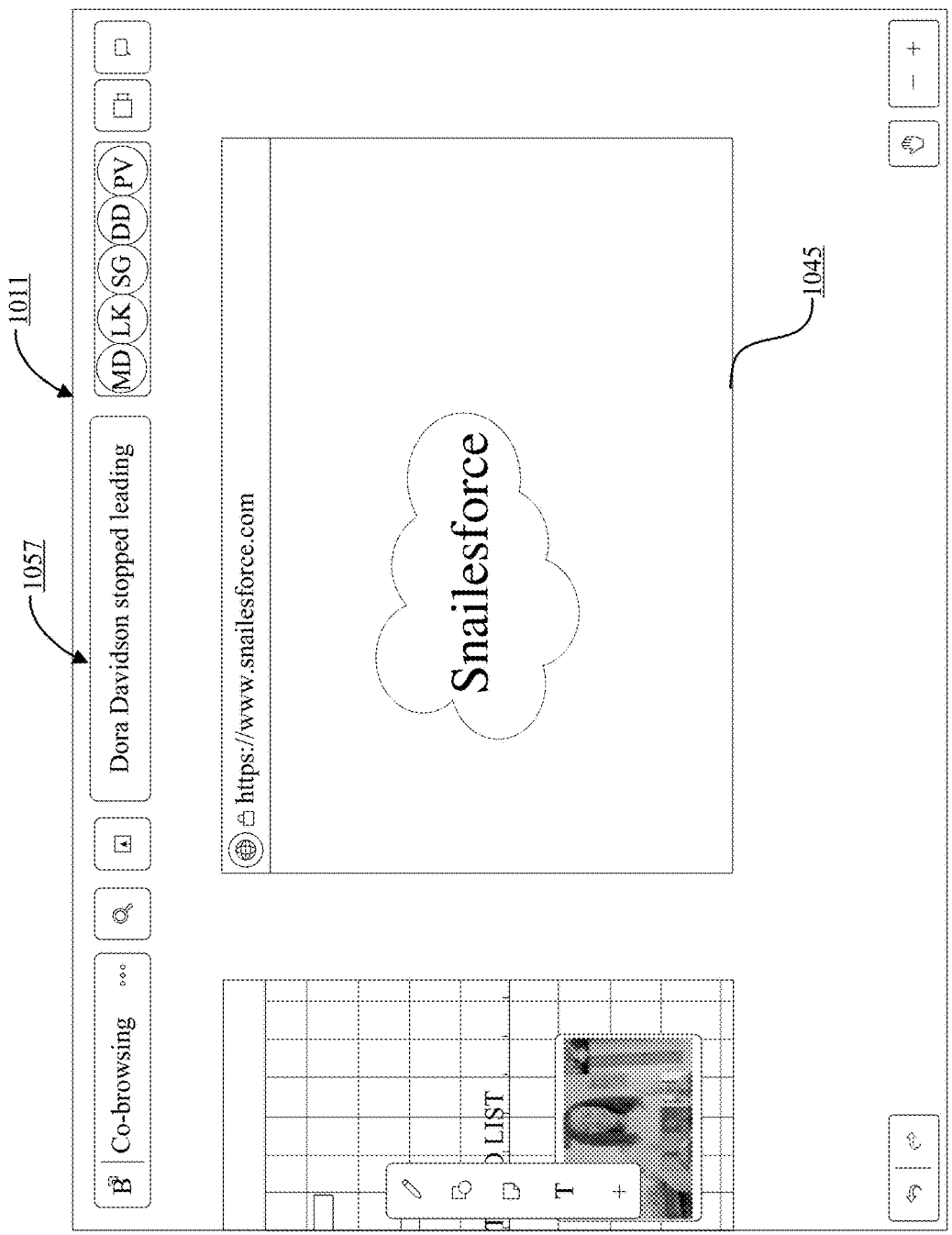

FIG. 10I shows the user interface 1011 on the follower's client-side network node. The user interface 1011 includes a browser user interface element 1057 which displays a message that the leader has stopped leading the co-browsing session.

Figure 10J:
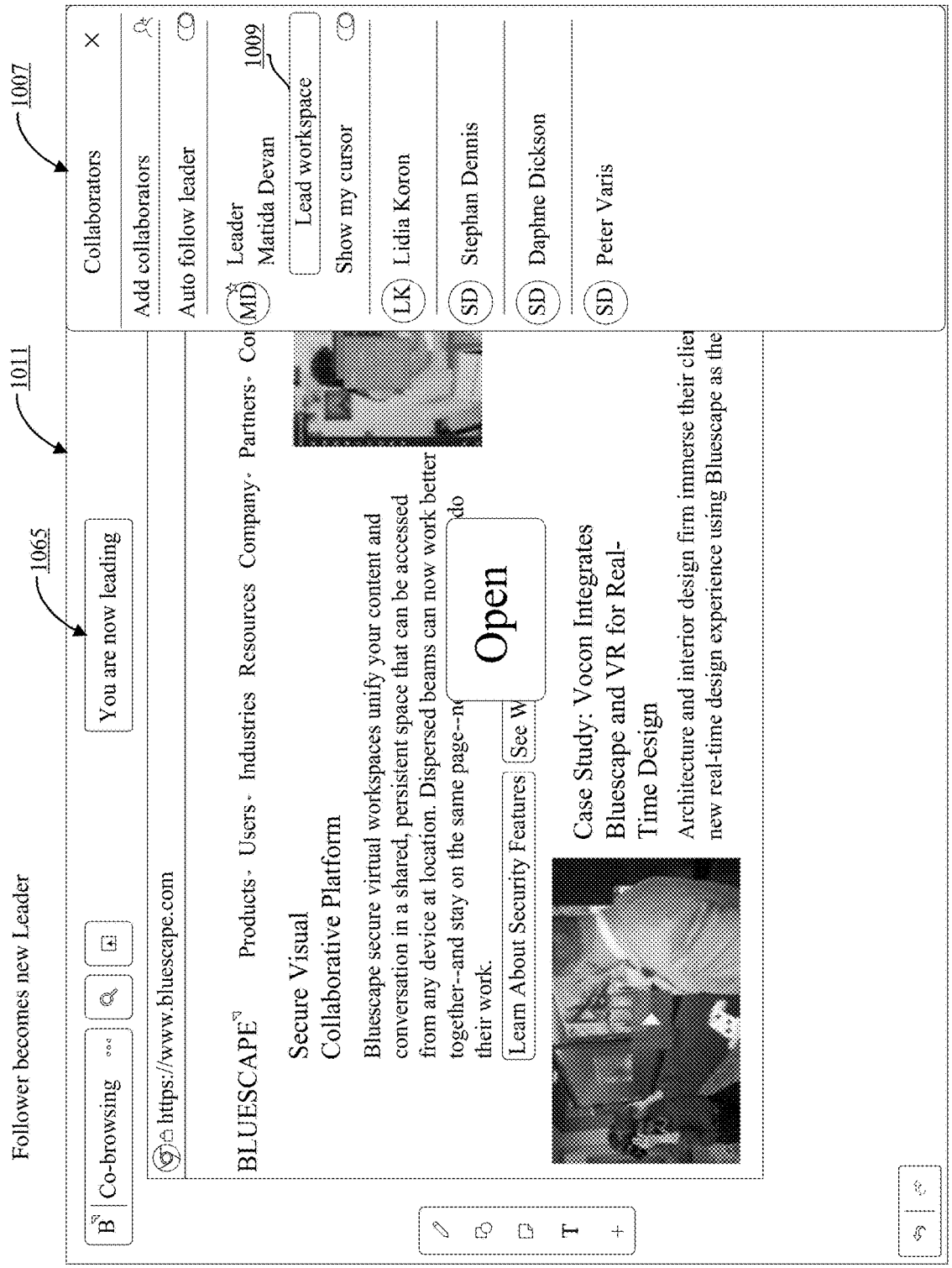

FIG. 10J shows the user interface 1011 on the follower's client-side network node. The user interface 1011 includes the user interface element 1007. The follower can select the "lead workspace" button 1009 to start leading the co-browsing session. Therefore, any follower can become a leader in the co-browsing session. The user interface 1011 includes a message, "you are now leading" (1065). This message is displayed on the display of the leader's client-side network node and not on the displays of the client-side network nodes of the followers.

Figure 10K:
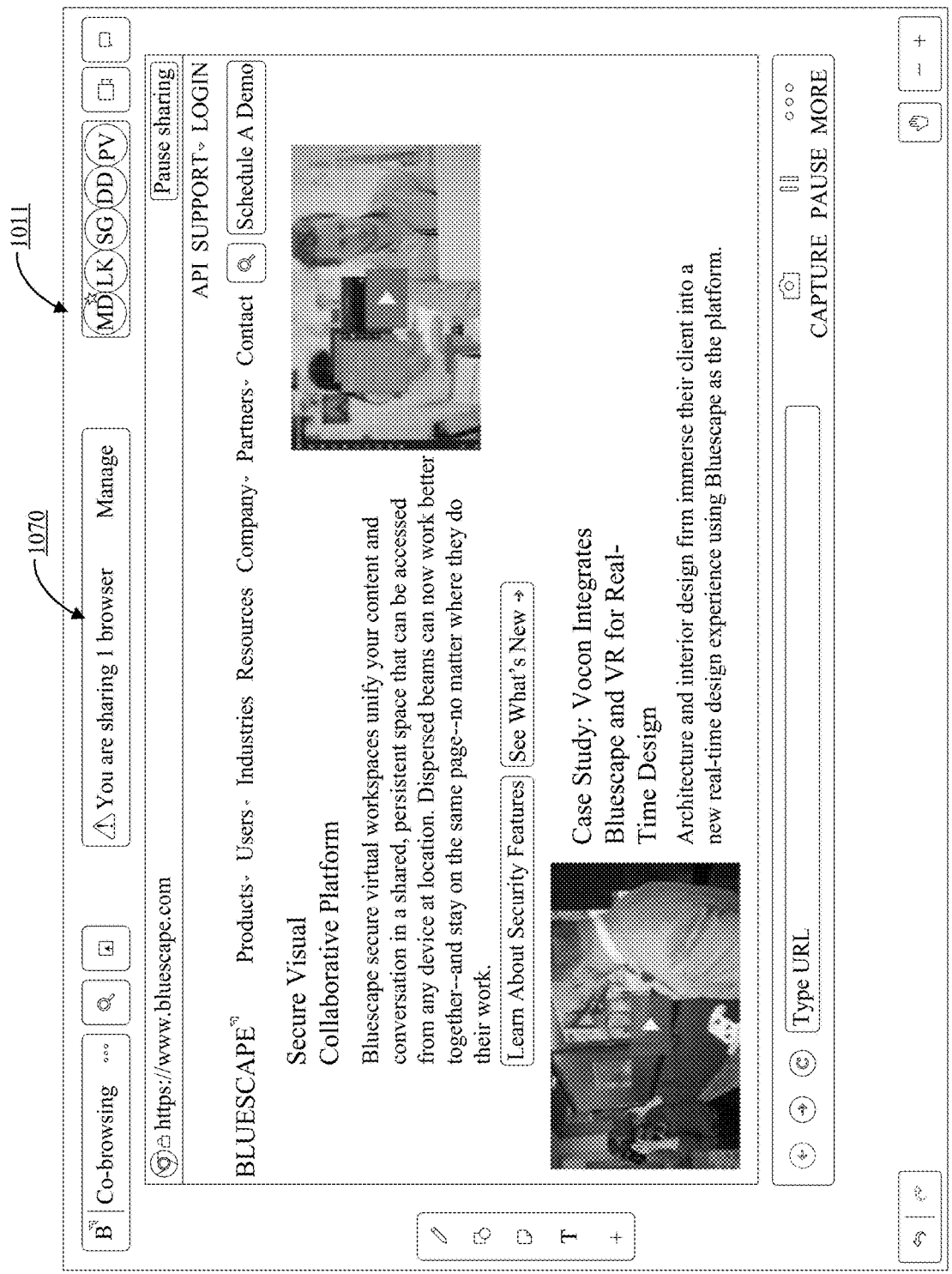

FIG. 10K shows the user interface 1011 on the new leader's client-side network node. The user interface 1011 includes a user interface element 1070 which shows that the leader is sharing one browser with followers in the co-browsing session. The technology disclosed therefore, allows the follower to become leader of the co-browsing session.

Filtering Content in a Co-Browsing Session

FIGS. 11A to 11E present functions of the collaboration system including filtering of content from the web applications or web pages in an active co-browsing session.

Figure 11A:
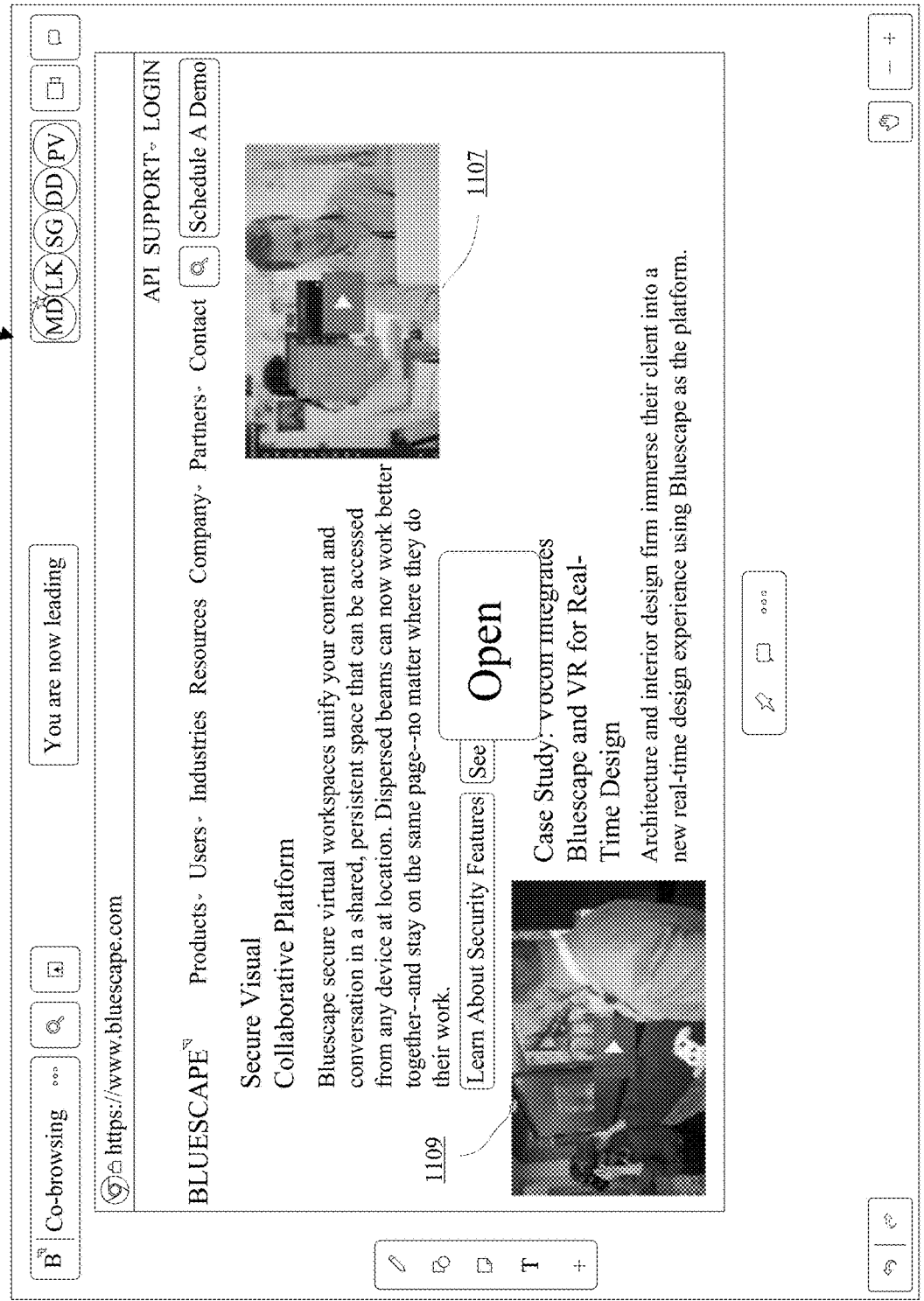
FIGS. 11A, 11B, 11C, 11D and 11E present functions of the collaboration system including filtering of content from the web applications or web pages in an active co-browsing session.

Specifically, FIG. 11A presents a user interface 1105 which is displayed on the client-side network node of a leader in a co-browsing session. In this example, the server-side network acts as a proxy web server. The proxy web server can apply filtering logic to remove content from the web application or the webpage. The web application as displayed on the user interface 1105 includes two videos 1107 and 1109.

Figure 11B:
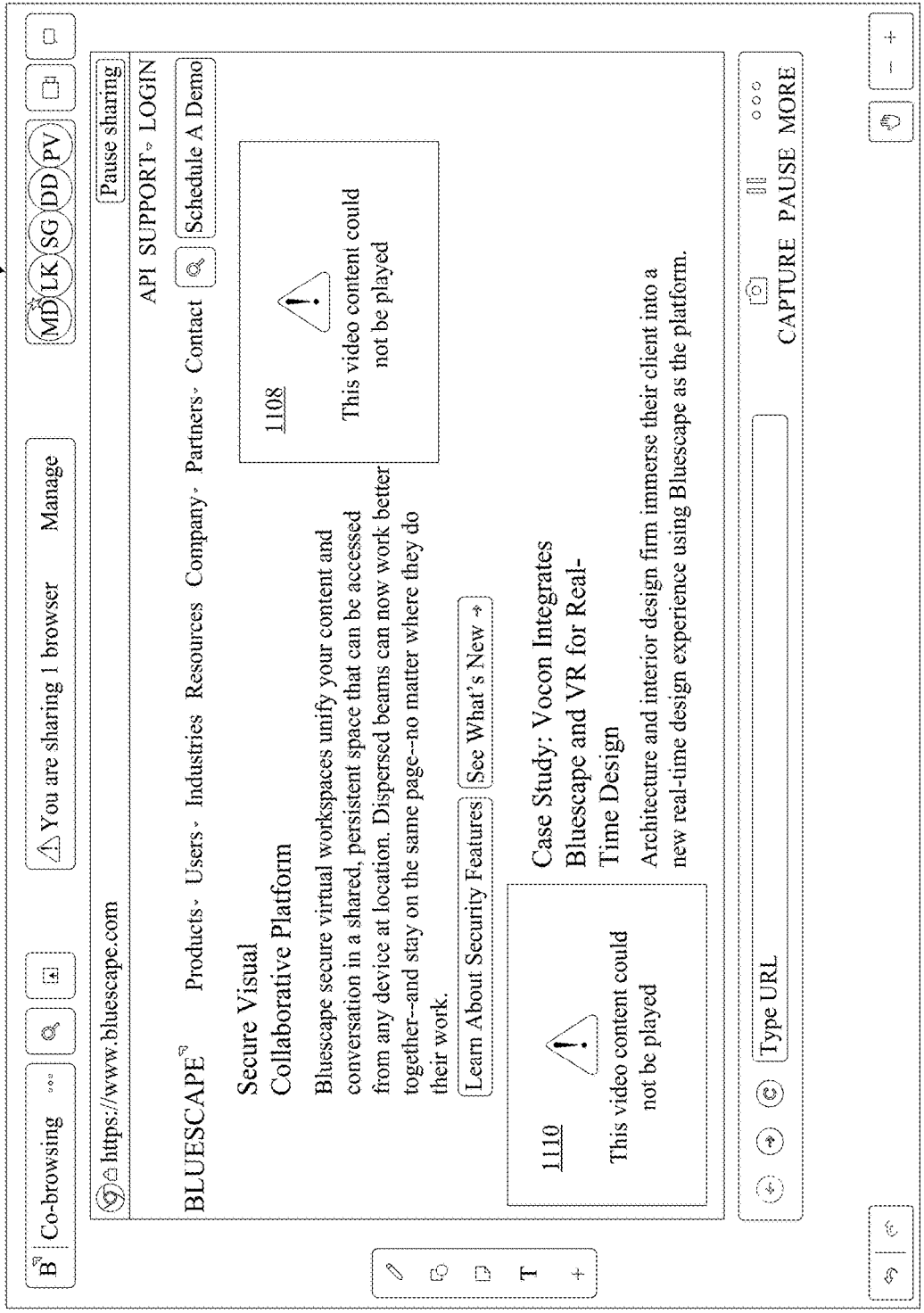

FIG. 11B shows filtering logic applied by the host or proxy web server to remove the videos 1107 and 1109 from the web application as displayed on the user interface. The videos 1107 and 1109 are respectively replaced with two user interface elements 1108 and 1110 that can include a message that the video cannot be displayed (or that the video has been removed or filtered out of the webpage or the web application). These user interface elements thus indicate that the web application includes videos at these two locations, however, the filtering logic has removed the videos from the display.

Figure 11C:
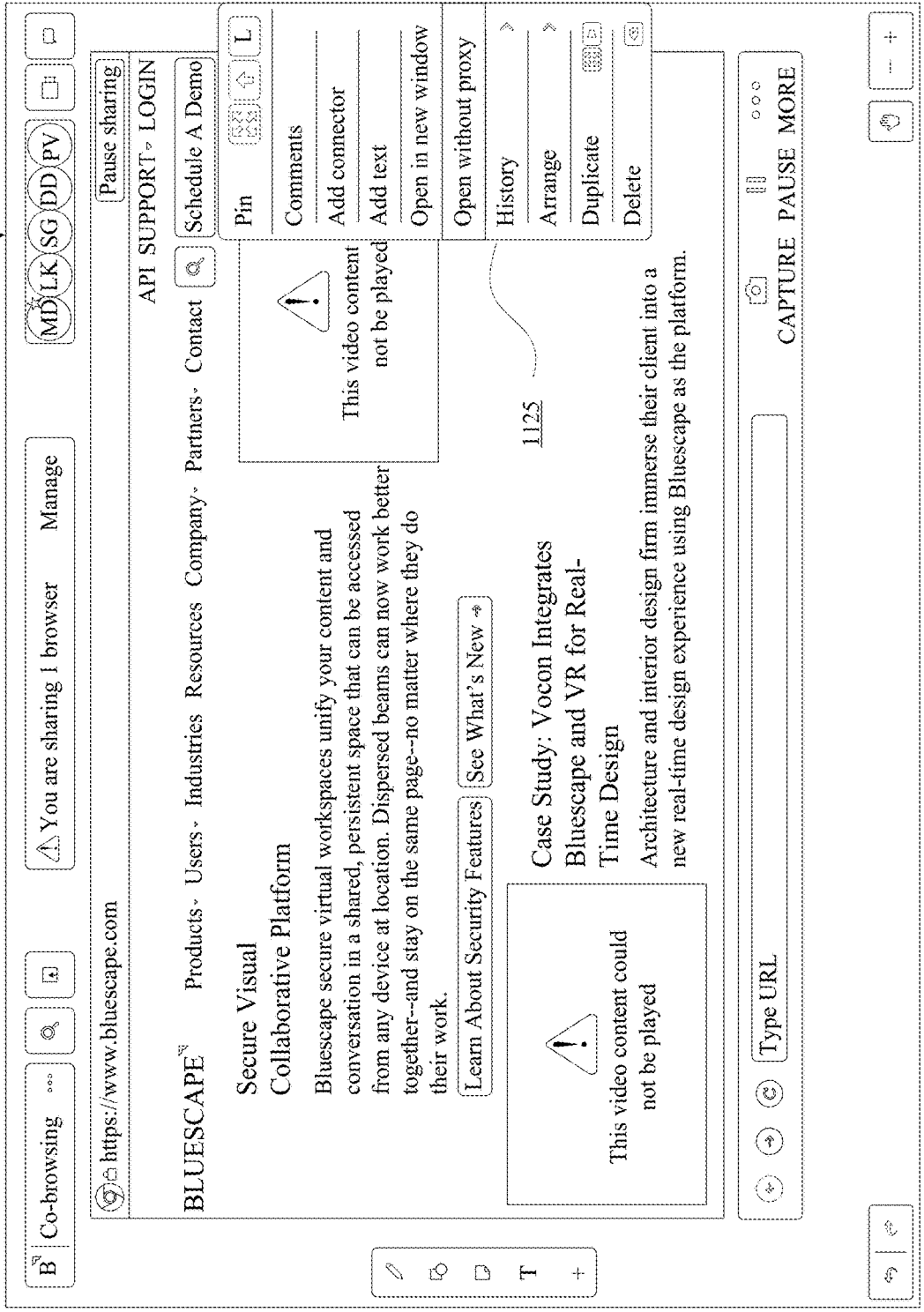

FIG. 11C presents a user interface 1105 which is displayed on the client-side network node of a leader in a co-browsing session. The user interface 1105 includes a user interface element 1125 which can be used by the leader to add graphical objects on the user interface. The user interface element 1125 includes commands such as "comments", "add text", "add connector" which can be used by the user of the co-browsing session to add comments to the web application, or to write text on the web application or annotate on the web application.

Figure 11D:
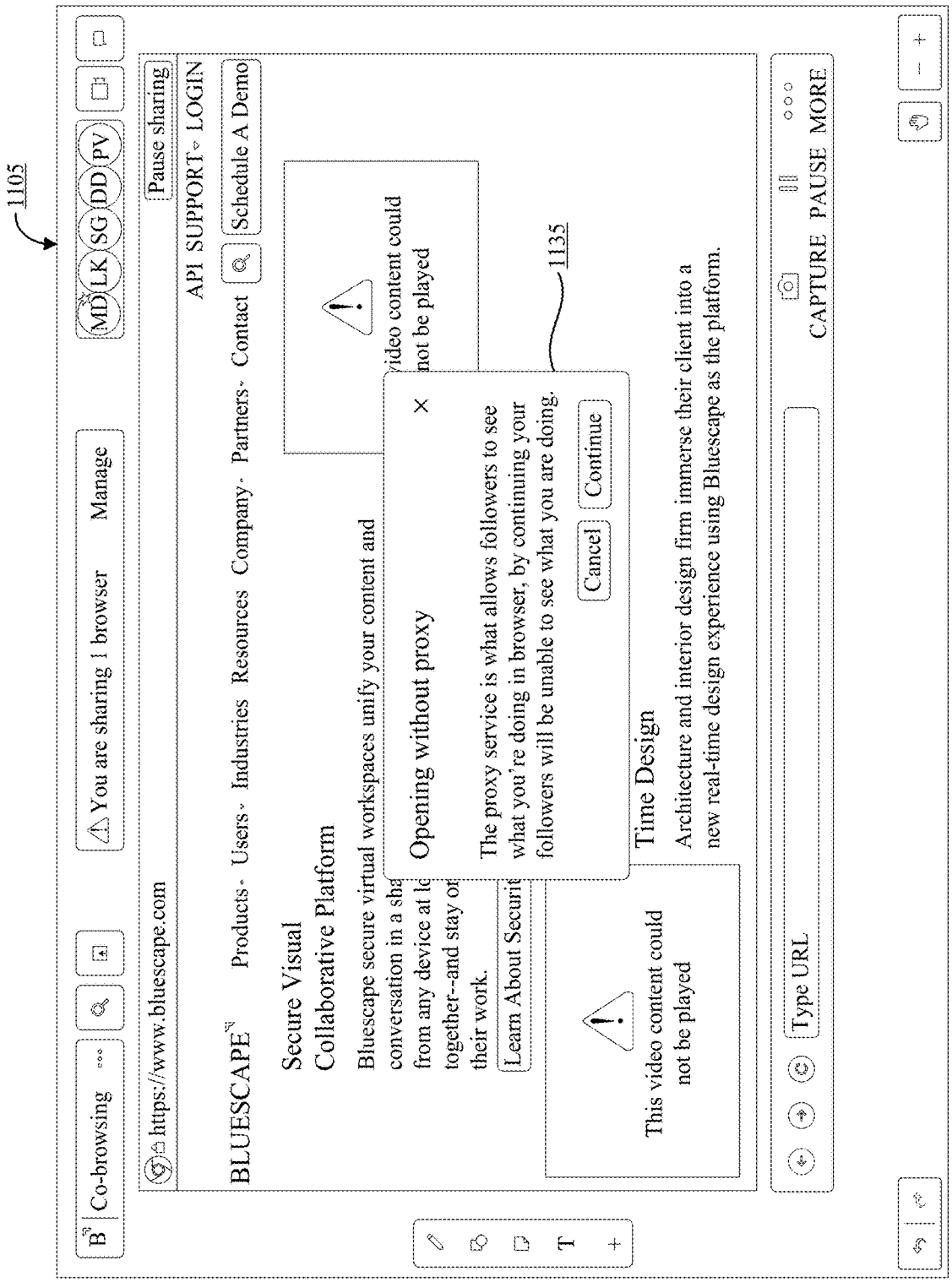

FIG. 11D presents a user interface 1105 which is displayed on the client-side network node of a leader in a co-browsing session. The user interface 1105 includes a user interface element 1135 that displays a message to the leader of the co-browsing session. The message informs the leader that if the leader continues the co-browsing session without proxy web server, the follower will not be able to see the content shared by the leader. Some content such as videos, images etc. on a web application or a web page may be DRM (digital rights management) protected. The collaboration server 205 cannot setup a DRM session for each client-side network node independently. Each client-side network node needs to negotiate its own key exchange in order to playback or view DRM controlled content. That means when the leader wants followers to play a video which is DRM protected, the client-side network nodes stop co-browsing. Then each client-side network node would need to start its own local session. As the browser sessions often rely on custom code such as JavaScript being executed to control the client video player, the client-side network nodes need to load the entire page locally in an such as in an Iframe in order to play the content. The collaboration server 205 is designed to be a central point in the co-browsing session to enable sharing the same webpage and DOM between many clients, but client-side network nodes need to individually negotiate with a Key Management Server to get access to DRM protected media.

Figure 11E:
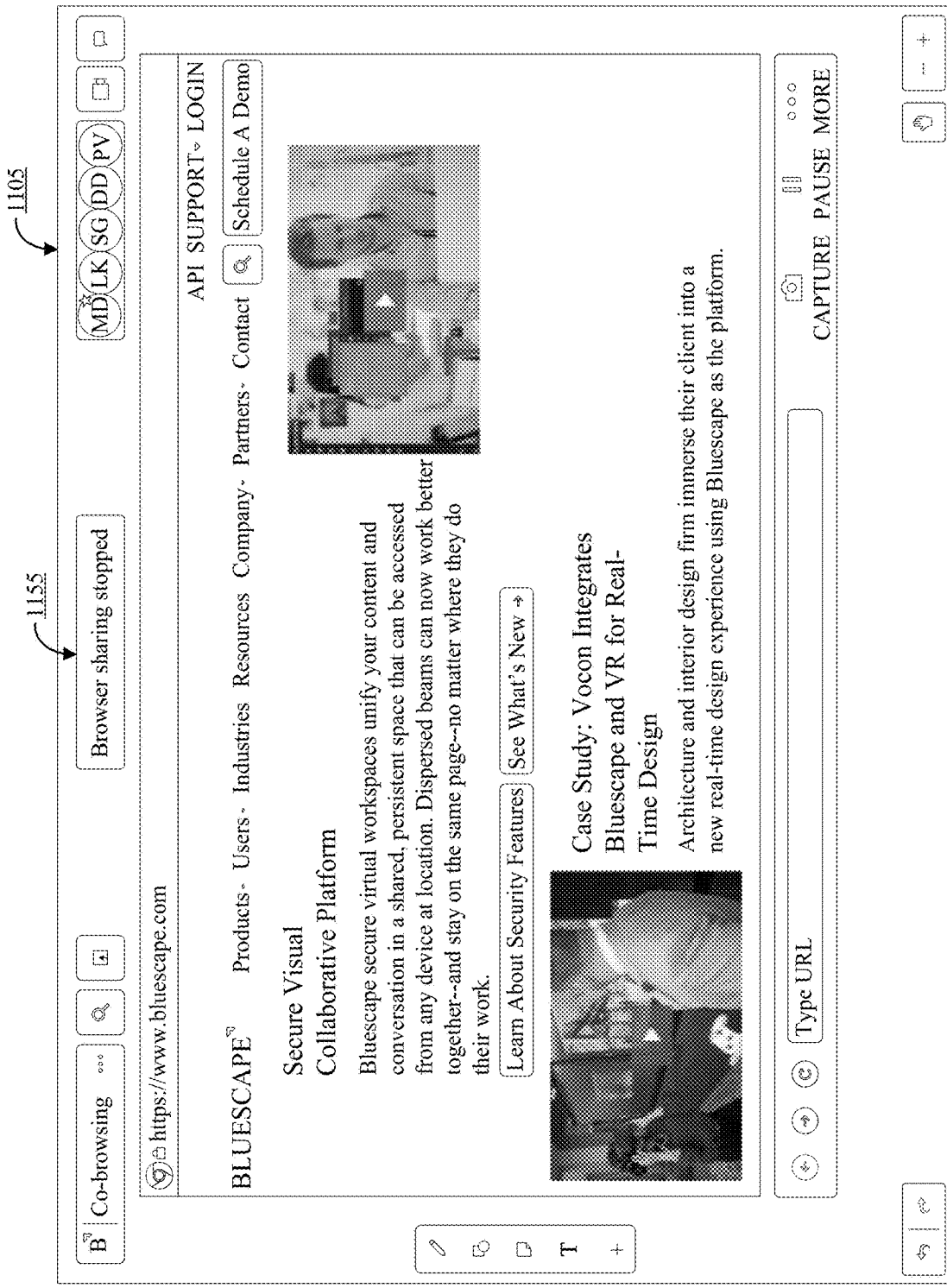

FIG. 11E presents a user interface 1105 which is displayed on the client-side network node of a leader in a co-browsing session. The user interface 1105 includes a user interface element 1155 that shows a message that browser sharing has stopped. This message is displayed because the leader of the collaboration session selected "continue" option from the user interface element 1135 in FIG. 11D.

Figure 12:
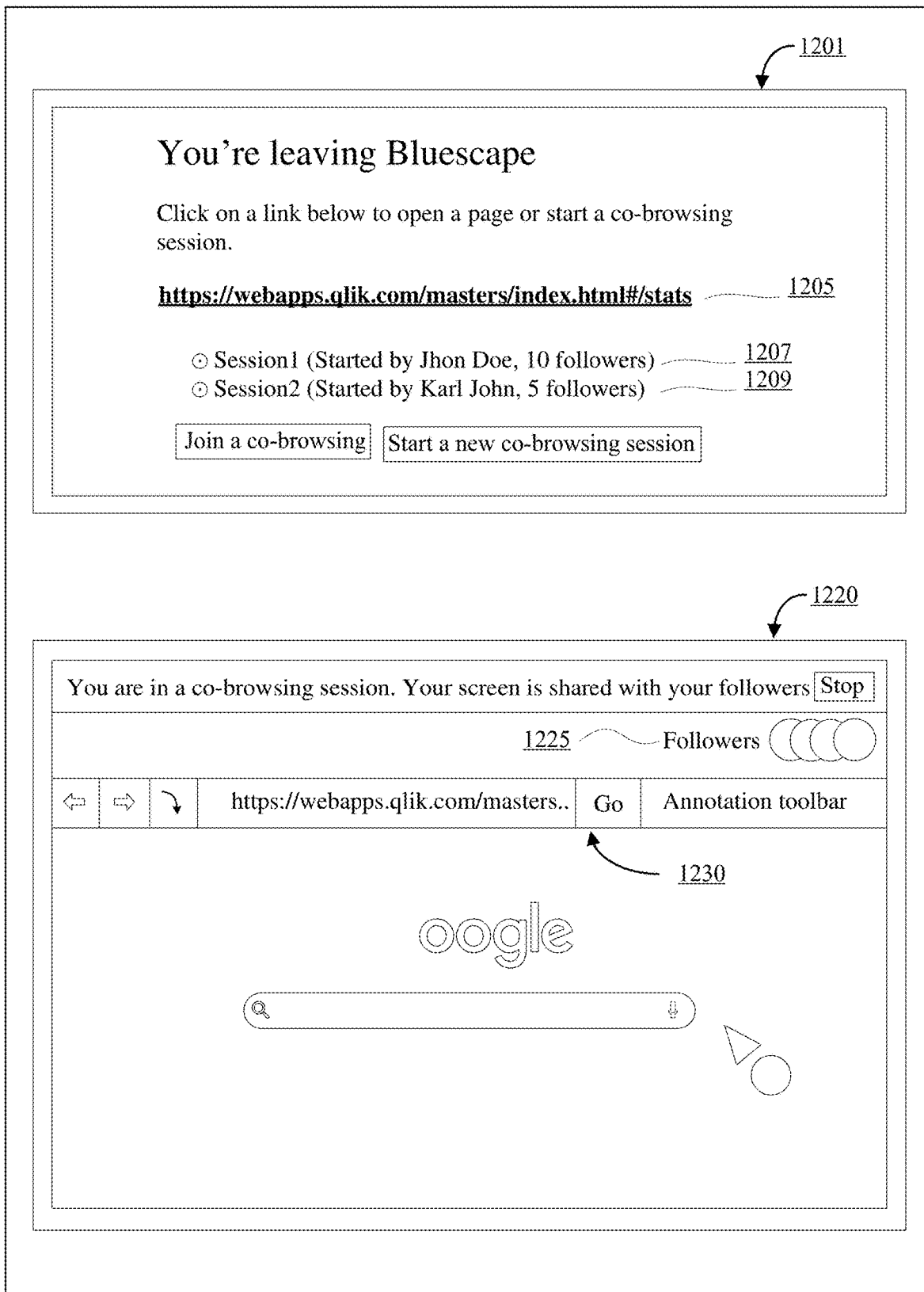
FIG. 12 presents user interface examples for users to join an active co-browsing collaboration session and start a new active co-browsing collaboration session.

FIG. 12 shows a user interface 1201 that is displayed on the display of a client-side network node. The user interface shows that the user is leaving a co-browsing session. The user interface 1201 also includes a link 1205 that can be selected by the user to return to a co-browsing session. The user interface 1201 also includes two sessions that can be joined. For each session a user interface element is provided for selection. A user can select an option 1207 to join a first co-browsing session as listed or the user can select an option 1209 to join a second co-browsing session. For each session, a name of the user who started the co-browsing session is also displayed. A number of followers participating in each co-browsing session are displayed on the user interface.

FIG. 12 also presents another user interface example 1220 presented on the display of a leader's client-side network node when the leader is leading a co-browsing session. The user interface 1220 includes the names or labels for participants presented in a user interface element 1225. A menu bar 1230 includes menu options for annotation on the web application or the web page.

The applicant hereby discloses in isolation each individual feature described herein and any combination of two or more such features, to the extent that such features or combinations are capable of being carried out based on the present specification as a whole in light of the common general knowledge of a person skilled in the art, irrespective of whether such features or combinations of features solve any problems disclosed herein, and without limitation to the scope of the claims. The applicant indicates that aspects of the present technology may consist of any such feature or combination of features. In view of the foregoing description, it will be evident to a person skilled in the art that various modifications may be made within the scope of the technology.

The foregoing description of preferred embodiments of the present technology has been provided for the purposes of illustration and description. It is not intended to be exhaustive or to limit the technology to the precise forms disclosed. Obviously, many modifications and variations will be apparent to practitioners skilled in this art. For example, though the displays described herein are of large format, small format displays can also be arranged to use multiple drawing regions, though multiple drawing regions are more useful for displays that are at least as large as 12 feet in width. In particular, and without limitation, any and all variations described, suggested by the Background section of this patent application or by the material incorporated by reference are specifically incorporated by reference into the description herein of embodiments of the technology. In addition, any and all variations described, suggested or incorporated by reference herein with respect to any one embodiment are also to be considered taught with respect to all other embodiments. The embodiments described herein were chosen and described in order to best explain the principles of the technology and its practical application, thereby enabling others skilled in the art to understand the technology for various embodiments and with various modifications as are suited to the particular use contemplated. It is intended that the scope of the technology be defined by the following claims and their equivalents.

What is claimed is:

1. A server-side network node of a collaboration system hosting a collaboration session, between client-side network nodes, each including a display having a physical display space and a processor, the server-side network node including one or more processors configured with logic to implement operations comprising:

accessing a web application in dependence on a uniform resource locator (URL) of the web application and received in a request message from a first client-side network node to start a co-browsing session in a virtual workspace of the collaboration session established between the client-side network nodes;

generating a first model of the web application corresponding to a current state of the web application;

providing, to the client-side network nodes, a spatial event map identifying a log of events in the virtual workspace, wherein entries within the log of events include respective locations of digital assets related to the events in the workspace and times of the events, the events identified by the spatial event map being related to the first model of the web application, which is one of the digital assets related to the events, wherein the spatial event map allows for rendering, in the display space on the display of each of the client-side network nodes, the first model of the web application in the co-browsing session;

receiving an input event including an input from at least one client-side network node and applying the input received in the input event to the current state of the web application;

creating a second model of the web application as a result of updates to the current state of the web application in dependence upon the input included in the input event; and generating an update patch using a difference between the second model and the first model and sending an update event including the update patch to the client-side network nodes, wherein the spatial event map, at respective client-side network nodes, receives the update event and allows rendering, in the display space on the display of each of the client-side network nodes, of the second model of the web application corresponding to the updated state of the web application.

2. The system of claim 1, wherein the first model and the second model of the web application respectively include a plurality of elements of the web application served by a web server serving the web application.

3. The system of claim 2, wherein the server-side network node is further configured with logic to implement operations including:

retrieving, from the web server serving the web application, at least one element from the plurality of elements of the web application; and storing the at least one element of the web application in a database, wherein the first model of the web application corresponding to the current state of the web application includes the at least one element of the web application queried from the plurality of elements of the web application stored in the database.

4. The system of claim 3, wherein the server-side network node is further configured with logic to implement operations including:

retrieving, from the web server serving the web application, each element of the plurality of elements of the web application; and storing each retrieved element of the plurality of elements of the web application in the database, wherein the first model of the web application corresponding to the current state of the web application includes at least one element of the of the plurality of elements of the web application stored in the database.

5. The system of claim 2, wherein the server-side network node is further configured with logic to implement operations including:

generating a filtered model of the web application corresponding to the first model of the web application by filtering out one or more elements from the plurality of elements from the first model of the web application, wherein the elements of the web application include one or more of (i) a script, (ii) a document object model (DOM) comprising a plurality of document object model elements, (iii) a style, (iv) an image and (v) a video, and the providing, to the client-side network nodes, the spatial event map identifying events in the virtual workspace, the events identified by the spatial event map being related to the filtered model of the web application.

6. The system of claim 5, wherein the generating of the update patch using the difference between the second model and the first model includes using a web-extension component running in a web browser in which the web application is executing and determining changes in states, between the second model and the first model, of the elements of the web application including at least the elements of the document object model of the web application.

7. The system of claim 1, wherein the server-side network node is further configured with logic to implement operations including periodically creating a new model of the web application to capture updates to the current state of the web application, wherein the current state of the web application is captured by a previous model, and wherein the generating of the update patch uses a difference between the new model of the web application and the previous model of the web application.

8. The system of claim 1, wherein the server-side network node is further configured with logic to implement operations including receiving an input event from the first client-side network node to authenticate login credentials for the web application in the co-browsing session in the virtual workspace, wherein the sending of the update event including the update patch to the first client-side network node is performed without sending the update patch to the other client-side network nodes, wherein the spatial event map, at the first client-side network node, receives the update event and allows rendering, in the display space on the display of the first client-side network node, the second model of the web application, wherein the second model of the web application includes a user interface for providing the login credentials, and wherein the displays at the other client-side network nodes display the first model of the web application without including the user interface for providing the login credentials.

9. The system of claim 1, wherein the server-side network node is further configured with logic to implement operations including:

receiving a pause browse request message from the first client-side node to pause the co-browsing session; and discontinuing a subsequent sending of the update event including the update patch to the other client-side network nodes other than the first client-side network node.

10. The system of claim 1, wherein the server-side network node is further configured with logic to implement operations including receiving respective input events including inputs from at least two client-side network nodes and applying the inputs received in the respective input events to the web application, wherein the second model of the web application is created as a result of updates to the web application in dependence upon application of the inputs received in the respective input events to the web application, and wherein the sending of the update event including the update patch to the client-side network nodes includes sending the update event to at least two client-side network nodes.

11. The system of claim 10, wherein the server-side network node is further configured with logic to implement operations including:

determining respective locations of the input events from the at least two client-side network nodes within the virtual workspace, wherein the input events include respective locations of input events in the virtual workspace, wherein the spatial event map, at respective client-side network nodes, receives the update event and allows rendering, in the display space on the display of each of the client-side network nodes, one or more of the digital assets corresponding to the input provided by the at least two client-side network nodes within the virtual workspace, the one or more digital assets respectively identifying actions performed on the second model of the web application at the at least two client-side network nodes respectively.

12. A non-transitory computer-readable recording medium having computer instructions recorded thereon for hosting a collaboration session between client-side network nodes, each including a display having a physical display space and a processor, the computer instructions, when executed by one or more processors, causing the one or more processors to perform operations comprising:

accessing a web application in dependence on a uniform resource locator (URL) of the web application and received in a request message from a first client-side network node to start a co-browsing session in a virtual workspace of the collaboration session established between the client-side network nodes;

generating a first model of the web application corresponding to a current state of the web application;

providing, to the client-side network nodes, a spatial event map identifying a log of events in the virtual workspace, wherein entries within the log of events include respective locations of digital assets related to the events in the workspace and times of the events, the events identified by the spatial event map being related to the first model of the web application, which is one of the digital assets related to the events, wherein the spatial event map allows for rendering, in the display space on the display of each of the client-side network nodes, the first model of the web application in the co-browsing session;

receiving an input event including an input from at least one client-side network node and applying the input received in the input event to the current state of the web application;

creating a second model of the web application as a result of updates to the current state of the web application in dependence upon the input included in the input event; and generating an update patch using a difference between the second model and the first model and sending an update event including the update patch to the client-side network nodes, wherein the spatial event map, at respective client-side network nodes, receives the update event and allows rendering, in the display space on the display of each of the client-side network nodes, of the second model of the web application corresponding to the updated state of the web application.

13. A computer-implemented method for hosting a collaboration session between client-side network nodes, each including a display having a physical display space and a processor, the method comprising:
   accessing a web application in dependence on a uniform resource locator (URL) of the web application and received in a request message from a first client-side network node to start a co-browsing session in a virtual workspace of the collaboration session established between the client-side network nodes;
   generating a first model of the web application corresponding to a current state of the web application;
   providing, to the client-side network nodes, a spatial event map identifying a log of events in the virtual workspace, wherein entries within the log of events include respective locations of digital assets related to the events in the workspace and times of the events, the events identified by the spatial event map being related to the first model of the web application, which is one of the digital assets related to the events, wherein the spatial event map allows for rendering, in the display space on the display of each of the client-side network nodes, the first model of the web application in the co-browsing session;
   receiving an input event including an input from at least one client-side network node and applying the input received in the input event to the current state of the web application;
   creating a second model of the web application as a result of updates to the current state of the web application in dependence upon the input included in the input event; and
   generating an update patch using a difference between the second model and the first model and sending an update event including the update patch to the client-side network nodes, wherein the spatial event map, at respective client-side network nodes, receives the update event and allows rendering, in the display space on the display of each of the client-side network nodes, of the second model of the web application corresponding to the updated state of the web application.

14. A collaboration system hosting a collaboration session, the collaboration system comprising a plurality of client-side network nodes,
   wherein a client-side network node of the plurality of client-side network nodes includes a display having a physical display space, the client-side network node including one or more processors configured with logic to implement operations including:
      sending a request message to a server-side network node to start a co-browsing session in a virtual workspace, wherein the request message includes a uniform resource locator (URL) of a web application,
      retrieving, from the server-side network node, a spatial event identifying a log of events in the virtual workspace, wherein entries within the log of events include respective locations of digital assets related to the events in the workspace and times of the events, the events identified by the spatial event map being related to a first model of the web application, which is one of the digital assets related to the events, wherein the spatial event map allows for rendering, in the display space on the display of the client-side network node, the first model of the web application in the co-browsing session,
      sending an input event to the server-side network node, wherein the input event includes an input to the first model of the web application,
      receiving an update event from the server-side network node including an update patch, wherein the update patch identifies changes to elements of the first model of the web application and wherein the spatial event map is updated to include the update event, and
      rendering, using the update event and in the display space on the display of the client-side network node, a second model of the web application showing updates that are applied to a first internal model of the web application in dependence on the input to the first model of the web application.

15. The system of claim 14, wherein the input in the input event can be at least one of a text input, a menu item selection input, a voice input, an image input, a page scroll input and an annotation input.

16. The system of claim 14,
   wherein a first client-side network node is further configured with logic to implement operations including:
      rendering, using a first input event, in the display space on the display of the first client-side network node, an updated view of the second model of the web application in dependence on a first scroll operation, wherein the first input event identifies the first scroll operation for the second model of the web application; and
   wherein, a second client-side network node is further configured with logic to implement operations including:
      rendering, using a second input event, in the display space on the display of the second client-side network node, an updated view of the second model of the web application in dependence on a second scroll operation, wherein the second input event identifies the second scroll operation for the second model of the web application, wherein the second scroll operation is different from the first scroll operation.

17. The system of claim 14,
   wherein the input event identifies an annotation operation performed on the second model of the web application,
   wherein the update patch includes the annotation operation performed on the second model of the web application, and
   wherein the rendering includes rendering, in the display space on the display of the client-side network node, an updated view of the second model of the web application including the annotation in response to the input event.

18. The system of claim 14,
   wherein the input event identifies an operation of attaching a note card to the second model of the web application,
   wherein the update patch includes the note card attached to the second model of the web application, and
   wherein the rendering includes rendering, in the display space on the display of the client-side network node, an updated view of the second model of the web application including the note card in response to the input event.

19. A non-transitory computer-readable recording medium having computer instructions recorded thereon for hosting a collaboration session between client-side network nodes, each including a display having a physical display space and a processor, the computer instructions, when executed by one or more processors, causing the one or more processors to perform operations comprising:

sending a request message to a server-side network node to start a co-browsing session in a virtual workspace, wherein the request message includes a uniform resource locator (URL) of a web application;

retrieving, from the server-side network node, a spatial event identifying a log of events in the virtual workspace, wherein entries within the log of events include respective locations of digital assets related to the events in the workspace and times of the events, the events identified by the spatial event map being related to a first model of the web application, which is one of the digital assets related to the events, wherein the spatial event map allows for rendering, in the display space on the display of the client-side network node, the first model of the web application in the co-browsing session;

sending an input event to the server-side network node, wherein the input event includes an input to the first model of the web application;

receiving an update event from the server-side network node including an update patch, wherein the update patch identifies changes to elements of the first model of the web application and wherein the spatial event map is updated to include the update event and rendering, using the update event and in the display space on the display of the client-side network node, a second model of the web application showing updates that are applied to a first internal model of the web application in dependence on the input to the first model of the web application.

20. A computer-implemented method for hosting a collaboration session between client-side network nodes, each including a display having a physical display space and a processor, the method comprising:

sending a request message to a server-side network node to start a co-browsing session in a virtual workspace, wherein the request message includes a uniform resource locator (URL) of a web application;

retrieving, from the server-side network node, a spatial event identifying a log of events in the virtual workspace, wherein entries within the log of events include respective locations of digital assets related to the events in the workspace and times of the events, the events identified by the spatial event map being related to a first model of the web application, which is one of the digital assets related to the events, wherein the spatial event map allows for rendering, in the display space on the display of the client-side network node, the first model of the web application in the co-browsing session;

sending an input event to the server-side network node, wherein the input event includes an input to the first model of the web application;

receiving an update event from the server-side network node including an update patch, wherein the update patch identifies changes to elements of the first model of the web application and wherein the spatial event map is updated to include the update event; and rendering, using the update event and in the display space on the display of the client-side network node, a second model of the web application showing updates that are applied to a first internal model of the web application in dependence on the input to the first model of the web application.

* * * * *